(12) United States Patent
Matsuura et al.

(10) Patent No.: US 11,381,773 B2
(45) Date of Patent: Jul. 5, 2022

(54) IMAGING DEVICE

(71) Applicant: Sony Semiconductor Solutions Corporation, Kanagawa (JP)

(72) Inventors: Tomohiro Matsuura, Kanagawa (JP); Naoki Kawazu, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/307,593

(22) PCT Filed: Nov. 7, 2019

(86) PCT No.: PCT/JP2019/043625
§ 371 (c)(1),
(2) Date: May 4, 2021

(87) PCT Pub. No.: WO2020/121699
PCT Pub. Date: Jun. 18, 2020

(65) Prior Publication Data
US 2022/0046198 A1 Feb. 10, 2022

(30) Foreign Application Priority Data
Dec. 11, 2018 (JP) ............................. JP2018-231796

(51) Int. Cl.
*H04N 5/365* (2011.01)
*H04N 5/369* (2011.01)
(Continued)

(52) U.S. Cl.
CPC ........... *H04N 5/378* (2013.01); *H04N 5/3651* (2013.01); *H04N 5/3698* (2013.01); *H04N 5/37455* (2013.01)

(58) Field of Classification Search
None
See application file for complete search history.

(56) References Cited

U.S. PATENT DOCUMENTS 8,975,569 B2 * 3/2015 Yamazaki ............... H04N 5/378
250/208.1
2009/0122174 A1 5/2009 Kano
(Continued)

FOREIGN PATENT DOCUMENTS

EP 3301907 A1 4/2018
JP 2019-118427 A 5/2009
(Continued)

OTHER PUBLICATIONS

International Search Report (PCT/ISA/210), International Application No. PCT/JP2019/043625, dated Jan. 15, 2020.
(Continued)

*Primary Examiner* — Mark T Monk
(74) *Attorney, Agent, or Firm* — Michael Best & Friedrich LLP

(57) ABSTRACT

Imaging devices are disclosed. In one example, an imaging device has pixels circuits including an imaging pixel circuit and a dummy pixel circuit. Each of the pixel circuits includes an accumulation section that accumulates electric charge, a first transistor, and an output section. The first transistor includes a first terminal and a second terminal. The second terminal is coupled to the accumulation section. The output section outputs a voltage corresponding to electric charge accumulated in the accumulation section. The first terminal of the first transistor in the imaging pixel circuit is coupled to a first light receiving element, and connected to the second terminal when the first transistor is in an ON state. The first and second terminals of the first transistor in the dummy pixel circuit are connected to each other.

18 Claims, 34 Drawing Sheets

(51) Int. Cl.
*H04N 5/3745* (2011.01)
*H04N 5/378* (2011.01)

(56) References Cited

U.S. PATENT DOCUMENTS

2012/0286138 A1   11/2012   Yamazaki
2018/0098010 A1    4/2018   Shikina

FOREIGN PATENT DOCUMENTS

WO    2018/142707 A1   8/2018
WO    2018/150778 A1   8/2018

OTHER PUBLICATIONS

Notification of Transmittal of the International Search Report and the Written Opinion of the International Searching Authority, or the Declaration (PCT/ISA/220), International Application No. PCT/JP2019/043625, dated Jan. 28, 2020.
Written Opinion of the International Search Authority (PCT/ISA/237), International Application No. PCT/JP2019/043625, dated Jan. 28, 2020.

* cited by examiner

[ FIG. 1 ]
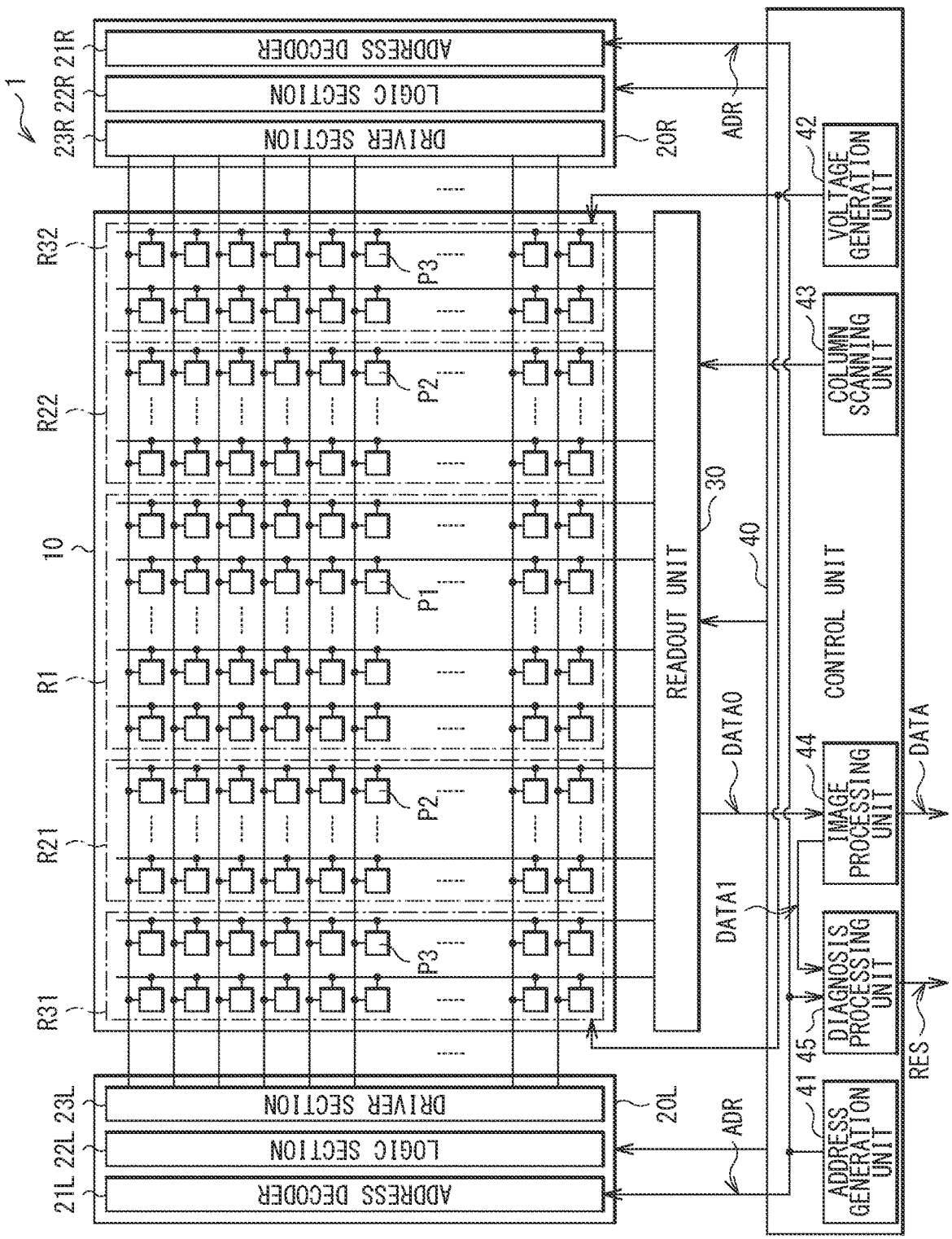

[FIG. 2]
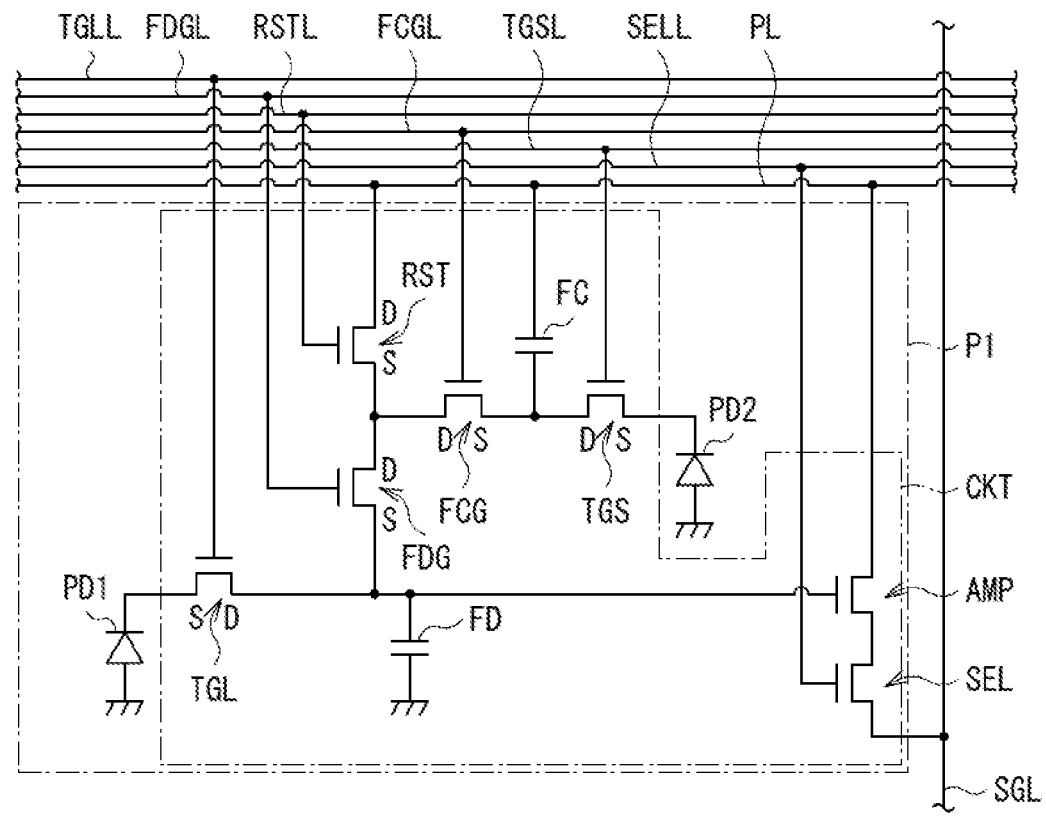
[FIG. 3]
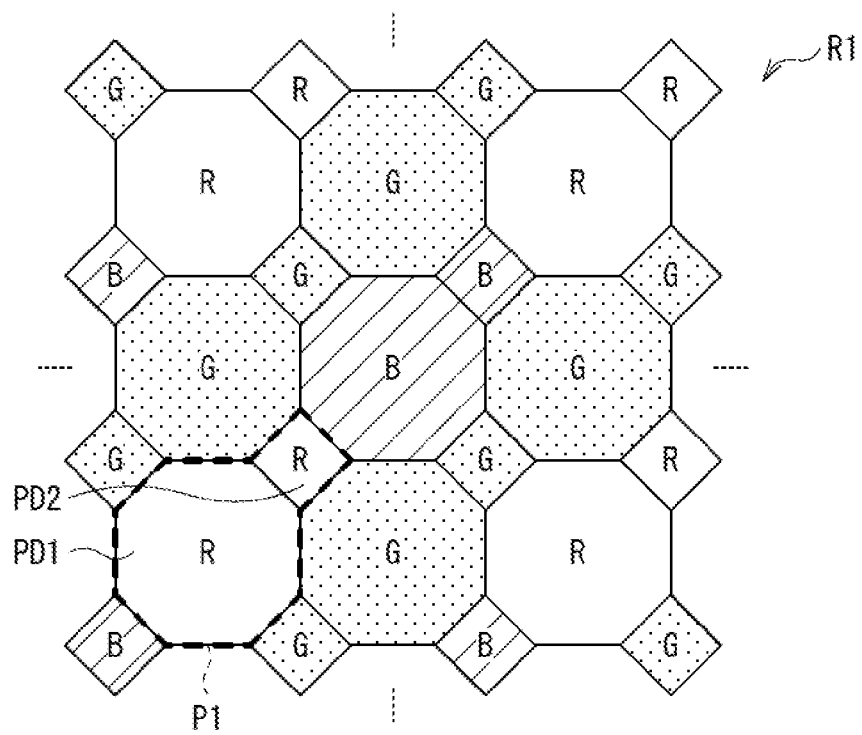

[FIG. 4A]
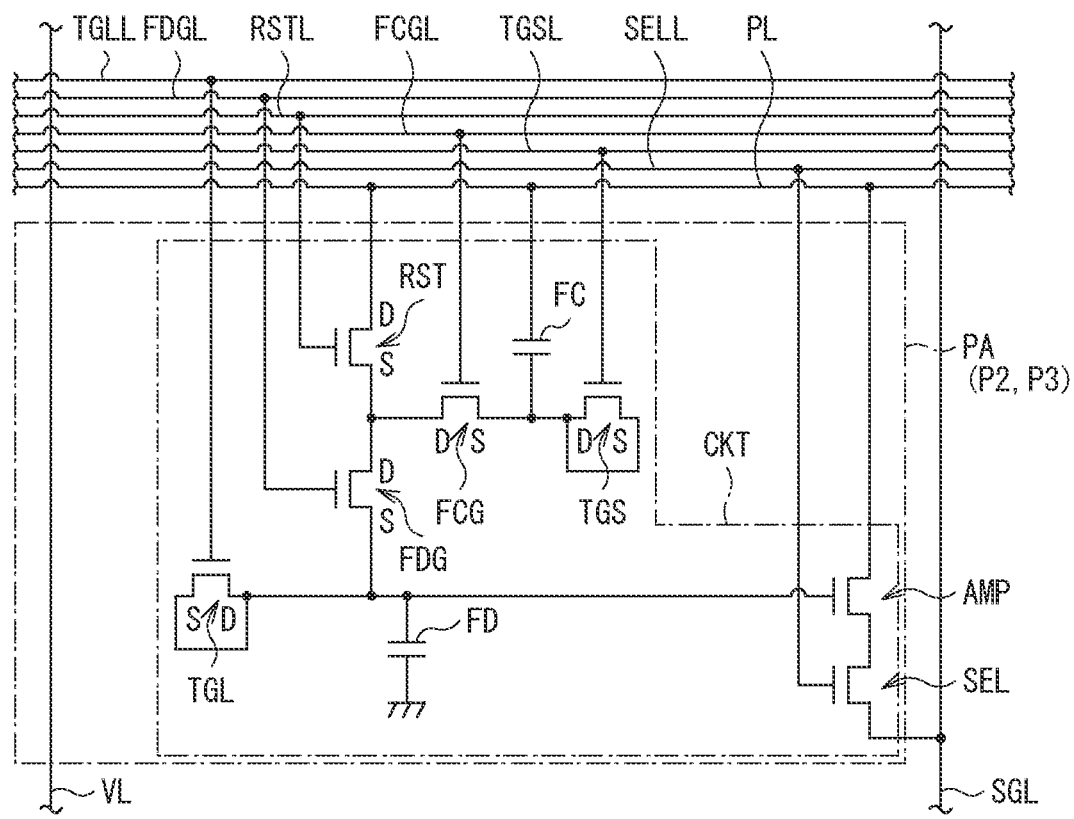

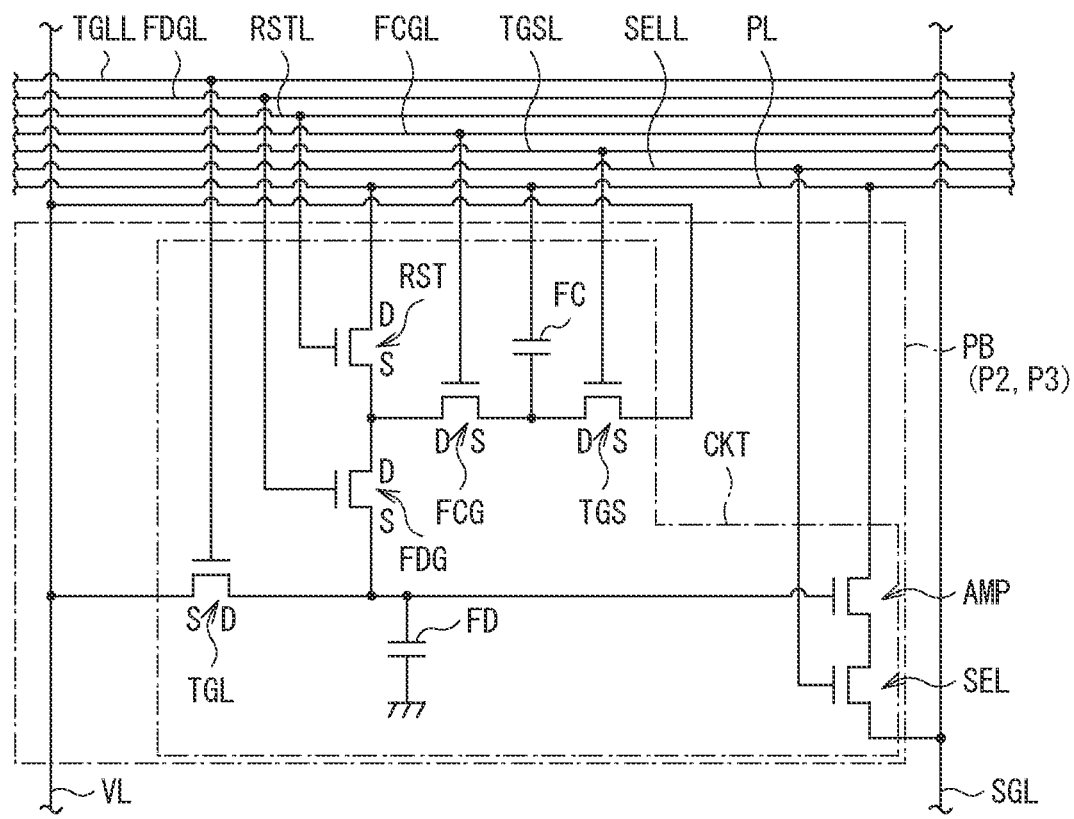
[FIG. 4B]

[ FIG. 5 ]

| | PIXEL P3[1] | PIXEL P3[0] | PIXEL P2[10] | PIXEL P2[9] | PIXEL P2[8] | PIXEL P2[7] | PIXEL P2[6] | PIXEL P2[5] | PIXEL P2[4] | PIXEL P2[3] | PIXEL P2[2] | PIXEL P2[1] | PIXEL P2[0] |
|---|---|---|---|---|---|---|---|---|---|---|---|---|---|
| PIXEL LINE L[0] | 1 | 0 | 0 | 0 | 0 | 0 | 0 | 0 | 0 | 0 | 0 | 0 | 0 |
| PIXEL LINE L[1] | 1 | 0 | 0 | 0 | 0 | 0 | 0 | 0 | 0 | 0 | 0 | 0 | 1 |
| PIXEL LINE L[2] | 1 | 0 | 0 | 0 | 0 | 0 | 0 | 0 | 0 | 0 | 0 | 1 | 0 |
| PIXEL LINE L[3] | 1 | 0 | 0 | 0 | 0 | 0 | 0 | 0 | 0 | 0 | 0 | 1 | 1 |
| PIXEL LINE L[4] | 1 | 0 | 0 | 0 | 0 | 0 | 0 | 0 | 0 | 0 | 1 | 0 | 0 |
| PIXEL LINE L[5] | 1 | 0 | 0 | 0 | 0 | 0 | 0 | 0 | 0 | 0 | 1 | 0 | 1 |
| PIXEL LINE L[6] | 1 | 0 | 0 | 0 | 0 | 0 | 0 | 0 | 0 | 0 | 1 | 1 | 0 |
| PIXEL LINE L[7] | 1 | 0 | 0 | 0 | 0 | 0 | 0 | 0 | 0 | 1 | 0 | 1 | 1 |
| PIXEL LINE L[8] | 1 | 0 | 0 | 0 | 0 | 0 | 0 | 0 | 0 | 0 | 0 | 0 | 0 |

| | PIXEL P2[10] | PIXEL P2[9] | PIXEL P2[8] | PIXEL P2[7] | PIXEL P2[6] | PIXEL P2[5] | PIXEL P2[4] | PIXEL P2[3] | PIXEL P2[2] | PIXEL P2[1] | PIXEL P2[0] | PIXEL P3[1] | PIXEL P3[0] |
|---|---|---|---|---|---|---|---|---|---|---|---|---|---|
| PIXEL LINE L[0] | 0 | 0 | 0 | 0 | 0 | 0 | 0 | 0 | 0 | 0 | 0 | 0 | 1 |
| PIXEL LINE L[1] | 0 | 0 | 0 | 0 | 0 | 0 | 0 | 0 | 0 | 0 | 1 | 0 | 1 |
| PIXEL LINE L[2] | 0 | 0 | 0 | 0 | 0 | 0 | 0 | 0 | 0 | 1 | 0 | 0 | 1 |
| PIXEL LINE L[3] | 0 | 0 | 0 | 0 | 0 | 0 | 0 | 0 | 0 | 1 | 1 | 0 | 1 |
| PIXEL LINE L[4] | 0 | 0 | 0 | 0 | 0 | 0 | 0 | 0 | 1 | 0 | 0 | 0 | 1 |
| PIXEL LINE L[5] | 0 | 0 | 0 | 0 | 0 | 0 | 0 | 0 | 1 | 1 | 1 | 0 | 1 |
| PIXEL LINE L[6] | 0 | 0 | 0 | 0 | 0 | 0 | 0 | 0 | 1 | 1 | 0 | 0 | 1 |
| PIXEL LINE L[7] | 0 | 0 | 0 | 0 | 0 | 0 | 0 | 1 | 0 | 1 | 1 | 0 | 1 |
| PIXEL LINE L[8] | 0 | 0 | 0 | 0 | 0 | 0 | 0 | 0 | 0 | 0 | 0 | 0 | 1 |

0:PA 1:PB

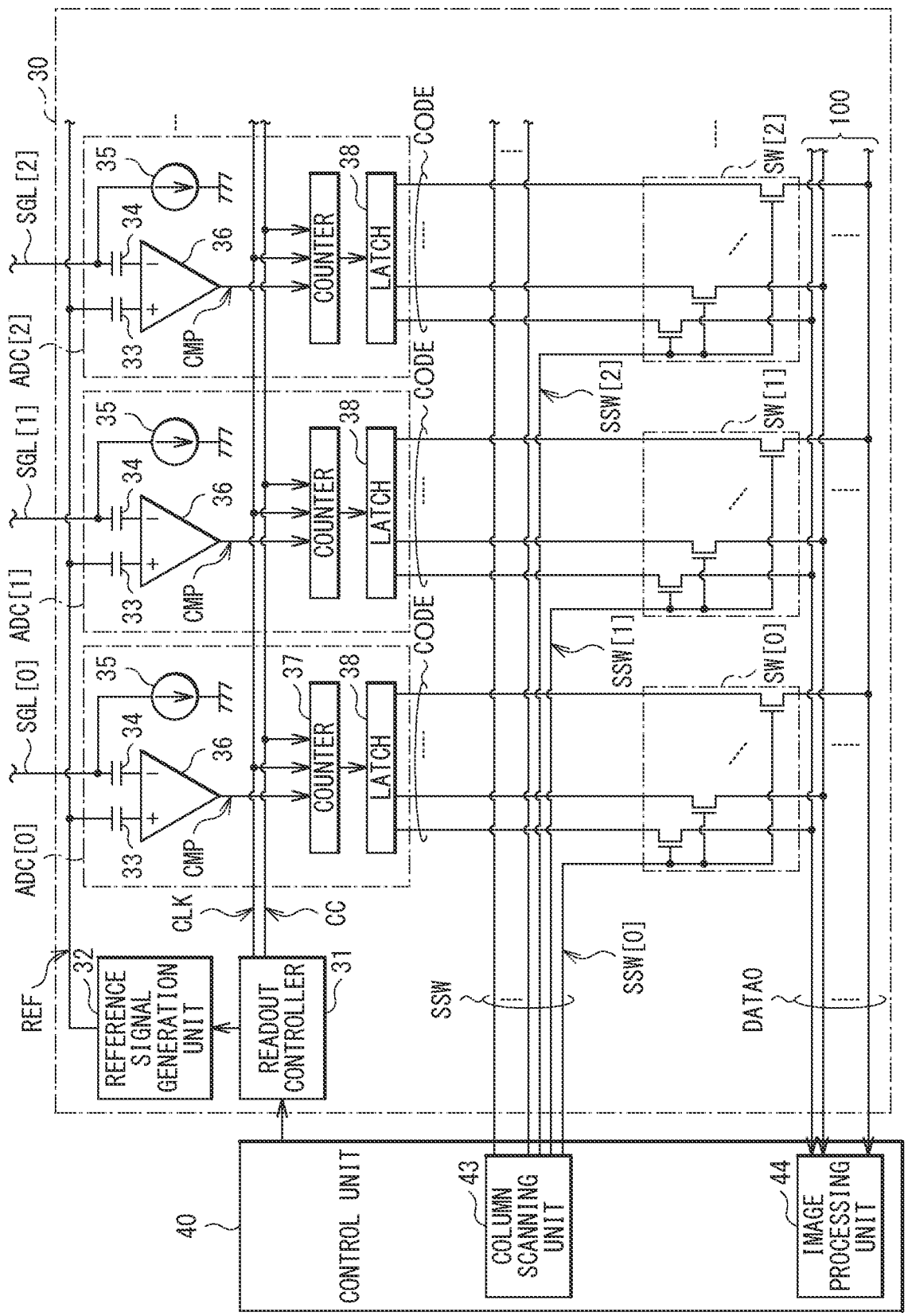
[FIG. 7]

[FIG. 8]
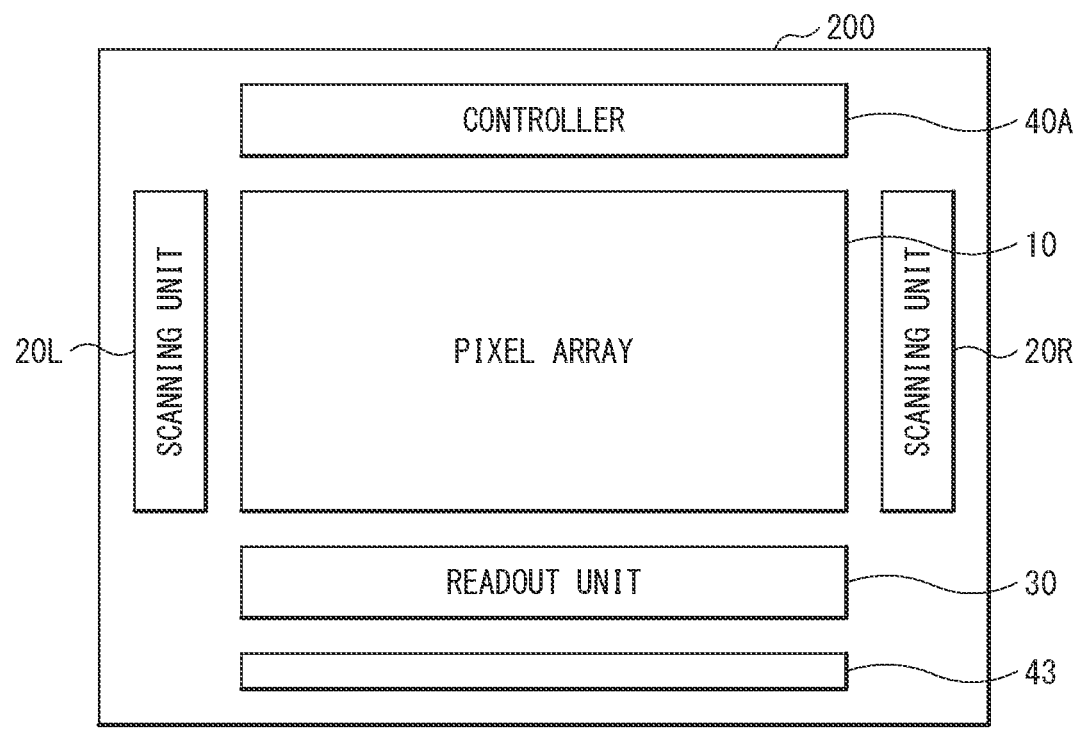

[FIG.9]
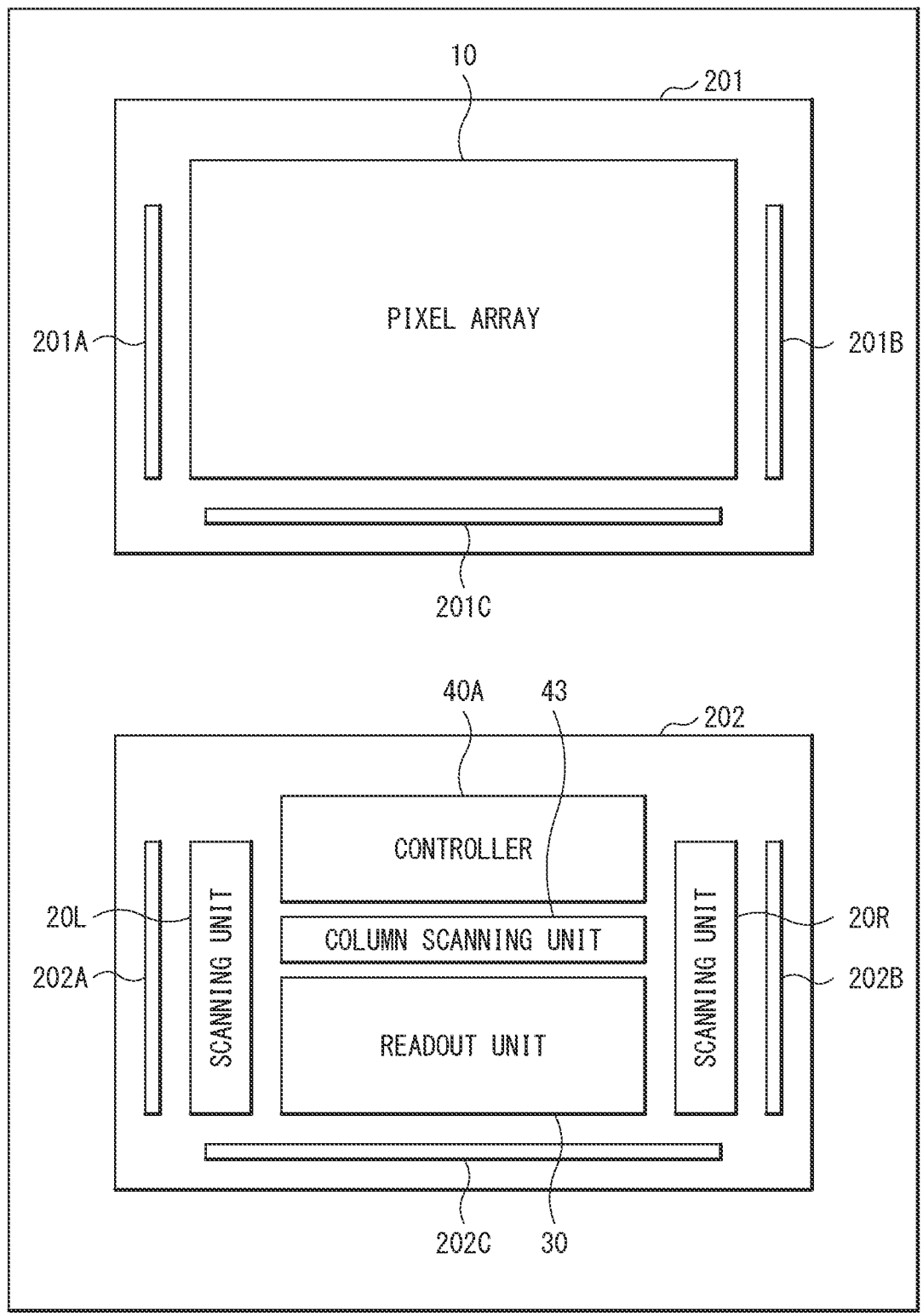

[ FIG. 10 ]
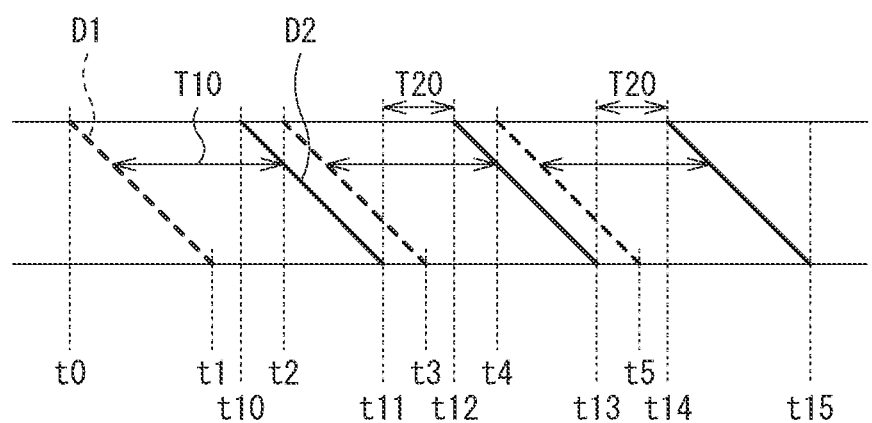

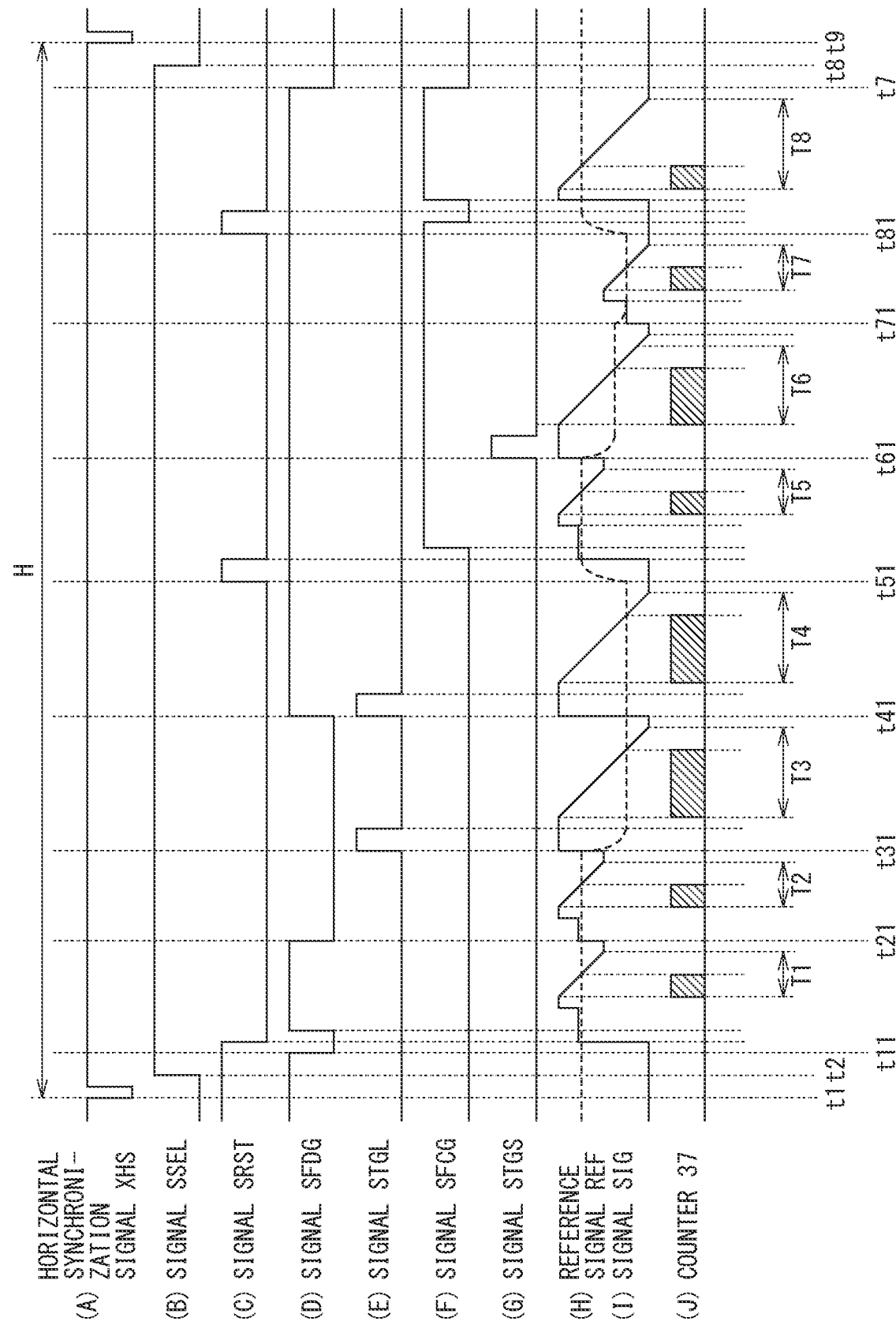
[FIG. 11]

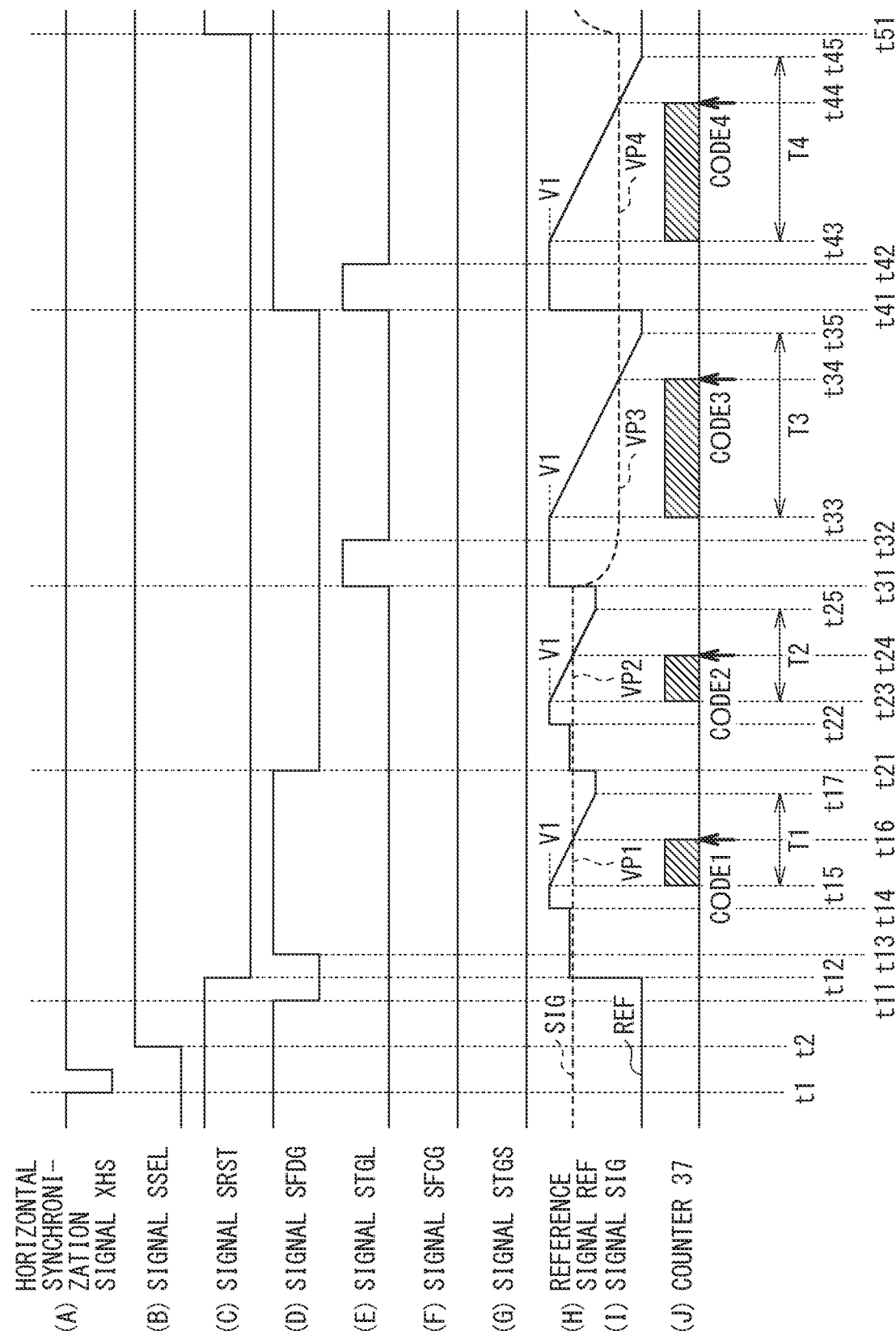
[FIG. 12A]

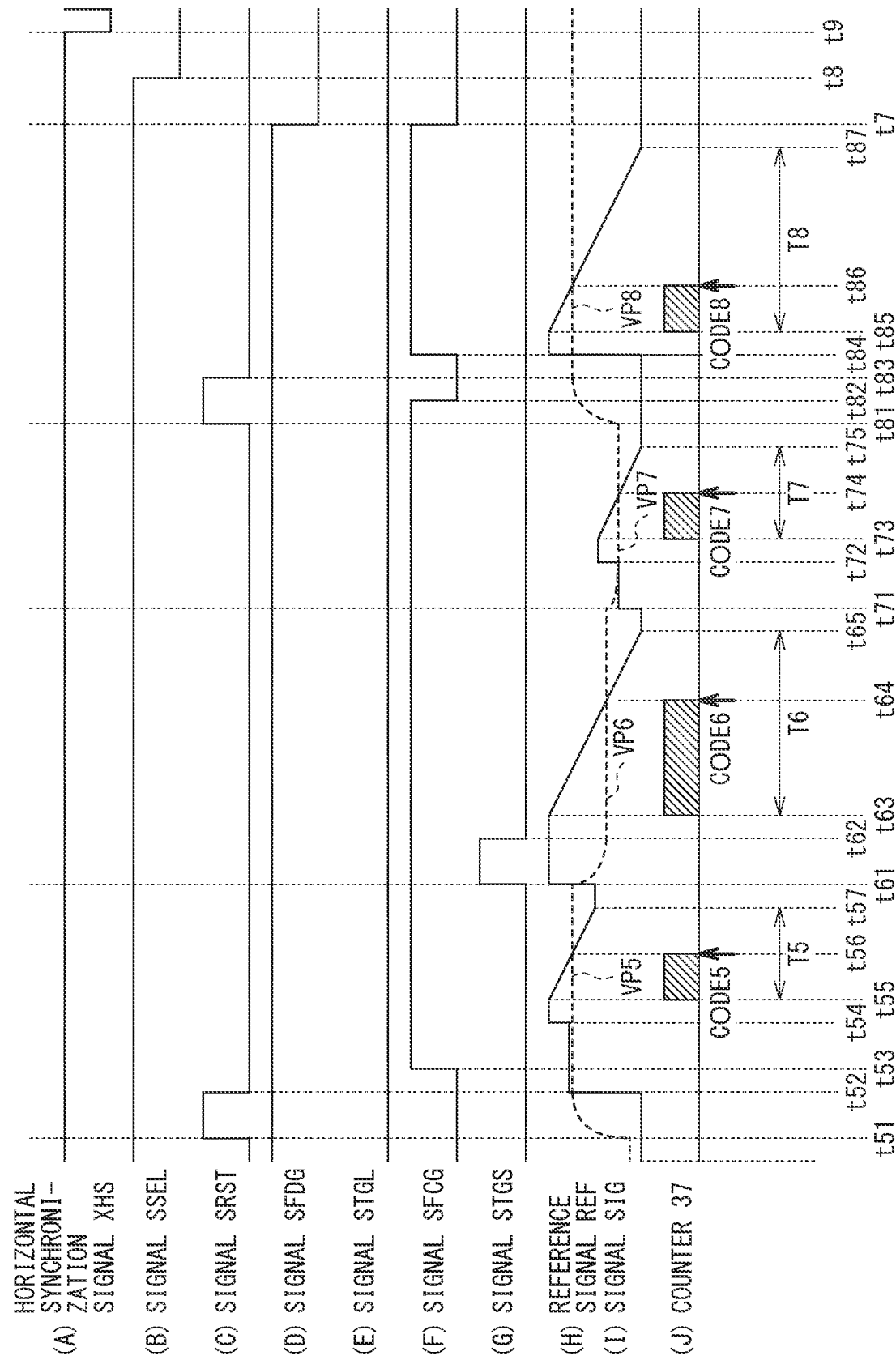
[FIG. 12B]

[ FIG. 13A ]
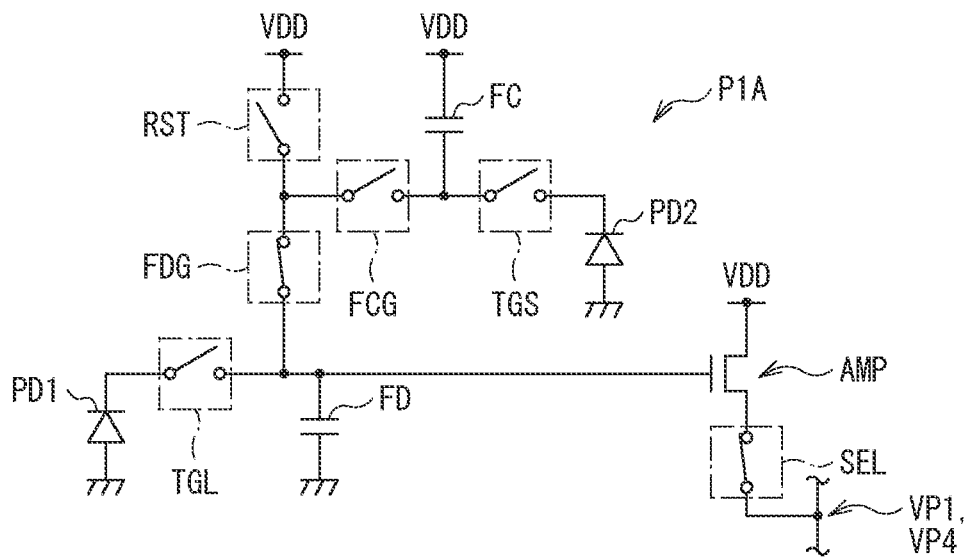
[ FIG. 13B ]
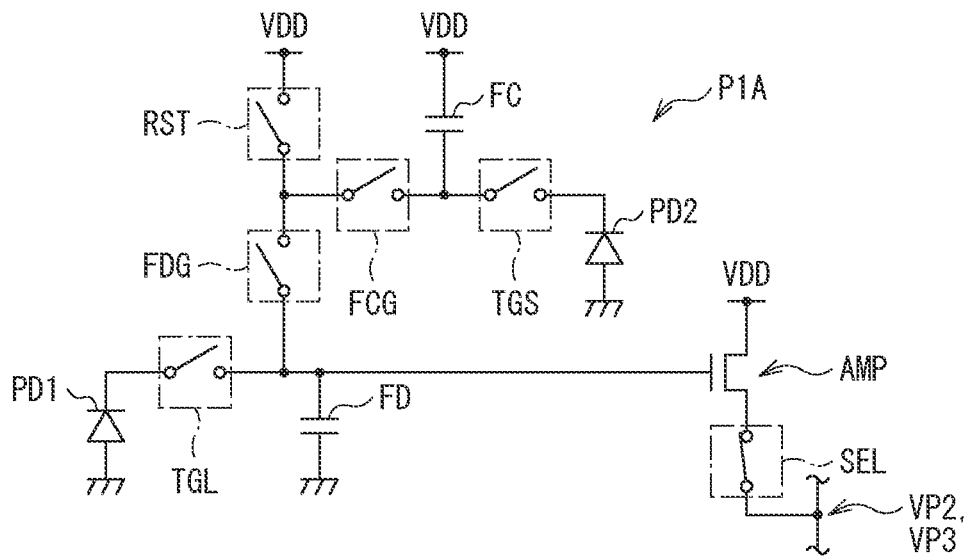

[ FIG. 13C ]
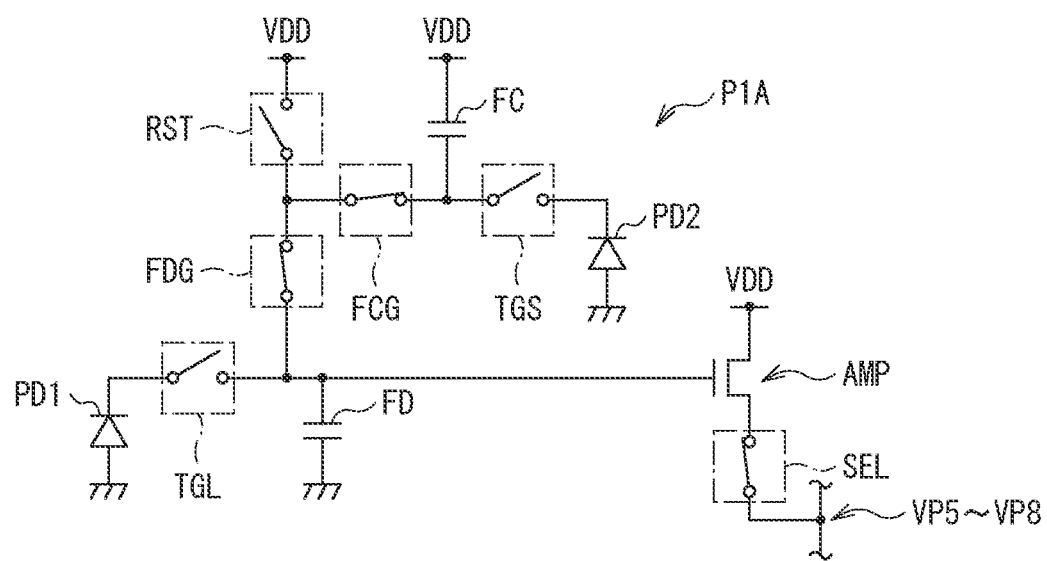

[ FIG. 14 ]
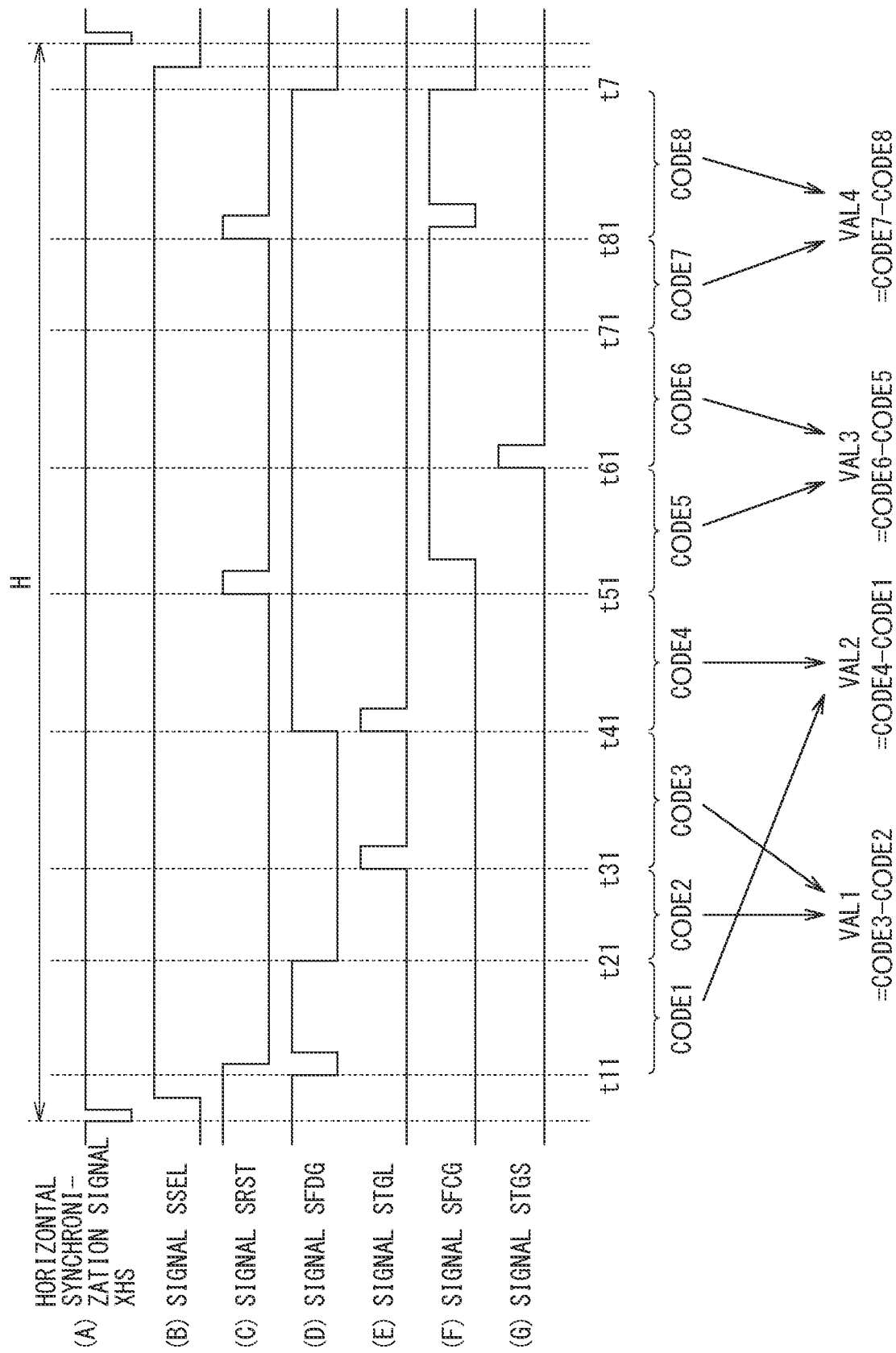

[ FIG. 15 ]
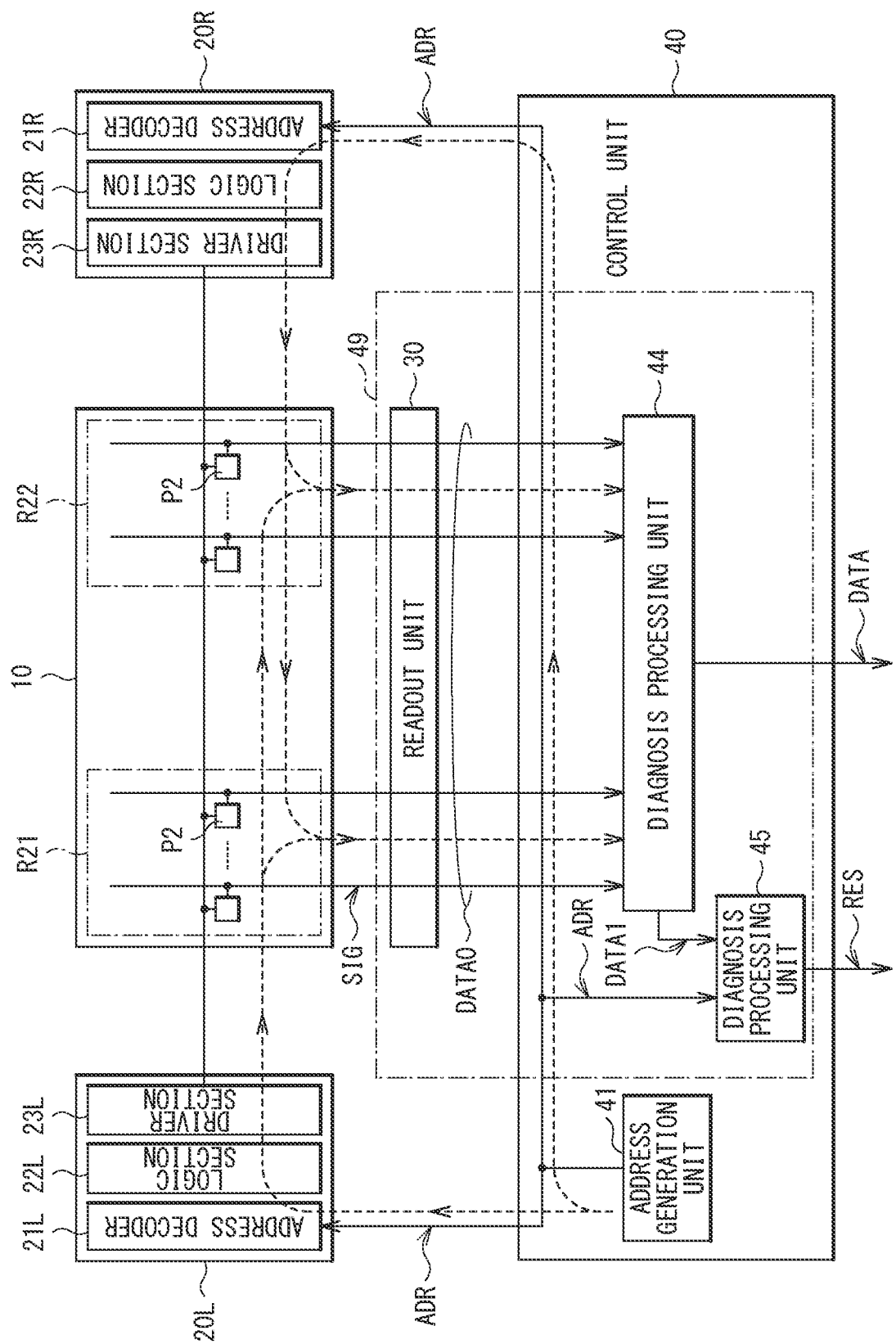

[ FIG. 16 ]
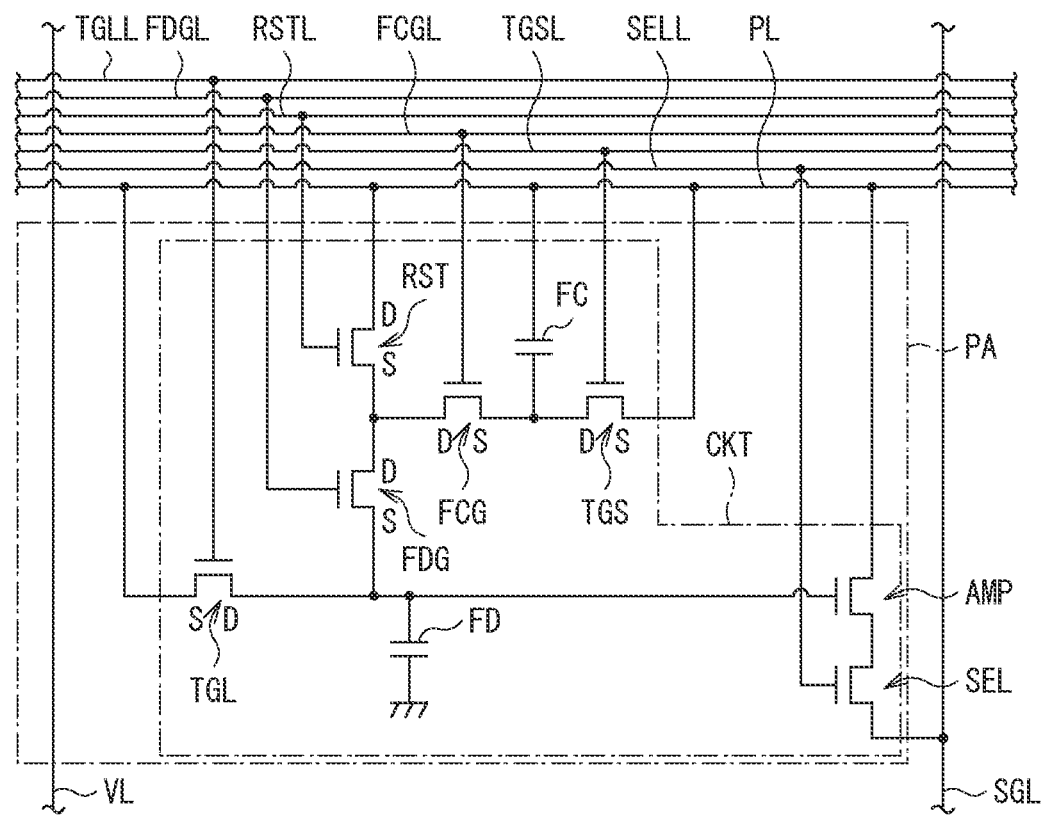

[FIG. 17]
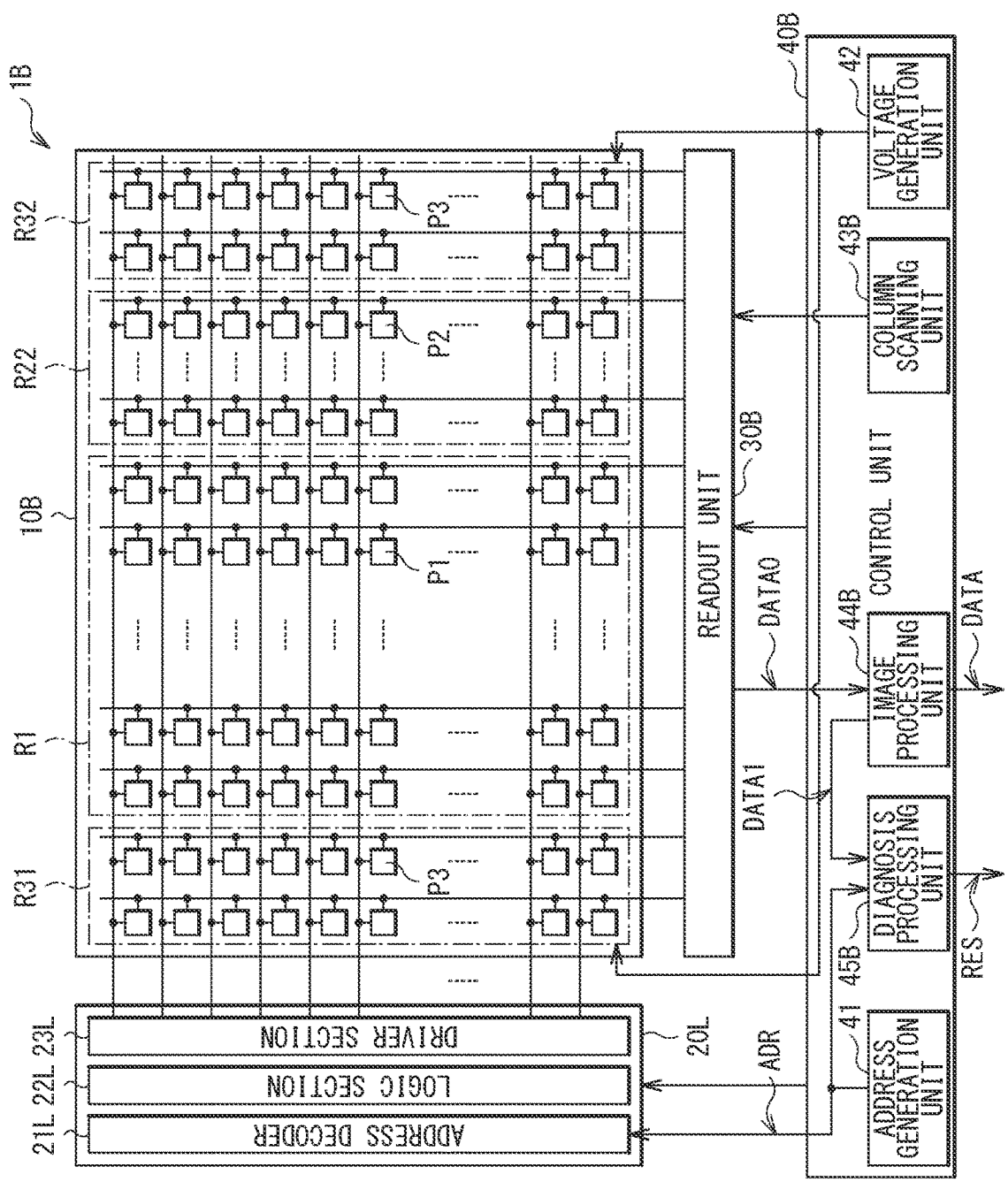

[ FIG. 18 ]
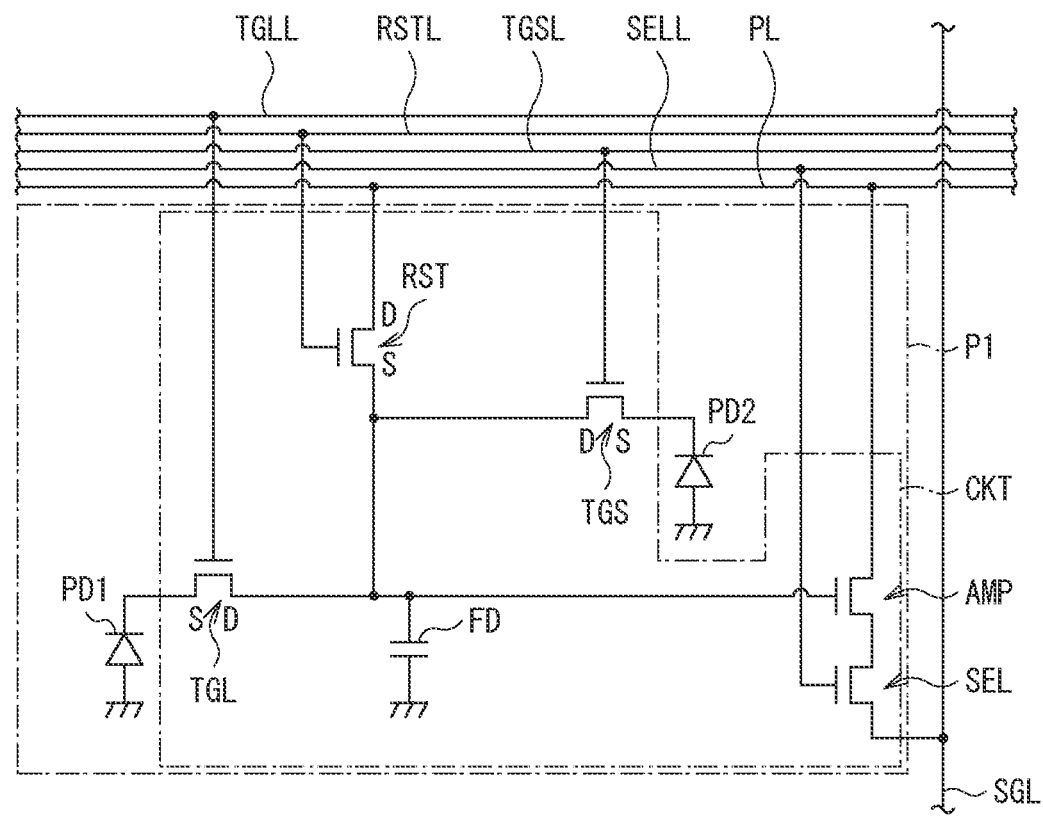

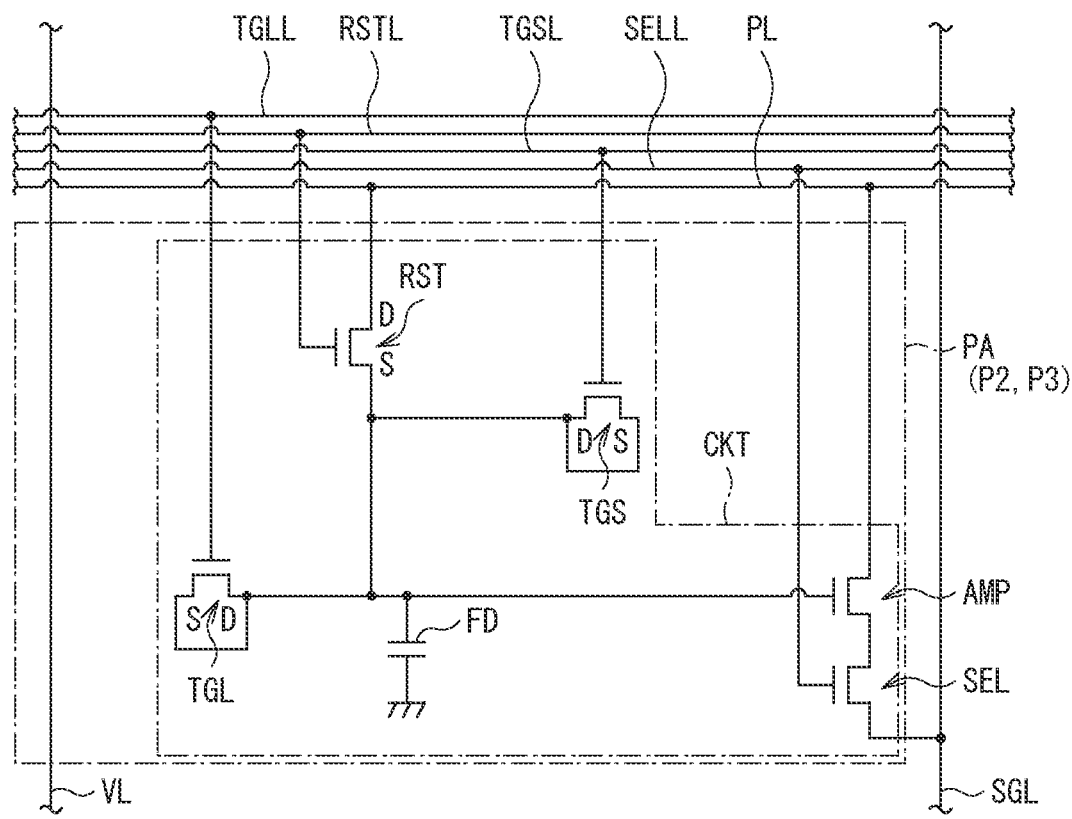
[FIG. 19A]

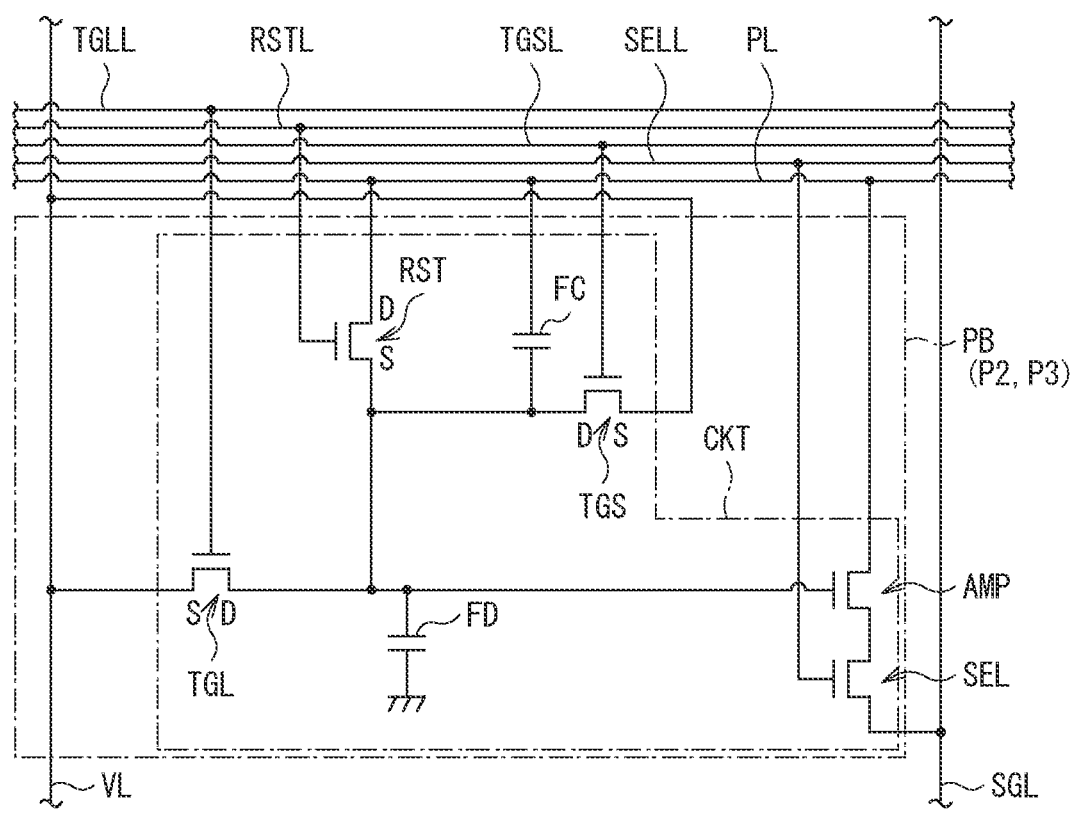
[FIG. 19B]

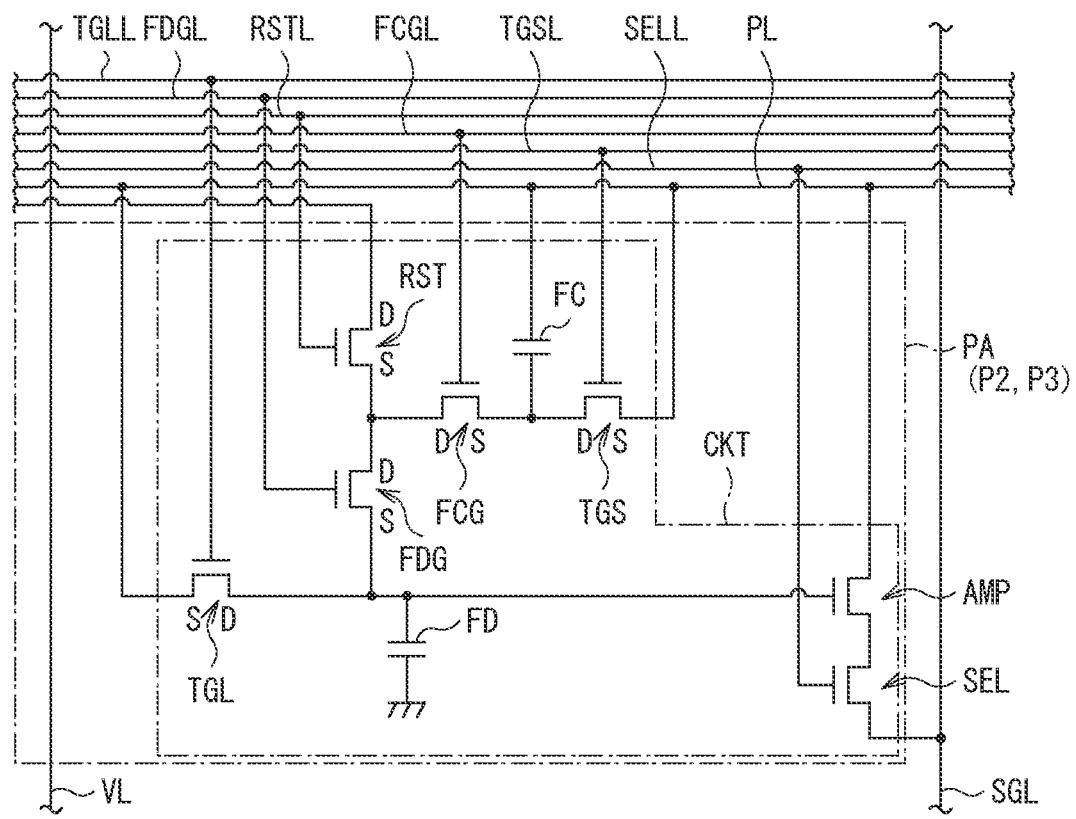
[FIG. 20]

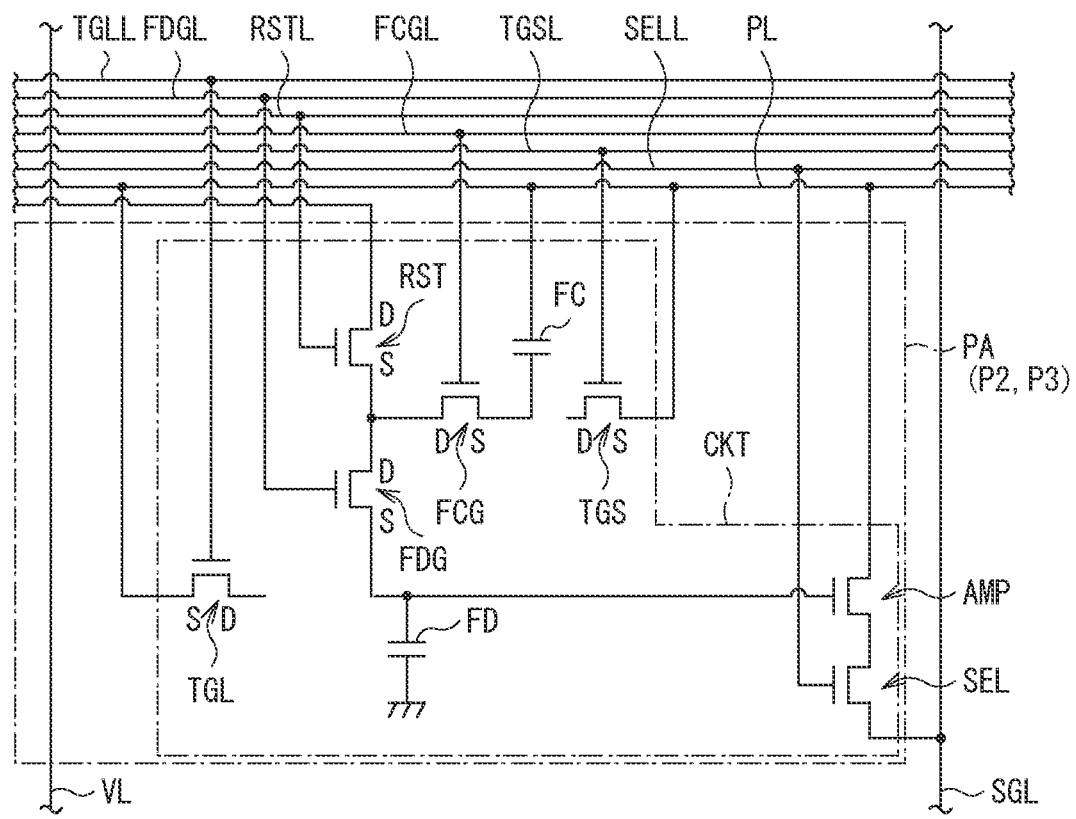
[FIG. 21]

[FIG. 22]
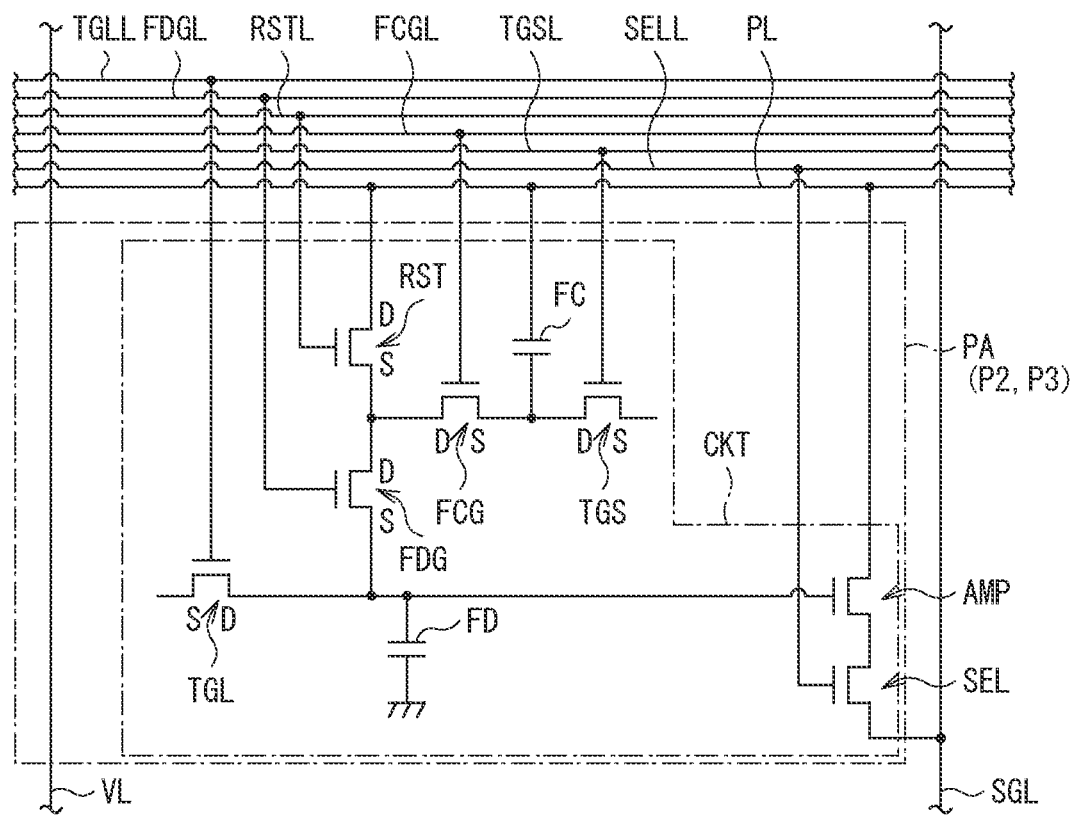

[FIG. 23]
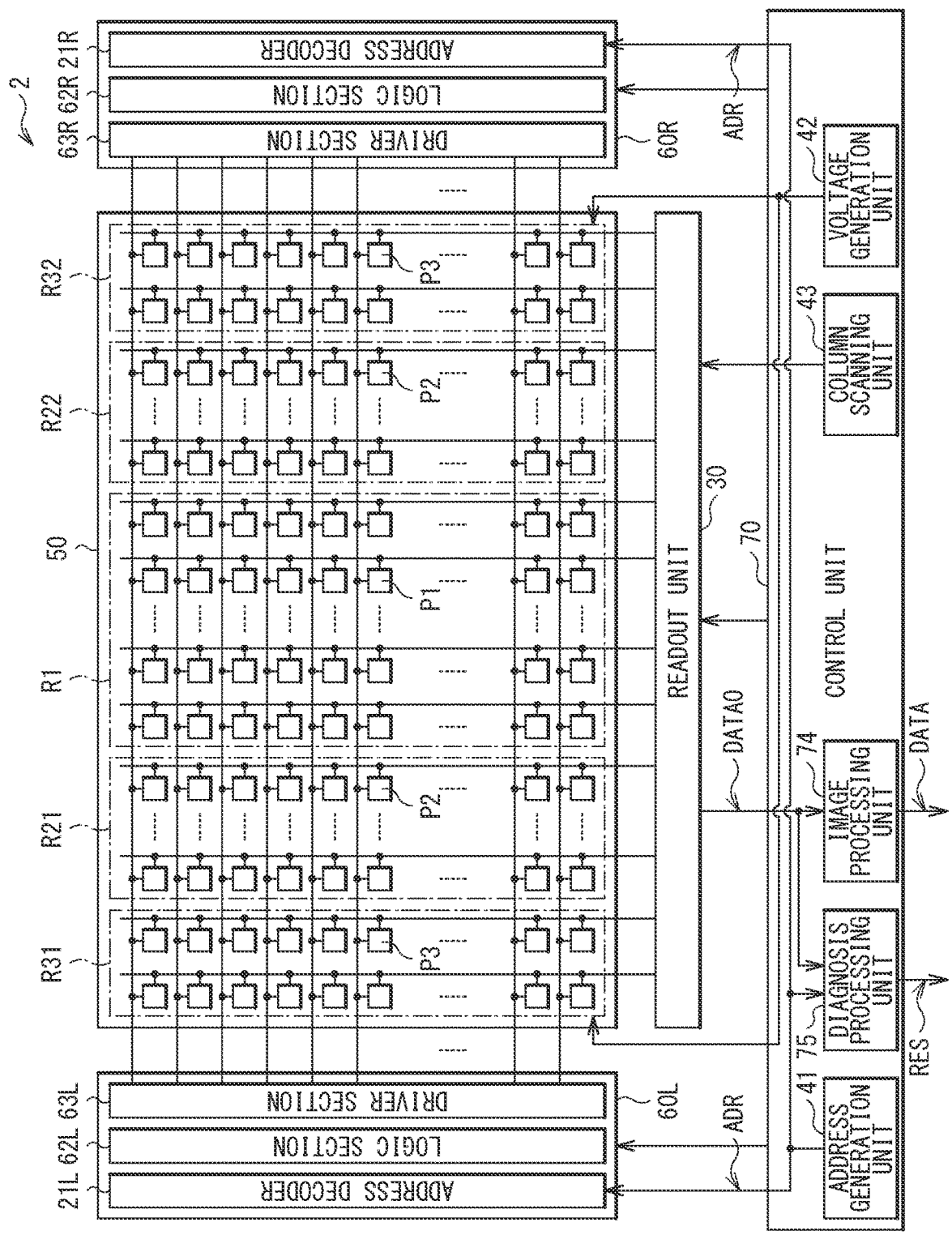

[FIG. 24]
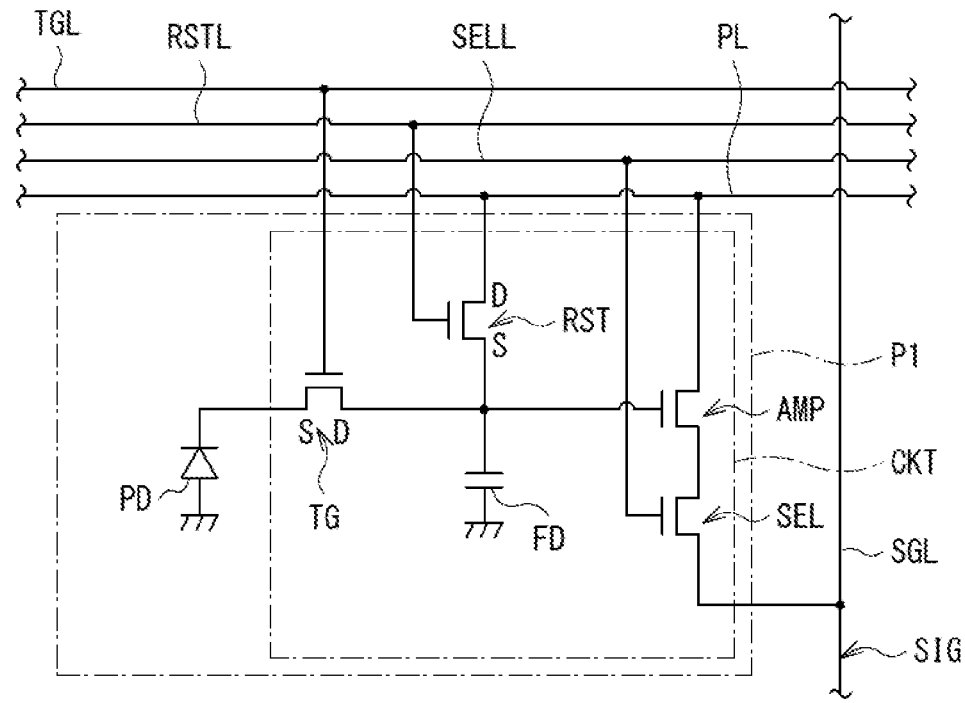
[FIG. 25]
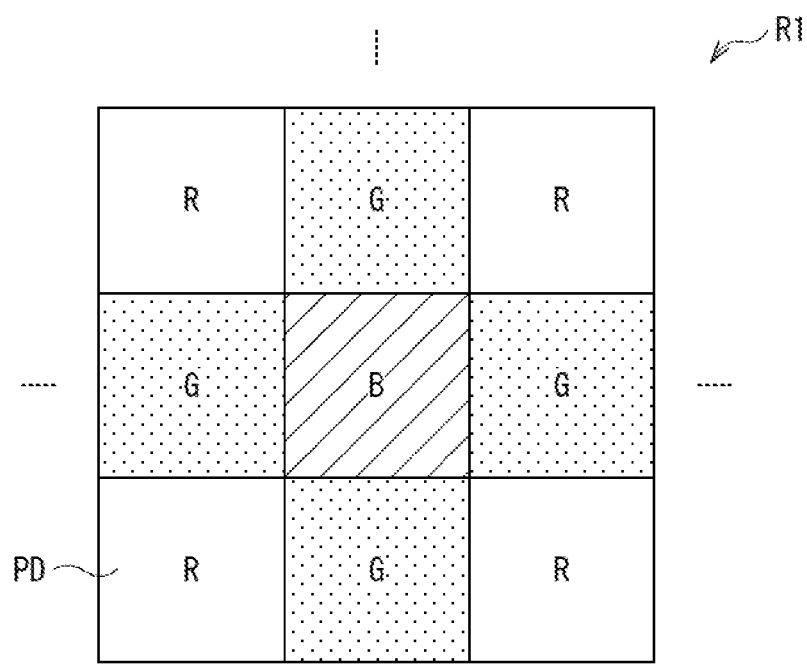

[FIG. 26A]
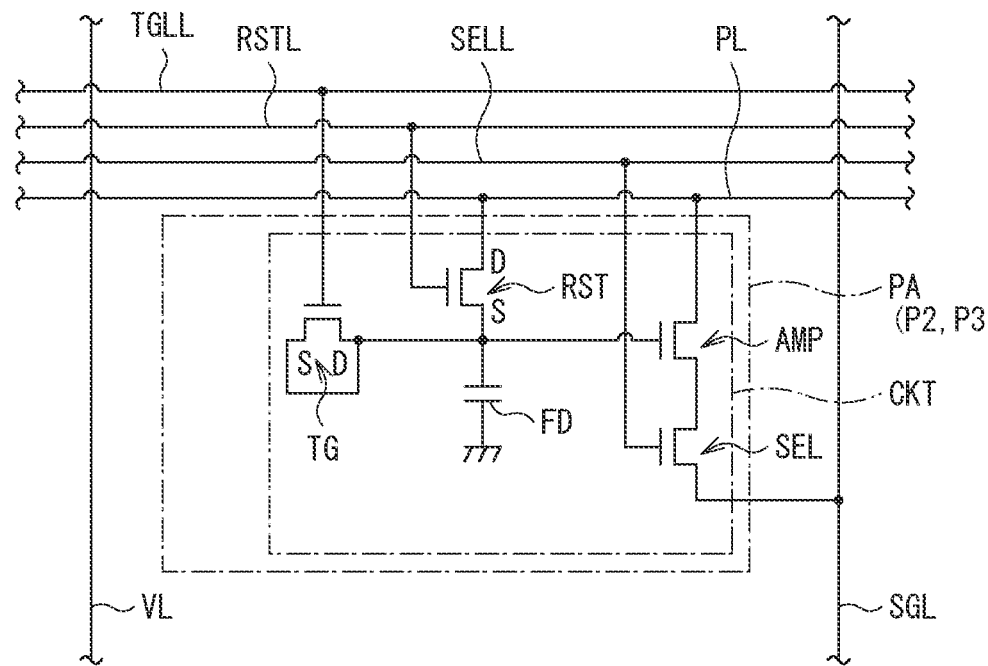
[FIG. 26B]
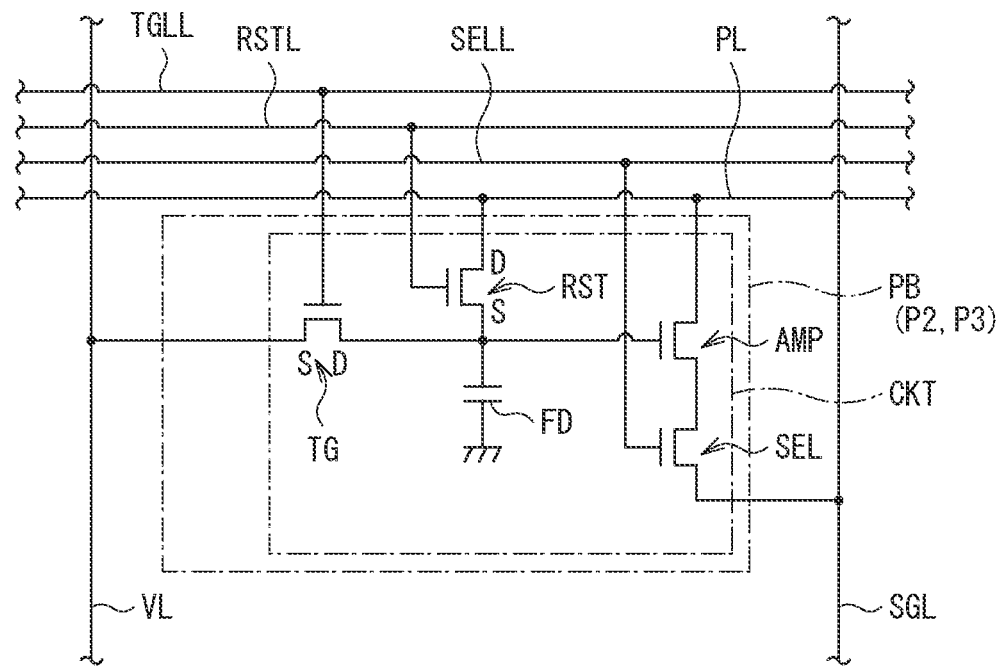

[FIG. 27]
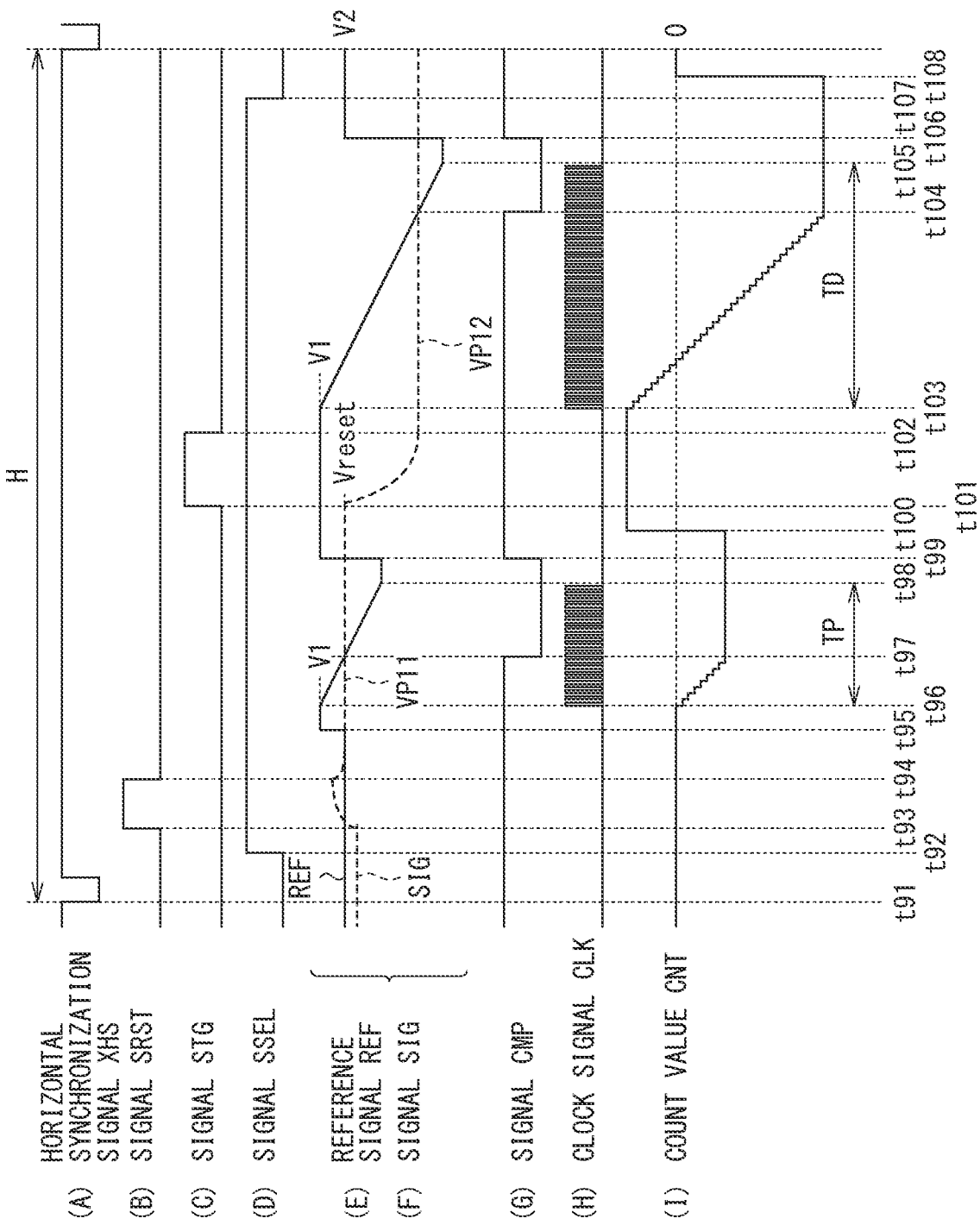

[ FIG. 28 ]
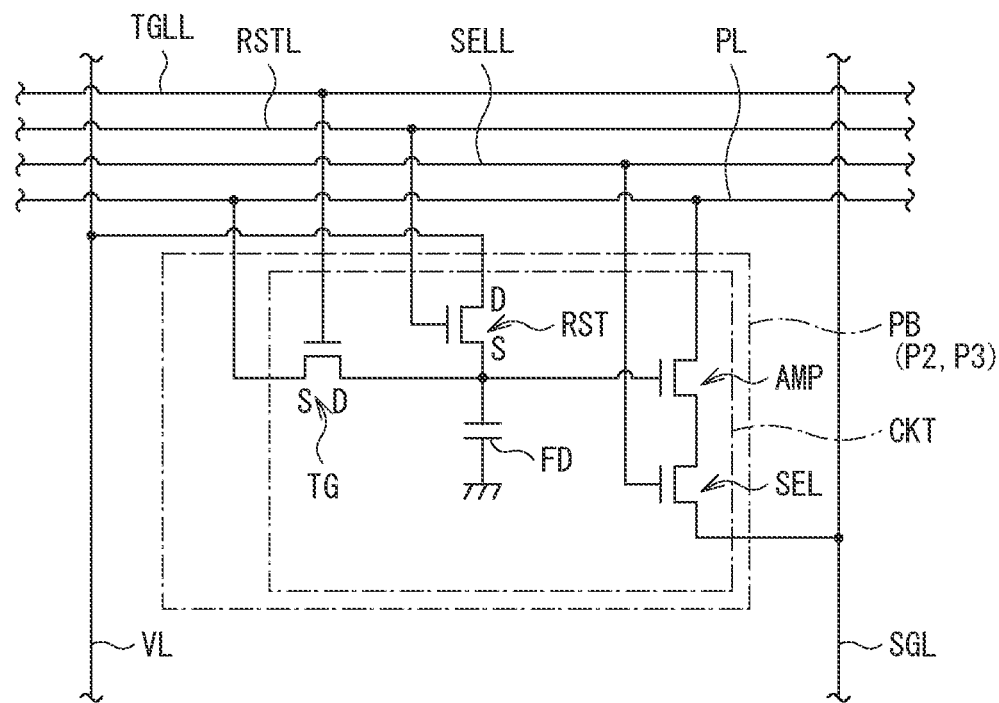
[ FIG. 29 ]
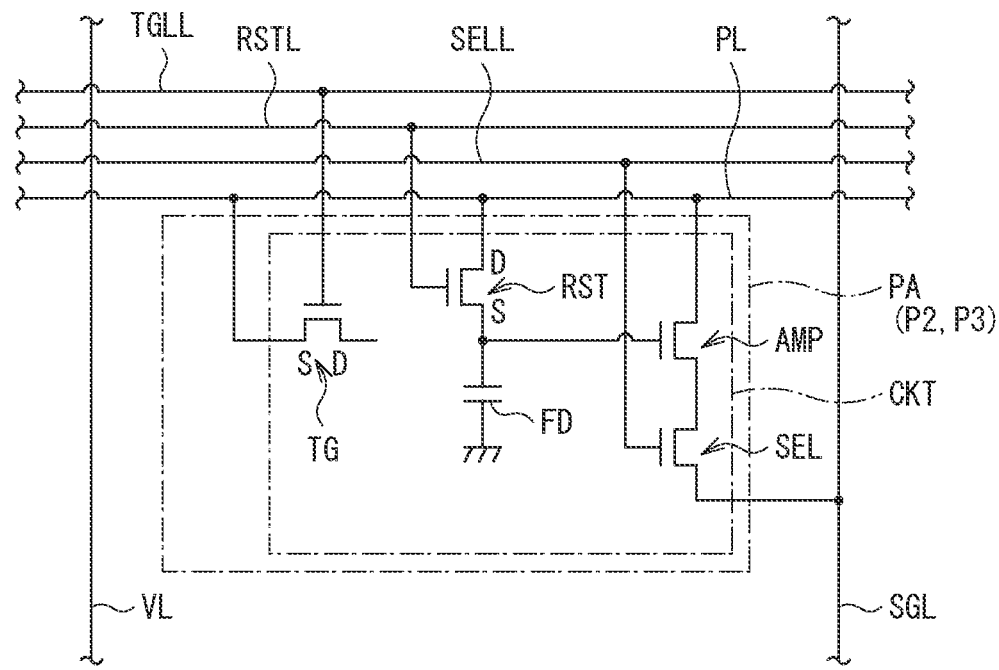

[FIG. 30]
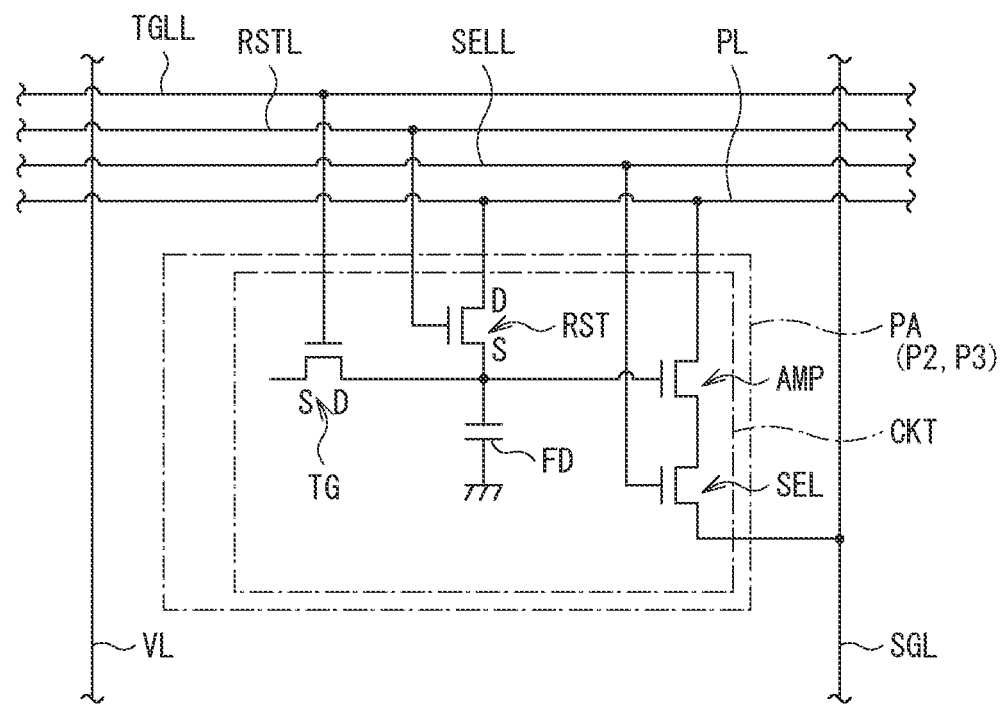

[FIG. 31]
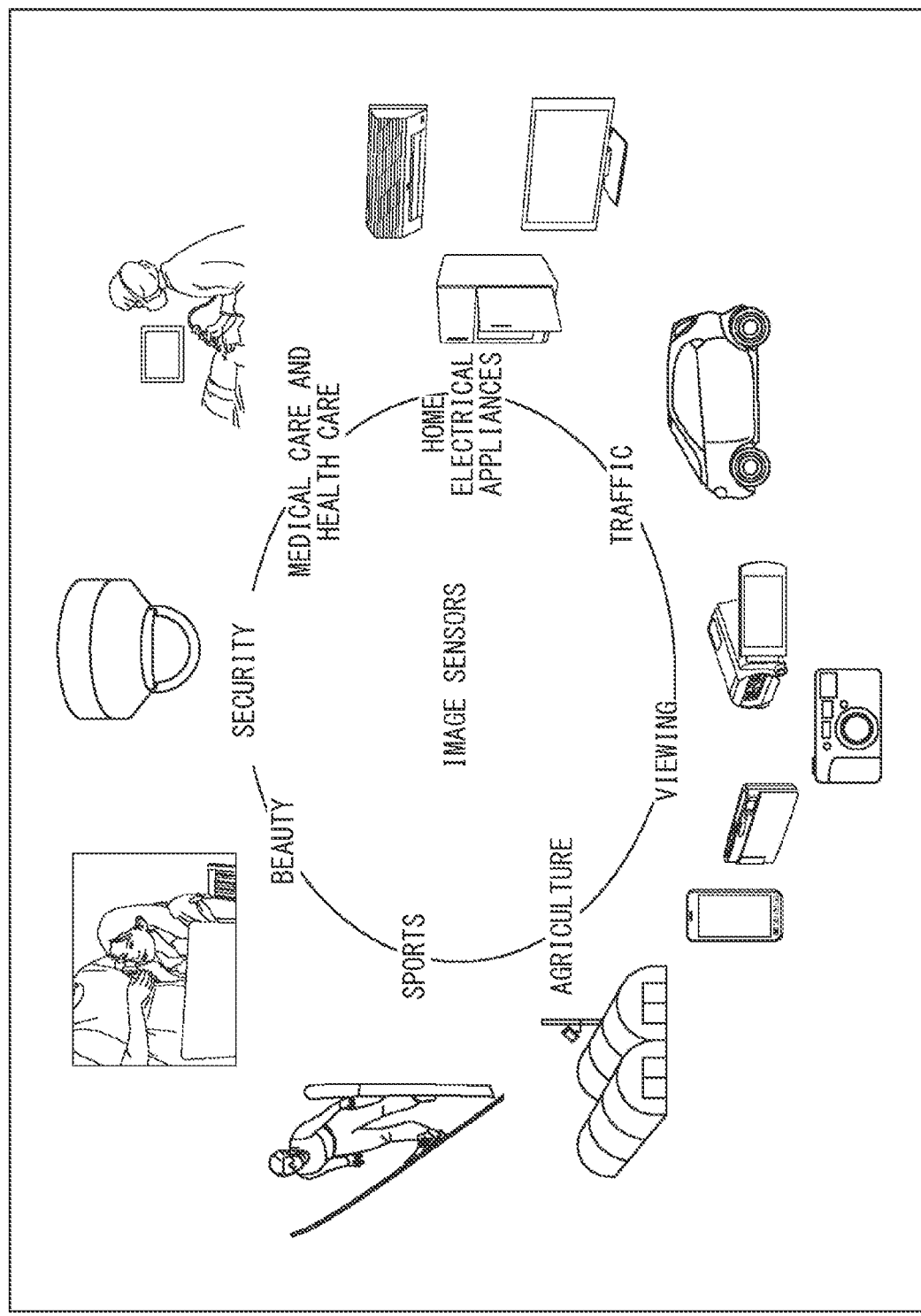

[FIG. 32]
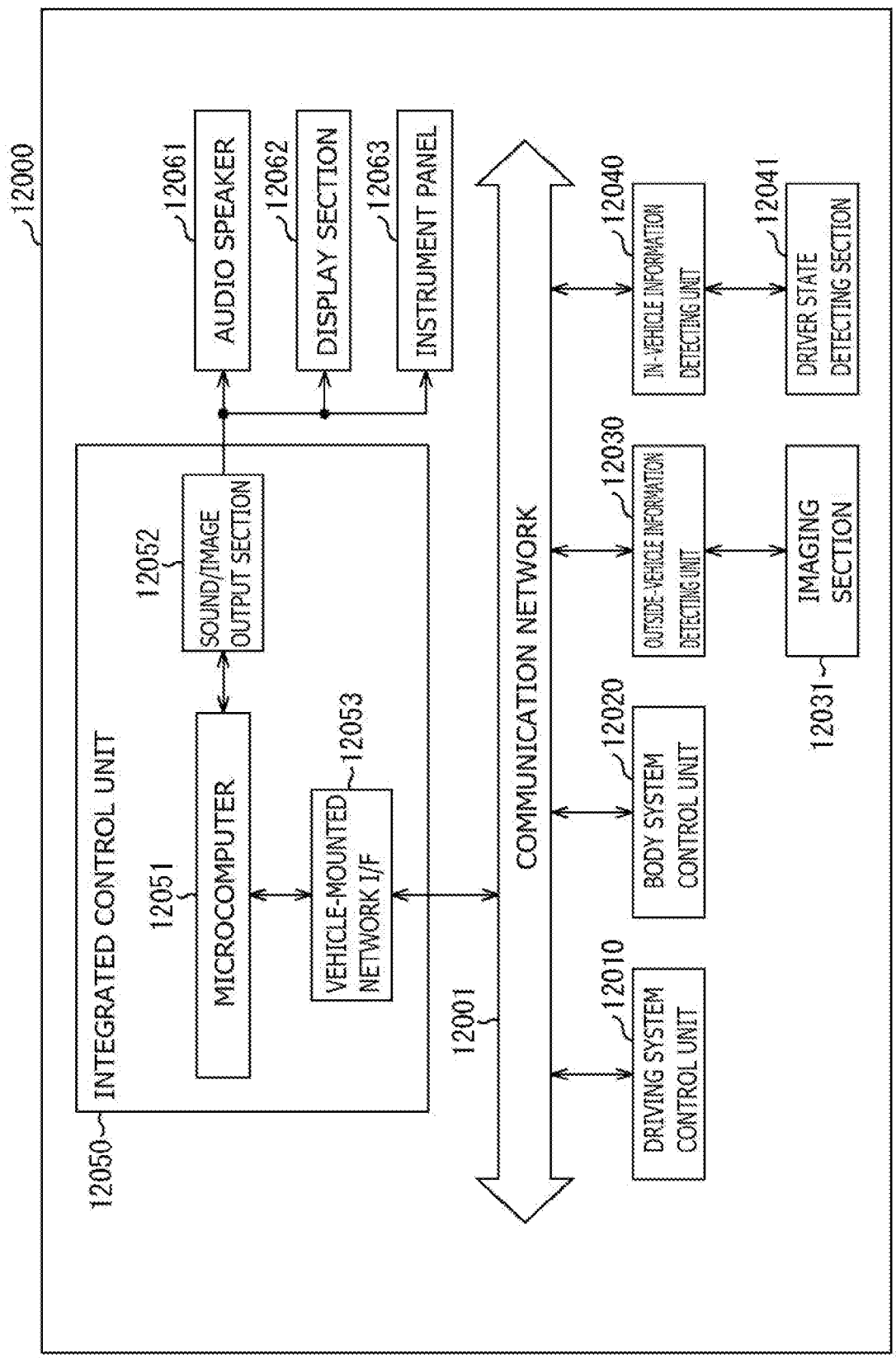

[FIG. 33]
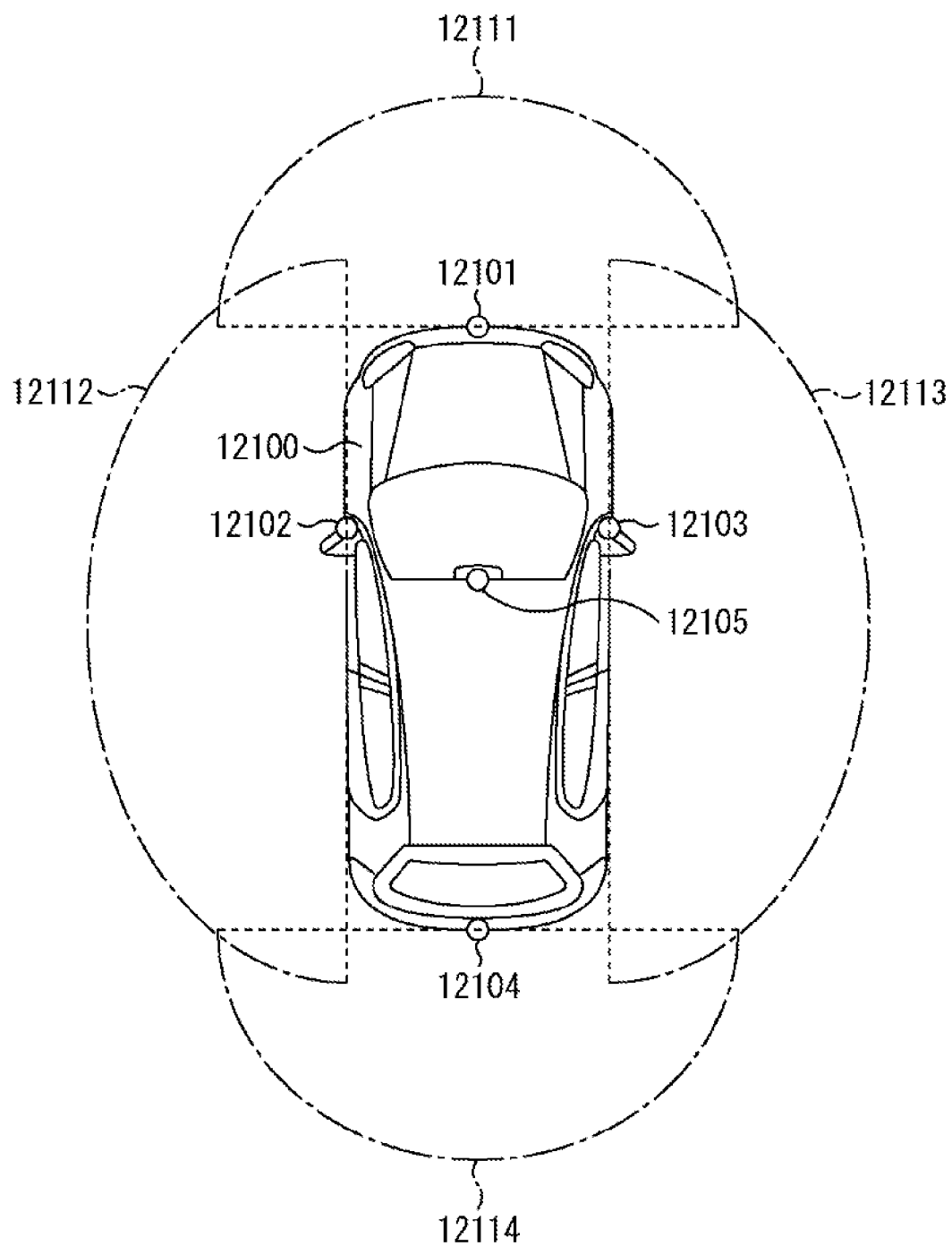

IMAGING DEVICE

TECHNICAL FIELD

The present disclosure relates to an imaging device that performs an imaging operation.

BACKGROUND ART

An imaging device generally includes pixels each including a photodiode arranged in a matrix, and each pixel generates an electric signal corresponding to an amount of received light. Thereafter, for example, an AD converter circuit (Analog to Digital Converter) converts the electric signal (analog signal) generated in each pixel into a digital signal. Some such imaging devices have a BIST (Built-in self test) function (e.g., PTL 1).

CITATION LIST

Patent Literature

PTL 1: U.S. Unexamined Patent Application Publication No. 2005/0231620

SUMMARY OF THE INVENTION

As described above, it is desirable that an imaging device perform self-diagnosis by a BIST function and diagnose presence or absence of a problem.

It is desirable to provide an imaging device that is able to perform self-diagnosis.

A first imaging device according to an embodiment of the present disclosure includes a first light receiving element and a plurality of pixel circuits. The plurality of pixel circuits includes an imaging pixel circuit and a first dummy pixel circuit. Each of the plurality of pixel circuits includes an accumulation section, a first transistor, and an output section. The accumulation section is configured to accumulate electric charge. The first transistor includes a first terminal and a second terminal and is configured to couple, by being turned on, the first terminal and the second terminal to each other. The second terminal is coupled to the accumulation section. The output section is configured to output a voltage corresponding to electric charge accumulated in the accumulation section. The first terminal of the first transistor in the imaging pixel circuit is coupled to the first light receiving element. The first terminal of the first transistor in the first dummy pixel circuit is coupled to the second terminal of the first transistor in the first dummy pixel circuit without involving the first transistor of the first dummy pixel circuit.

Here, the "imaging device" is not limited to a so-called image sensor alone, but includes an imaging system including an image sensor, and also includes an electronic apparatus such as a digital camera or a smartphone having an imaging function.

A second imaging device according to an embodiment of the present disclosure includes a first voltage supply line, a second voltage supply line, a first light receiving element, and a plurality of pixel circuits. The plurality of pixel circuits includes an imaging pixel circuit, a first dummy pixel circuit, and a second dummy pixel circuit. Each of the plurality of pixel circuits includes an accumulation section, a first transistor, a second transistor, and an output section. The accumulation section is configured to accumulate electric charge. The first transistor includes a first terminal and a second terminal and is configured to couple, by being turned on, the first terminal and the second terminal to each other. The second terminal is coupled to the accumulation section. The second transistor includes a first terminal and a second terminal and is configured to couple, by being turned on, the first terminal and the second terminal to each other. The second terminal is configured to be coupled to the accumulation section. The output section is configured to output a voltage corresponding to electric charge accumulated in the accumulation section. In the imaging pixel circuit, the first terminal of the first transistor is coupled to the first light receiving element, and the first terminal of the second transistor is coupled to the first voltage supply line. In the first dummy pixel circuit, the first terminal of the first transistor is coupled to the first voltage supply line, and the first terminal of the second transistor is coupled to the second voltage supply line. In the second dummy pixel circuit, the first terminal of the first transistor is coupled to the second voltage supply line, and the first terminal of the second transistor is coupled to the first voltage supply line.

A third imaging device according to an embodiment of the present disclosure includes a first light receiving element and a plurality of pixel circuits. The plurality of pixel circuits includes an imaging pixel circuit and a first dummy pixel circuit. Each of the plurality of pixel circuits includes an accumulation section, a first transistor, and an output section. The accumulation section is configured to accumulate electric charge. The first transistor includes a first terminal and a second terminal and is configured to couple, by being turned on, the first terminal and the second terminal to each other. The output section is configured to output a voltage corresponding to electric charge accumulated in the accumulation section. In the imaging pixel circuit, the first terminal of the first transistor is coupled to the first light receiving element, and the second terminal of the first transistor is coupled to the accumulation section. In the first dummy pixel circuit, at least one of the first terminal or the second terminal of the first transistor is uncoupled to an element other than the first transistor.

In the first imaging device according to an embodiment of the present disclosure, each of the plurality of pixel circuits is provided with the accumulation section, the first transistor, and the output section. The plurality of pixel circuits includes the imaging pixel circuit and the first dummy pixel circuit. The first terminal of the first transistor in the imaging pixel circuit is coupled to the first light receiving element. The first terminal of the first transistor in the first dummy pixel circuit is coupled to the second terminal of the first transistor in the first dummy pixel circuit without involving the first transistor of the first dummy pixel circuit.

In the second imaging device according to an embodiment of the present disclosure, each of the plurality of pixel circuits is provided with the accumulation section, the first transistor, the second transistor, and the output section. The plurality of pixel circuits includes the imaging pixel circuit, the first dummy pixel circuit, and the second dummy pixel circuit. In the imaging pixel circuit, the first terminal of the first transistor is coupled to the first light receiving element, and the first terminal of the second transistor is coupled to the first voltage supply line. In the first dummy pixel circuit, the first terminal of the first transistor is coupled to the first voltage supply line, and the first terminal of the second transistor is coupled to the second voltage supply line. In the second dummy pixel circuit, the first terminal of the first transistor is coupled to the second voltage supply line, and the first terminal of the second transistor is coupled to the first voltage supply line.

In the third imaging device according to an embodiment of the present disclosure, each of the plurality of pixel circuits is provided with the accumulation section, the first transistor, and the output section. The plurality of pixel circuits includes the imaging pixel circuit and the first dummy pixel circuit. In the imaging pixel circuit, the first terminal of the first transistor is coupled to the first light receiving element, and the second terminal of the first transistor is coupled to the accumulation section. In the first dummy pixel circuit, at least one of the first terminal or the second terminal of the first transistor is uncoupled to an element other than the first transistor.

BRIEF DESCRIPTION OF DRAWINGS

FIG. 1 is a block diagram illustrating a configuration example of an imaging device according to a first embodiment of the present disclosure.

FIG. 2 is a circuit diagram illustrating a configuration example of an imaging pixel illustrated in FIG. 1.

FIG. 3 is an explanatory diagram illustrating a configuration example of a pixel array illustrated in FIG. 1.

FIG. 4A is a circuit diagram illustrating a configuration example of a dummy pixel illustrated in FIG. 1.

FIG. 4B is another circuit diagram illustrating a configuration example of the dummy pixel illustrated in FIG. 1.

FIG. 5 is a table illustrating an example of arrangement of dummy pixels illustrated in FIGS. 4A and 4B.

FIG. 6 is another table illustrating an example of arrangement of the dummy pixels illustrated in FIGS. 4A and 4B.

FIG. 7 is a circuit diagram illustrating a configuration example of a readout unit illustrated in FIG. 1.

FIG. 8 is an explanatory diagram illustrating an implementation example of the imaging device illustrated in FIG. 1.

FIG. 9 is an explanatory diagram illustrating another implementation example of the imaging device illustrated in FIG. 1.

FIG. 10 is a timing chart illustrating an operation example of the imaging device illustrated in FIG. 1.

FIG. 11 is a timing waveform diagram illustrating an operation example of the imaging device illustrated in FIG. 1.

FIG. 12A is a timing waveform diagram illustrating an operation example of the imaging device illustrated in FIG. 1.

FIG. 12B is a timing waveform diagram illustrating an operation example of the imaging device illustrated in FIG. 1.

FIG. 13A is an explanatory diagram illustrating an operation state of the imaging device illustrated in FIG. 1.

FIG. 13B is an explanatory diagram illustrating another operation state of the imaging device illustrated in FIG. 1.

FIG. 13C is an explanatory diagram illustrating another operation state of the imaging device illustrated in FIG. 1.

FIG. 14 is an explanatory diagram illustrating an example of an image composition process in the imaging device illustrated in FIG. 1.

FIG. 15 is an explanatory diagram illustrating an operation example a diagnosis processing unit illustrated in FIG. 1.

FIG. 16 is a circuit diagram illustrating a configuration example of a dummy pixel according to a comparative example.

FIG. 17 is a block diagram illustrating a configuration example of an imaging device according to a modification example of the first embodiment.

FIG. 18 is a circuit diagram illustrating a configuration example of an imaging pixel illustrated in FIG. 17.

FIG. 19A is a circuit diagram illustrating a configuration example of a dummy pixel illustrated in FIG. 17.

FIG. 19B is another circuit diagram illustrating a configuration example of the dummy pixel illustrated in FIG. 17.

FIG. 20 is another circuit diagram illustrating a configuration example of a dummy pixel according to another modification example of the first embodiment.

FIG. 21 is another circuit diagram illustrating a configuration example of a dummy pixel according to another modification example of the first embodiment.

FIG. 22 is another circuit diagram illustrating a configuration example of a dummy pixel according to another modification example of the first embodiment.

FIG. 23 is a block diagram illustrating a configuration example of an imaging device according to a second embodiment.

FIG. 24 is a circuit diagram illustrating a configuration example of an imaging pixel illustrated in FIG. 23.

FIG. 25 is an explanatory diagram illustrating a configuration example of a pixel array illustrated in FIG. 23.

FIG. 26A is a circuit diagram illustrating a configuration example of a dummy pixel illustrated in FIG. 23.

FIG. 26B is another circuit diagram illustrating a configuration example of the dummy pixel illustrated in FIG. 23.

FIG. 27 is a timing waveform diagram illustrating an operation example of the imaging device illustrated in FIG. 23.

FIG. 28 is another circuit diagram illustrating a configuration example of a dummy pixel according to another modification example of the second embodiment.

FIG. 29 is another circuit diagram illustrating a configuration example of a dummy pixel according to another modification example of the second embodiment.

FIG. 30 is another circuit diagram illustrating a configuration example of a dummy pixel according to another modification example of the second embodiment.

FIG. 31 is an explanatory diagram illustrating a usage example of the imaging device.

FIG. 32 is a block diagram depicting an example of schematic configuration of a vehicle control system.

FIG. 33 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. It is to be noted that description is given in the following order.
1. First Embodiment (Example in which each pixel is provided with one light receiving element)
2. Second Embodiment (Example in which each pixel is provided with a plurality of light receiving elements)
3. Usage Example of Imaging Device
4. Example of Application to Mobile Body 1. First Embodiment Configuration Example FIG. 1 illustrates a configuration example of an imaging device (imaging device 1) according to an embodiment. The imaging device 1 includes a pixel array 10, two scanning units 20L and 20R, a readout unit 30, and a control unit 40.

The pixel array 10 has a plurality of imaging pixels P1 arranged in a matrix. The imaging pixels P1 each include a photodiode PD (described below), and are each configured to generate a pixel voltage VP corresponding to an amount of received light. The plurality of imaging pixels P1 is disposed in an imaging pixel region R1. The imaging pixel region R1 is a pixel region in which a subject is imaged, and is a so-called effective pixel region.

The pixel array 10 includes a plurality of dummy pixels P2 and a plurality of dummy pixels P3 in addition to the plurality of imaging pixels P1. The dummy pixels P2 and P3 are each a pixel having no photodiode PD. The plurality of dummy pixels P2 is disposed in dummy pixel regions R21 and R22, and the plurality of dummy pixels P3 is disposed in dummy pixel regions R31 and R32. In this example, the dummy pixel region R31, the dummy pixel region R21, the imaging pixel region R1, the dummy pixel region R22, and the dummy pixel region R32 are disposed in this order from left to right in the horizontal direction (the lateral direction in FIG. 1) in the pixel array 10. The plurality of dummy pixels P3, the plurality of dummy pixels P2, the plurality of imaging pixels P1, the plurality of dummy pixels P2, and the plurality of dummy pixels P3 that are provided side by side for one row in the horizontal direction configures a pixel line L.

Hereinafter, the imaging pixel P1 and the dummy pixels P2 and P3 will be described in detail.

FIG. 2 illustrates a configuration example of the imaging pixel P1. The pixel array 10 includes a plurality of control lines TGLL, a plurality of control lines FDGL, a plurality of control lines RSTL, a plurality of control lines FCGL, a plurality of control lines TGSL, a plurality of control lines SELL, a plurality of power supply lines PL, and a plurality of signal lines SGL.

The control line TGLL extends in the horizontal direction (lateral direction in FIG. 1). The control line TGLL has one end coupled to the scanning unit 20L and the other end coupled to the scanning unit 20R. That is, the control line TGLL is disposed in such a manner as to pass through the dummy pixel region R31, the dummy pixel region R21, the imaging pixel region R1, the dummy pixel region R22, and the dummy pixel region R32. A signal STGL is applied to the control line TGLL by the scanning units 20L and 20R.

The control line FDGL extends in the horizontal direction. The control line FDGL has one end coupled to the scanning unit 20L and the other end coupled to the scanning unit 20R. A signal SFDG is applied to the control line FDGL by the scanning units 20L and 20R.

The control line RSTL extends in the horizontal direction. The control line RSTL has one end coupled to the scanning unit 20L and the other end coupled to the scanning unit 20R. A signal SRST is applied to the control line RSTL by the scanning units 20L and 20R.

The control line FCGL extends in the horizontal direction. The control line FCGL has one end coupled to the scanning unit 20L and the other end coupled to the scanning unit 20R. A signal SFCG is applied to the control line FCGL by the scanning units 20L and 20R.

The control line TGSL extends in the horizontal direction. The control line TGSL has one end coupled to the scanning unit 20L and the other end coupled to the scanning unit 20R. A signal STGS is applied to the control line TGSL by the scanning units 20L and 20R.

The control line SELL extends in the horizontal direction. The control line SELL has one end coupled to the scanning unit 20L and the other end coupled to the scanning unit 20R. A signal SSEL is applied to the control line SELL by the scanning units 20L and 20R.

The power supply line PL is coupled to a voltage generation unit 42 (described below) of the control unit 40. A power supply voltage VDD is applied to the power supply line PL by the voltage generation unit 42.

The signal line SGL extends in the vertical direction (longitudinal direction in FIG. 1), and has one end coupled to the readout unit 30.

The imaging pixel P1 includes photodiodes PD1 and PD2 and a pixel circuit CKT. The pixel circuit CKT includes a transistor TGL, a transistor TGS, a capacitor FC, transistors FCG, RST, and FDG, a floating diffusion FD, and transistors AMP and SEL. Each of the transistors TGL, TGS, FCG, RST, FDG, AMP, and SEL is an N-type MOS (Metal Oxide Semiconductor) transistor in this example.

The photodiode PD1 is a photoelectric conversion element that generates and accumulates electric charge in the amount corresponding to the amount of received light. A light reception region where the photodiode PD1 is able to receive light is wider than a light reception region where the photodiode PD2 is able to receive light. The photodiode PD1 has the anode grounded, and the cathode coupled to the source of the transistor TGL.

The transistor TGL has the gate coupled to the control line TGLL, the source coupled to the cathode of the photodiode PD1, and the drain coupled to the floating diffusion FD.

The photodiode PD2 is a photoelectric conversion element that generates and accumulates electric charge in the amount corresponding to the amount of received light. A light reception region where the photodiode PD2 is able to receive light is narrower than a light reception region where the photodiode PD1 is able to receive light. The photodiode PD2 has the anode grounded, and the cathode coupled to the source of the transistor TGS.

The transistor TGS has the gate coupled to the control line TGSL, the source coupled to the cathode of the photodiode PD2, and the drain coupled to one end of the capacitor FC and the source of the transistor FCG.

The capacitor FC has the one end coupled to the drain of the transistor TGS and the source of the transistor FCG, and the other end coupled to the power supply line PL.

The transistor FCG has the gate coupled to the control line FCGL, the source coupled to the one end of the capacitor FC and the drain of the transistor TGS, and the drain coupled to the source of the transistor RST and the drain of the transistor FDG.

The transistor RST has the gate coupled to the control line RSTL, the drain coupled to the power supply line PL, and the source coupled to the drains of the transistors FCG and FDG.

The transistor FDG has the gate coupled to the control line FDGL, the drain coupled to the source of the transistor RST and the drain of the transistor FCG, and the source coupled to the floating diffusion FD.

The floating diffusion FD is configured to accumulate electric charge supplied from the photodiodes PD1 and PD2, and includes, for example, a diffusion layer formed on a surface of a semiconductor substrate. FIG. 2 illustrates the floating diffusion FD by using a symbol of a capacitor.

The transistor AMP has the gate coupled to the floating diffusion FD, the drain coupled to the power supply line PL, and the source coupled to the drain of the transistor SEL.

The transistor SEL has the gate coupled to the control line SELL, the drain coupled to the source of the transistor AMP, and the source coupled to the signal line SGL.

This configuration electrically couples the imaging pixel P1 to the signal line SGL by turning on the transistor SEL on the basis of the signal SSEL applied to the control line SELL in the imaging pixel P1. This couples the transistor AMP to a current source 35 (described below) of the readout unit 30, and the transistor AMP operates as a so-called source follower. The imaging pixel P1 then outputs, as a signal SIG, the pixel voltage VP corresponding to the voltage of the floating diffusion FD to the signal line SGL. Specifically, the imaging pixel P1 sequentially outputs eight pixel voltages VP (VP1 to VP8) in eight periods (conversion periods T1 to T8) within a so-called horizontal period H as described below.

FIG. 3 illustrates an example of arrangement of the photodiodes PD1 and PD2 in the imaging pixel region R1 of the pixel array 10. In FIG. 3, "R" represents a red color filter, "G" represents a green color filter, and "B" represents a blue color filter. In each imaging pixel P1, the photodiode PD2 is formed on the upper right of the photodiode PD1. Color filters of the same color are formed on the two photodiodes PD1 and PD2 in each imaging pixel P1. In this example, the photodiode PD1 has an octagonal shape, and the photodiode PD2 has a quadrangular shape. As illustrated in this diagram, a light reception region where the photodiode PD1 is able to receive light is wider than a light reception region where the photodiode PD2 is able to receive light.

FIGS. 4A and 4B illustrate a configuration example of the dummy pixel P2 in the dummy pixel regions R21 and R22 and a configuration example of the dummy pixel P3 in the dummy pixel regions R31 and R32. In the dummy pixel regions R21 and R22, the dummy pixel PA or the dummy pixel PB is selectively disposed as the dummy pixel P2, and, in the dummy pixel regions R31 and R32, the dummy pixel PA or the dummy pixel PB is selectively disposed as the dummy pixel P3. FIG. 3A illustrates an example of the dummy pixel PA, and FIG. 3B illustrates an example of the dummy pixel PB. The pixel array 10 includes, in the dummy pixel regions R21, R22, R31, and R32, the plurality of control lines TGLL, the plurality of control lines FDGL, the plurality of control lines RSTL, the plurality of control lines FCGL, the plurality of control lines TGSL, the plurality of control lines SELL, the plurality of power supply lines PL, the plurality of voltage supply lines VL, and the plurality of signal lines SGL. The voltage supply line VL is coupled to the voltage generation unit 42 (described below) of the control unit 40. A single voltage signal SVR is applied to the plurality of voltage supply lines VL by the voltage generation unit 42. The voltage signal SVR is a signal that vanes between a predetermined voltage VR and the power supply voltage VDD. The voltage VR is a voltage lower than the power supply voltage VDD. The voltage signal SVR is set to the voltage VR, for example, in a period in which the transistors TGL and TGS in readout driving D2 described below is turned on, and is set to the power supply voltage VDD, for example, in a period in which the transistors TGL and TGS in accumulation start driving D1 described below is turned on.

In the pixel circuit CKT of the dummy pixel PA, the drain and the source of the transistor TGL are coupled to each other, and the drain and the source of the transistor TGS are coupled to each other. In other words, in the dummy pixel PA, the drain and the source of the transistor TGL are coupled to each other without involving the transistor TGL, and the drain and the source of the transistor TGS are coupled to each other without involving the transistor TGS. With such a configuration, in the dummy pixel PA, the voltage of the floating diffusion FD is set to the power supply voltage VDD in the readout driving D2, as will be described later. The dummy pixel PA then outputs, as the signal SIG, the pixel voltage VP corresponding to the voltage of the floating diffusion FD to the signal line SGL. Specifically, similarly to the imaging pixel P1, the dummy pixel PA sequentially outputs eight pixel voltages VP (VP1 to VP8) in eight periods (conversion periods T1 to T8) within a so-called horizontal period H.

Further, in the pixel circuit CKT of the dummy pixel PB, the source of the transistor TGL is coupled to the voltage supply line VL and the source of the transistor TGS is coupled to the voltage supply line VL. With such a configuration, in the dummy pixel PB, the voltage of the floating diffusion FD is set to the voltage VR by turning on the transistors TGL and TGS in the readout driving D2, as will be described later. The dummy pixel PB then outputs, as the signal SIG, the pixel voltage VP corresponding to the voltage of the floating diffusion FD to the signal line SGL. Specifically, similarly to the imaging pixel P1, the dummy pixel PB sequentially outputs eight pixel voltages VP (VP1 to VP8) in eight periods (conversion periods T1 to T8) within a so-called horizontal period H.

FIG. 5 illustrates arrangement of the dummy pixels P3 and P2 in the dummy pixel regions R31 and R21. FIG. 6 illustrates arrangement of the dummy pixels P2 and P3 in the dummy pixel regions R22 and R32. In FIGS. 5 and 6, "0" indicates the dummy pixel PA, and "1" indicates the dummy pixel PB.

As illustrated in FIG. 5, one pixel line L includes: two dummy pixels P3 (dummy pixels P3[1] and P3[0]) in the dummy pixel region R31; and 11 dummy pixels P2 (dummy pixels P2[10] to P2[0]) in the dummy pixel region R21. Similarly, as illustrated in FIG. 6, one pixel line L includes: 11 dummy pixels P2 (dummy pixels P2[10] to P2[0] in the dummy pixel region R22; and two dummy pixels P3 (dummy pixels P3[1] and P3[0]) in the dummy pixel region R32.

In the dummy pixel region R31 (FIG. 5), the arrangement of the dummy pixels P3 in each pixel line L is "10". In the imaging device 1, the arrangement of the two dummy pixels P3 in the dummy pixel region R31 functions as left-end identification information INFL identifying the left end of the pixel array 10.

Similarly, in the dummy pixel region R32 (FIG. 6), the arrangement of the dummy pixels P3 in each pixel line L is "01". In the imaging device 1, the arrangement of the two dummy pixels P3 in the dummy pixel region R31 functions as right-end identification information INFR identifying the right end of the pixel array 10.

Further, in the dummy pixel region R21 (FIG. 5), in the 0th pixel line L[0], the arrangement of the dummy pixels P2 is "00000000000". That is, all of the 11 dummy pixels P2[10] to P2[0] are the dummy pixels PA. In the first pixel line L[1], the arrangement of the dummy pixels P2 is "00000000001". That is, the dummy pixel P2[0] is the dummy pixel PB, and the other dummy pixels P2[10] to P2[1] are the dummy pixels PA. In the second pixel line L[2], the arrangement of the dummy pixels P2 is "00000000010". That is, the dummy pixel P2[1] is the dummy pixel PB, and the other dummy pixels P2[10] to P2[2] and P2[0] are the dummy pixels PA. In this manner, the arrangement of the dummy pixels P2 is set so as to be different from each other between the pixel lines L. In particular, the arrangement of the dummy pixels P2 in this case corresponds to the sequential order of the pixel line L represented by a binary number. In this case, the 11 dummy pixels P2 are provided, so that it is possible to express the sequential orders of the 2048 pixel lines L. That is, the arrangement of the 11 dummy pixels P2 functions as line identification information INF identifying the pixel line L. It is to be noted that, although the above describes the dummy pixel region R21 as the example, the same applies to the dummy pixel region R22 (FIG. 6).

The two scanning units 20L and 20R (FIG. 1) are configured to sequentially drive the imaging pixels P1 and the dummy pixels P2 and P3 in the pixel array 10 in units of pixel lines L on the basis of an instruction from the control unit 40. The scanning unit 20L includes an address decoder 21L, a logic section 22L, and a driver section 23L. Similarly, the scanning unit 20R includes an address decoder 21R, a logic section 22R, and a driver section 23R.

The address decoder 21L is configured to select the pixel line L in the pixel array 10 on the basis of an address signal ADR supplied from the control unit 40. The pixel line L corresponds to the address indicated by the address signal ADR. The logic section 22L is configured to generate signals STGL1, SFDG1, SRST1, SFCG1, STGS1, and SSEL1 corresponding to the respective pixel lines L on the basis of an instruction from the address decoder 21L. The driver section 23L is configured to respectively generate the signals STGL, SFDG, SRST, SFCG, STGS, and SSEL corresponding to the respective pixel lines L on the basis of the signals STGL1, SFDG1, SRST1, SFCG1, STGS1, and SSEL1 corresponding to the respective pixel lines L. The same applies to the address decoder 21R, the logic section 22R, and the driver section 23R. The address signal ADR supplied to the address decoder 21R is the same as the address signal ADR supplied to the address decoder 21L. Accordingly, the address decoders 21L and 21R select the same pixel line L on the basis of the address signal ADR. Thus, the scanning units 20L and 20R sequentially drive the imaging pixels P1 and the dummy pixels P2 and P3 in the pixel array 10 in units of the pixel lines L from both the left and right sides of the pixel array 10.

The readout unit 30 is configured to perform AD conversion on the basis of the signal SIG supplied from the pixel array 10 via the signal line SGL, thereby generating an image signal DATA0.

FIG. 7 illustrates a configuration example of the readout unit 30. It is to be noted that FIG. 7 also illustrates the control unit 40 in addition to the readout unit 30. The readout unit 30 includes a readout controller 31, a reference signal generation unit 32, a plurality of AD (Analog to Digital) conversion sections ADC (AD conversion sections ADC[0], ADC[1], ADC[2], . . . ), a plurality of switch sections SW (switch sections SW[0], SW[1], SW[2], . . . ), and a bus wiring line 100.

The readout controller 31 is configured to control a read operation performed by the readout unit 30 on the basis of an instruction from the control unit 40. Specifically, the readout controller 31 supplies the reference signal generation unit 32 with a control signal, thereby causing the reference signal generation unit 32 to generate a reference signal REF (described below). Further, the readout controller 31 supplies the plurality of AD conversion sections ADC with a clock signal CLK and a control signal CC, thereby controlling AD conversion operations performed by the plurality of AD conversion sections ADC.

The reference signal generation unit 32 is configured to generate the reference signal REF. The reference signal REF has a so-called ramp waveform in which a voltage level gradually decreases with the lapse of time in the eight periods (conversion periods T1 to T8) for performing AD conversion. The reference signal generation unit 32 is configured to be able to change a slope of the ramp waveform in the reference signal REF. In the imaging device 1, it is possible to change an imaging sensitivity by changing the slope of the ramp waveform. As a result, it is possible to image a bright subject and a dark subject. Thereafter, the reference signal generation unit 32 supplies the generated reference signal REF to the plurality of AD conversion sections ADC.

The AD conversion sections ADC are each configured to perform AD conversion on the basis of the signal SIG supplied from the pixel array 10 to convert the voltage of the signal SIG into a digital code CODE. The plurality of AD conversion sections ADC is provided in association with the plurality of signal lines SGL. Specifically, the 0th AD conversion section ADC[0] is provided in association with a 0th signal line SGL[0], the first AD conversion section ADC[1] is provided in association with a first signal line SGL[1], and the second AD conversion section ADC[2] is provided in association with a second signal line SGL[2].

The AD conversion sections ADC each include capacitors 33 and 34, the current source 35, a comparator 36, a counter 37, and a latch 38. The capacitor 33 has one end supplied with the reference signal REF and the other end coupled to the positive input terminal of the comparator 36. The capacitor 34 has one end coupled to the signal line SGL and the other end coupled to the negative input terminal of the comparator 36. The current source 35 is configured to allow a current having a predetermined current value to flow from the signal line SGL to the ground. The comparator 36 is configured to compare the input voltage at the positive input terminal and the input voltage at the negative input terminal, and to output a result of the comparison as a signal CMP. The comparator 36 has the positive input terminal supplied with the reference signal REF via the capacitor 33, and the negative input terminal supplied with the signal SIG via the capacitor 34. This comparator 36 also has a function of making a zero adjustment that sets voltages of the capacitors 33 and 34 in a predetermined period described below. The counter 37 performs a counting operation on the basis of the signal CMP supplied from the comparator 36, and the clock signal CLK and the control signal CC supplied from the readout controller 31. The latch 38 is configured to retain a count value CNT as the digital code CODE having a plurality of bits. The count value CNT is obtained by the counter 37.

The switch sections SW are each configured to supply the bus wiring line 100 with the digital code CODE outputted from the AD conversion section ADC on the basis of a control signal SSW supplied from the control unit 40. The plurality of switch sections SW is provided in association with the plurality of AD conversion sections ADC. Specifically, the 0th switch section SW[0] is provided in association with the 0th AD conversion section ADC[0], the first switch section SW[1] is provided in association with the first AD conversion section ADC[1], and the second switch section SW[2] is provided in association with the second AD conversion section ADC[2].

The switch sections SW each include the same number of transistors as the number of bits of the digital code CODE in this example. These transistors are controlled to be turned on and off on the basis of the respective bits of the control signals SSW (control signals SSW[1], SSW[1], SSW[2], . . . ) supplied from the control unit 40. Specifically, for example, turning on the respective transistors on the basis of the control signal SSW[0] causes the 0th switch section SW[0] to supply the digital code CODE outputted from the 0th AD conversion section ADC[0] to the bus wiring line 100. Similarly, for example, turning on the respective transistors on the basis of the control signal SSW[1] causes the first switch section SW[1] to supply the digital code CODE outputted from the first AD conversion section ADC[1] to the bus wiring line 100. The same applies to the other switch sections SW.

The bus wiring line 100 is configured to include a plurality of wiring lines, and transmits the digital codes CODE outputted from the AD conversion sections ADC. The readout unit 30 uses this bus wiring line 100 to sequentially transfer the plurality of digital codes CODE supplied from the AD conversion sections ADC to the control unit 40 as the image signals DATA0 (data transfer operation).

The control unit 40 (FIG. 1) is configured to supply control signals to the scanning units 20L and 20R and the readout unit 30, thereby controlling the operation of the imaging device 1. The control unit 40 includes an address generation unit 41, the voltage generation unit 42, a column scanning unit 43, an image processing unit 44, and a diagnosis processing unit 45.

The address generation unit 41 is configured to determine the pixel line L to be driven in the pixel array 10 and to generate the address signal ADR indicating an address corresponding to the pixel line L. The address generation unit 41 then supplies the generated address signal ADR to the address decoder 21L of the scanning unit 20L and to the address decoder 21R of the scanning unit 20R.

The voltage generation unit 42 is configured to generate the voltage signal SVR and the power supply voltage VDD. The voltage signal SVR is a signal that varies between the predetermined voltage VR and the power supply voltage VDD. The voltage VR is a voltage lower than the power supply voltage VDD. The voltage signal SVR is set to the voltage VR, for example, in a period in which the transistors TGL and TGS in the readout driving D2 described below is turned on, and is set to the power supply voltage VDD, for example, in the accumulation start driving D1 described below. Thereafter, the voltage generation unit 42 supplies the generated voltage signal SVR to each of the plurality of voltage supply lines VL in the pixel array 10, and supplies the generated power supply voltage VDD to each of the plurality of power supply lines PL in the pixel array 10.

The column scanning unit 43 is configured to determine the AD conversion section ADC in the readout unit 30 to be a target of the data transfer operation, and to generate a control signal SSW on the basis of a result of the determination. The column scanning unit 43 then supplies the generated control signal SSW to each of the plurality of switch sections SW of the readout unit 30.

The image processing unit 44 is configured to perform predetermined image processing on an image indicated by the image signal DATA0. The predetermined image processing includes, for example, an image composition process. In the image composition process, the image processing unit 44 generates, on the basis of the eight digital codes CODE (digital codes CODE1 to CODE8) supplied from the readout unit 30 and obtained in the eight periods (conversion periods T1 to T8) for performing AD conversion for each pixel, four pixel values VAL1 to VAL4 for the relevant pixel, and generates a pixel value VAL for the relevant pixel by combining the four pixel values VAL1 to VAL4. The image processing unit 44 generates this pixel value VAL for each of all the pixels included in the pixel array 10. The image processing unit 44 then outputs the pixel values VAL for the imaging pixels P1 as the image signals DATA. It is to be noted that, in this example, the image processing unit 44 generates the pixel value VAL by combining the four pixel values VAL1 to VAL4; however, the present disclosure is not limited thereto. For example, the four pixel values VAL1 to VAL4 may be outputted as they are. Further, the image processing unit 44 supplies the diagnosis processing unit 45 with the pixel values VAL1 to VAL4 for the dummy pixels P2 and P3 as an image signal DATA1.

The diagnosis processing unit 45 is configured to perform a diagnosis process on the basis of the address signal ADR and the image signal DATA1. Specifically, the diagnosis processing unit 45 determines the left-end identification information INFL and the right-end identification information INFR on the basis of the pixel values VAL1 to VAL4 for the dummy pixels P3 included in the image signal DATA1, and determines the line identification information INF on the basis of the pixel values VAL for the dummy pixels P2 included in the image signal DATA1. The diagnosis processing unit 45 then diagnoses whether the imaging device 1 is performing a desired operation by comparing the address indicated by the address signal ADR with the line identification information INF. Thereafter, the diagnosis processing unit 45 outputs a result of the diagnosis process (diagnosis result RES).

Next, some implementation examples of the imaging device 1 will be described.

FIG. 8 illustrates an implementation example E1 of the imaging device 1. In this implementation example E1, the imaging device 1 is formed on one semiconductor chip 200. The pixel array 10 is disposed around the middle of the semiconductor chip 200. The scanning unit 20L is disposed on the left of the pixel array 10 and the scanning unit 20R is disposed on the right of the pixel array 10. The readout unit 30 and the column scanning unit 43 of the control unit 40 are disposed on the lower part of the pixel array 10. A controller 40A is disposed on the upper part of the pixel array 10. The controller 40A corresponds to a circuit other than the column scanning unit 43 of the control unit 40.

In this configuration, the address generation unit 41 in the controller 40A supplies the address signal ADR to the scanning units 20L and 20R. The scanning units 20L and 20R supply signals STGL, SFDG, SRST, SFCG, STGS, SSEL to the pixel array 10. The voltage generation unit 42 in the controller 40A supplies the voltage signal SVR and the power supply voltage VDD to the pixel array 10. The pixel array 10 supplies the signal SIG to the readout unit 30. The readout unit 30 supplies the image signal DATA0 to the image processing unit 44 in the controller 40A. The imaging device 1 performs the diagnosis process, thereby making it possible to detect, for example, a problem of an operation of each circuit and a problem of connection such as open-circuit or short-circuit of various wiring lines in the semiconductor chip 200.

FIG. 9 illustrates other implementation example E2 of the imaging device 1. In this implementation example E2, the imaging device 1 is formed on two semiconductor chips 201 and 202.

In this example, the pixel array 10 is formed on the semiconductor chip 201. That is, the plurality of imaging pixels P1, the plurality of dummy pixels P2, P3, the control lines TGLL, FDGL, RSTL, FCGL, TGSL, and SELL, the power supply line PL, the voltage supply line VL, and the signal line SGL are formed on the semiconductor chip 201. Further, the semiconductor chip 201 is also provided with electrode regions 201A, 201B, and 201C. The electrode region 201A is disposed near the left side of the semiconductor chip 201, the electrode region 201B is disposed near the right side of the semiconductor chip 201, and the electrode region 201C is disposed near the lower side of the semiconductor chip 201. A plurality of electrodes is provided in the electrode region 201A, and the plurality of electrodes is coupled to the control lines TGLL, FDGL, RSTL, FCGL, TGSL, and SELL, the power supply line PL, and the voltage supply line VL in the pixel array 10, through vias such as TCVs (Through Chip Vias). A plurality of electrodes is provided in the electrode region 201B, and the plurality of electrodes is coupled to the control lines TGLL, FDGL, RSTL, FCGL, TGSL, and SELL, the power supply line PL, and the voltage supply line VL in the pixel array 10, through vias such as the TCVs. A plurality of electrodes is provided in the electrode region 201C, and the plurality of electrodes is coupled to the plurality of signal lines SGL in the pixel array 10, through vias such as the TCVs.

In this example, the scanning units 20L and 20R, the controller 40A, the column scanning unit 43, and the readout unit 30 are formed on the semiconductor chip 202. The controller 40A, the column scanning unit 43, and the readout unit 30 are disposed around the middle of the semiconductor chip 202. The scanning unit 20L is disposed on the left of the controller 40A, the column scanning unit 43, and the readout unit 30, and the scanning unit 20R is disposed on the right of the controller 40A, the column scanning unit 43, and the readout unit 30. Further, the semiconductor chip 202 is provided with electrode regions 202A, 202B, and 202C. The electrode region 202A is provided near the left side of the semiconductor chip 202 in such a manner as to be adjacent to the scanning unit 20L. The electrode region 202B is provided near the right side of the semiconductor chip 202 in such a manner as to be adjacent to the scanning unit 20R. The electrode region 202C is provided near the lower side of the semiconductor chip 202 in such a manner as to be adjacent to the readout unit 30. A plurality of electrodes is provided in the electrode region 202A, and the plurality of electrodes is coupled to the scanning unit 20L, and to the voltage generation unit 42 in the controller 40A, through vias such as the TCVs. A plurality of electrodes is provided in the electrode region 202B, and the plurality of electrodes is coupled to the scanning unit 20R, and to the voltage generation unit 42 in the controller 40A, through vias such as the TCVs. A plurality of electrodes is provided in the electrode region 202C, and the plurality of electrodes is coupled to the readout unit 30, through vias such as the TCVs.

In this implementation example E2, the semiconductor chip 201 and the semiconductor chip 202 are stuck to each other. Thus, the plurality of electrodes in the electrode region 201A of the semiconductor chip 201 is electrically coupled to the plurality of electrodes in the electrode region 202A of the semiconductor chip 202, the plurality of electrodes in the electrode region 201B of the semiconductor chip 201 is electrically coupled to the plurality of electrodes in the electrode region 202B of the semiconductor chip 202, and the plurality of electrodes in the electrode region 201C of the semiconductor chip 201 is electrically coupled to the plurality of electrodes in the electrode region 202C of the semiconductor chip 202.

In this configuration, the address generation unit 41 in the controller 40A of the semiconductor chip 202 provides the address signal ADR to the scanning units 20L and 20R. The scanning units 20L and 20R of the semiconductor chip 202 supply the control lines TGLL, FDGL, RSTL, FCGL, TGSL, and SELL to the pixel array 10 of the semiconductor chip 201 through the plurality of electrodes in the electrode regions 201A and 202A and the plurality of electrodes in the electrode regions 201B and 202B. The voltage generation unit 42 in the controller 40A of the semiconductor chip 202 supplies the voltage signal SVR and the power supply voltage VDD to the pixel array 10 of the semiconductor chip 201 through the plurality of electrodes in the electrode regions 201A and 202A and the plurality of electrodes in the electrode regions 201B and 202B. The pixel array 10 of the semiconductor chip 201 supplies the signal SIG to the readout unit 30 of the semiconductor chip 202 through the plurality of electrodes in the electrode region 201C. In the semiconductor chip 202, the readout unit 30 supplies the image signal DATA0 to the image processing unit 44 in the controller 40A. The imaging device 1 performs the diagnosis process, thereby making it possible to detect, for example, a problem of an operation of each circuit, a problem of connection such as open-circuit or short-circuit of various wiring lines in the semiconductor chips 201 and 202, and a connection failure between the semiconductor chip 201 and the semiconductor chip 202.

In addition, mainly disposing the pixel array 10 on the semiconductor chip 201 in this manner makes it possible to manufacture the semiconductor chip 201 using a semiconductor-manufacturing process specialized for pixels. That is, since the semiconductor chip 201 has no transistor other than the pixel array 10, a circuit other than the pixel array 10 is not influenced even if there is a process of annealing at 1000 degrees, for example. In manufacturing the semiconductor chip 201, it is thus possible to introduce, for example, high-temperature processes against white spots. As a result, it is possible to improve characteristics of the imaging device 1.

Here, the photodiode PD1 corresponds to a specific example of a "first light receiving element" in the present disclosure. The photodiode PD2 corresponds to a specific example of a "second light receiving element" in the present disclosure. The pixel circuit CKT of the imaging pixel P1 corresponds to a specific example of an "imaging pixel circuit" in the present disclosure. The pixel circuit CKT of the dummy pixel PA corresponds to a specific example of a "first dummy pixel circuit" in the present disclosure. The pixel circuit CKT of the dummy pixel PB corresponds to a specific example of a "second dummy pixel circuit" in the present disclosure. The floating diffusion FD corresponds to a specific example of an "accumulation section" in the present disclosure. The transistor TGL corresponds to a specific example of a "first transistor" in the present disclosure. The transistors AMP and SEL correspond to a specific example of an "output section" in the present disclosure. The transistor RST corresponds to a specific example of a "second transistor" in the present disclosure. The transistor TGS corresponds to a specific example of a "third transistor" in the present disclosure. The transistor FCG corresponds to a specific example of a "fourth transistor" in the present disclosure. The transistor FDG corresponds to a specific example of a "fifth transistor" in the present disclosure. The capacitor FC corresponds to a specific example of a "capacitor" in the present disclosure. The voltage supply line VL corresponds to a specific example of a "voltage supply line" in the present disclosure. The address generation unit 41 corresponds to a specific example of an "address generation unit" in the present disclosure. The scanning units 20L and 20R correspond to a specific example of a "drive controller" in the present disclosure. The readout unit 30, the image processing unit 44, and the diagnosis processing unit 45 correspond to a specific example of a "diagnosis unit" in the present disclosure.

[Operations and Workings]

Subsequently, the operations and workings of the imaging device 1 according to the present embodiment are described.

(Overview of Overall Operation)

First, an overview of the overall operation of the imaging device 1 is described with reference to FIG. 1. The address generation unit 41 of the control unit 40 determines the pixel line L to be driven in the pixel array 10 and generates the address signal ADR indicating the address corresponding to the pixel line L. The two scanning units 20L and 20R sequentially drive the imaging pixels P1 and the dummy pixels P2 and P3 in the pixel array 10 in units of pixel lines L on the basis of the instruction from the control unit 40. The voltage generation unit 42 of the control unit 40 generate the voltage signal SVR and the power supply voltage VDD. The imaging pixel P1 and the dummy pixels P2 and P3 in the pixel array 10 each sequentially output eight pixel voltages VP1 to VP8 in eight conversion periods T1 to T8. The respective AD conversion sections ADC of the readout unit 30 perform AD conversion on the basis of these eight pixel voltages VP1 to VP8, and output the eight digital codes CODE (digital codes CODE1 to CODE8). The image processing unit 44 of the control unit 40 generates, on the basis of the eight digital codes CODE1 to CODE8 for each pixel included in the image signal DATA0, four pixel values VAL1 to VAL4 for the relevant pixel, and generates the pixel value VAL for the relevant pixel by combining the four pixel values VAL1 to VAL4. The image processing unit 44 outputs the pixel value VAL for the imaging pixel P1 as the image signal DATA. Further, the image processing unit 44 supplies the diagnosis processing unit 45 with the pixel values VAL1 to VAL4 for the dummy pixels P2 and P3 as the image signal DATA1. The diagnosis processing unit 45 of the control unit 40 performs the diagnosis process on the basis of the address signal ADR and the image signal DATA1, and outputs the diagnosis result RES.

(Detailed Operation)

In the imaging device 1, each imaging pixel P1 in the pixel array 10 accumulates electric charge in accordance with the amount of received light, and outputs the pixel voltage VP as the signal SIG. The following describes this operation in detail.

FIG. 10 illustrates an example of an operation of scanning the plurality of imaging pixels P1 and the plurality of dummy pixels P2 and P3 in the pixel array 10.

The imaging device 1 performs the accumulation start driving D1 on the plurality of imaging pixels P1 and the plurality of dummy pixels P2 and P3 in the pixel array 10 in order from top in the vertical direction in the period from a timing to to a timing t1. Specifically, the scanning units 20L and 20R set on the transistors TGL, FDG, RST, FCG, and TGS, for example, in order from top in the vertical direction in units of the pixel lines L in a predetermined period in the horizontal period H, and then turn off these transistors. This causes each of the plurality of imaging pixels P1 to start accumulating electric charge after the voltages in the floating diffusion FD, the capacitor FC, and the photodiodes PD1 and PD2 are each set to the power supply voltage VDD, and the electric charge is accumulated during an accumulation period T10 before the readout driving D2 is performed. Further, in each of the plurality of dummy pixels P2 and P3, the voltages in the floating diffusion FD and the capacitor FC are each set to the power supply voltage VDD. That is, the voltage VR of the voltage signal SVR to be applied to the voltage supply line VL is set to the power supply voltage VDD during the period in which the transistors TGL and TGS in the accumulation start driving D1 is turned on; therefore, the voltages in the floating diffusion FD and the capacitor FC are each set to the power supply voltage VDD.

The imaging device 1 then performs the readout driving D2 on the plurality of imaging pixels P1 and the plurality of dummy pixels P2 and P3 in order from top in the vertical direction in the period from a timing t10 to a timing t11. This causes each of the plurality of imaging pixels P1 and the plurality of dummy pixels P2 and P3 to sequentially output the eight pixel voltages VP1 to VP8. The readout unit 30 performs AD conversion on the basis of these eight pixel voltages VP1 to VP8, and outputs the eight respective digital codes CODE (digital codes CODE1 to CODE8).

Thereafter, the image processing unit 44 generates, on the basis of the eight digital codes CODE1 to CODE8 supplied from the readout unit 30, four pixel values VAL1 to VAL4 for the relevant pixel, and generates a pixel value VAL for the relevant pixel by combining the four pixel values VAL1 to VAL4.

The imaging device 1 repeats the accumulation start driving D1 and the readout driving D2 like these. Specifically, as illustrated in FIG. 10, the imaging device 1 performs the accumulation start driving D1 in the period from a timing t2 to a timing t3, and performs the readout driving D2 in the period from a timing t12 to a timing t13. In addition, the imaging device 1 performs the accumulation start driving D1 in the period from a timing t4 to a timing t5, and performs the readout driving D2 in the period from a timing t14 to a timing t15.

(Regarding Readout Driving D2)

Next, the readout driving D2 is described in detail. The following focuses on one imaging pixel P1 (imaging pixel P1A) of the plurality of imaging pixels P1, and describes an operation related to this imaging pixel P1A in detail. It is to be noted that, although this example describes the operation related to the imaging pixel P1, the same applies to operations related the dummy pixels P2 and P3.

FIGS. 11, 12A, and 12B each illustrate an operation example of the imaging device 1. In FIG. 11, (A) indicates the waveform of a horizontal synchronization signal XHS, (B) indicates the waveform of the signal SSEL to be supplied to the imaging pixel P1A, (C) indicates the waveform of the signal SRST to be supplied to the imaging pixel P1A, (D) indicates the waveform of the signal SFDG to be supplied to the imaging pixel P1A, (E) indicates the waveform of the signal STGL to be supplied to the imaging pixel P1A, (F) indicates the waveform of the signal SFCG to be supplied to the imaging pixel P1A, (G) indicates the waveform of the signal STGS to be supplied to the imaging pixel P1A, (H) indicates the waveform of the reference signal REF, (I) indicates the waveform of the signal SIG to be outputted from the imaging pixel P1A, and (J) indicates an operation of the counter 37 in the AD conversion section ADC coupled to the imaging pixel P1A. FIG. 12A illustrates the first half of the operation illustrated in FIG. 11, and FIG. 12B illustrates the second half of the operation illustrated in FIG. 11. In (H) and (I) of FIG. 11, (H) and (I) of FIG. 12A, and (H) and (I) of FIG. 12B, the waveforms of the respective signals are plotted on the same voltage axis. The reference signals REF in (H) of FIG. 11, (H) of FIG. 12A, and (H) of FIG. 12B each indicate the waveform at the positive input terminal of the comparator 36, and the signals SIG in (I) of FIG. 11, (I) of FIG. 12A, and (I) of FIG. 12B each indicate the waveform at the negative input terminal of the comparator 36. In addition, in (J) of FIG. 11, (J) of FIG. 12A, and (J) of FIG. 12B, oblique lines indicate that the counter 37 is performing the counting operation.

FIGS. 12A to 12C each illustrate the state of the imaging pixel P1A. In FIGS. 12A to 12C, the transistors TGL, RST, FDG, TGS, FCG, and SEL are illustrated by using the switches corresponding to the operation states of the transistors.

In the imaging device 1, the scanning units 20L and 20R first select the pixel line L including the imaging pixel PIA by using the signal SSEL in a certain horizontal period H, and electrically couple the imaging pixel P1A to the signal line SGL corresponding to the imaging pixel P1A. The scanning units 20L and 20R then control the operations of the imaging pixel PIA by using the signals SRST, SFDG, STGL, SFCG, and STGS, and the imaging pixel PIA sequentially outputs the eight pixel voltages VP1 to VP8 in the eight conversion periods T1 to T8. The respective AD conversion sections ADC of the readout unit 30 then perform AD conversion on the basis of these eight pixel voltages VP1 to VP8, and output the eight respective digital codes CODE1 to CODE8. The following describes this operation in detail.

First, when the horizontal period H starts at the timing t1, the scanning units 20L and 20R change the voltage of the signal SSEL from the low level to the high level at the timing t2 ((B) of FIG. 12A). This causes the transistor SEL to be turned on in the imaging pixel P1A, and the imaging pixel P1A is electrically coupled to the signal line SGL.

In the period up to the timing t11, the scanning units 20L and 20R set both of the signals SRST and SFDG at the high level ((C) and (D) of FIG. 12A). This causes the transistors FDG and RST to be both turned on in the imaging pixel P1A, and the voltage of the floating diffusion FD is set to the power supply voltage VDD to reset the floating diffusion FD.

(Operation from Timing t11 to Timing t21)

Next, at the timing t11, the scanning units 20L and 20R change the voltage of the signal SFDG from the high level to the low level ((D) of FIG. 12A). This causes the transistor FDG to be turned off in the imaging pixel P1A. Next, at the timing t12, the scanning units 20L and 20R change the voltage of the signal SRST from the high level to the low level ((C) of FIG. 12A). This causes the transistor RST to be turned off in the imaging pixel PIA. Next, at the timing t13, the scanning units 20L and 20R change the voltage of the signal SFDG from the low level to the high level ((D) of FIG. 12A). This causes the transistor FDG to be turned on in the imaging pixel P1A. In addition, in the period from the timing t13 to the timing 114, the comparator 36 performs a zero adjustment that sets the voltage of the capacitors 33 and 34.

Next, at the timing t14, the comparator 36 finishes the zero adjustment. At this timing t14, the reference signal generation unit 32 then changes the voltage of the reference signal REF to a voltage V1 ((H) of FIG. 12A).

This causes the transistors FDG and SEL to be turned on in the imaging pixel P1A as illustrated in FIG. 13A, and all the other transistors are turned off. The transistor FDG is on, and the floating diffusion FD and the transistor FDG are thus included in a combined capacitor. This combined capacitor functions as a conversion capacitor that converts electric charge into a voltage in the imaging pixel P1A. In the imaging pixel P1A, the transistor FDG is on in this way. The conversion capacitor in the imaging pixel PIA therefore has a large capacity value, resulting in low efficiency of converting the electric charge to the voltage. This conversion capacitor retains the electric charge at the time of resetting the floating diffusion FD in the period before the timing t12.

The imaging pixel P1A outputs the pixel voltage VP (pixel voltage VP1) corresponding to the voltage of the floating diffusion FD at this time.

Next, in the period (conversion period T1) from the timing t15 to a timing t17, the AD conversion section ADC performs AD conversion on the basis of this pixel voltage VP1. Specifically, at the timing t15, the readout controller 31 starts to generate the clock signal CLK. Concurrently with this, the reference signal generation unit 32 starts to decrease the voltage of the reference signal REF from the voltage V1 by a predetermined degree of change ((H) of FIG. 12A). Accordingly, the counter 37 of the AD conversion section ADC starts a counting operation ((J) of FIG. 12A).

At a timing t16, the voltage of the reference signal REF then falls below the voltage (pixel voltage VP1) of the signal SIG ((H) and (I) of FIG. 12A). Accordingly, the comparator 36 of the AD conversion section ADC changes the voltage of the signal CMP. As a result, the counter 37 stops the counting operation ((J) of FIG. 12A). The count value CNT of the counter 37 stopping the counting operation corresponds to the pixel voltage VP1. The AD conversion section ADC performs AD conversion in this way on the basis of the pixel voltage VP1, and the latch 38 of the AD conversion section ADC outputs the count value CNT of the counter 37 as the digital code CODE1 ((J) of FIG. 12A).

At the timing t17, the readout controller 31 then stops generating the clock signal CLK at the end of the conversion period T1, the reference signal generation unit 32 stops changing the voltage of the reference signal REF ((H) of FIG. 12A), and the counter 37 resets the count value CNT.

(Operation from Timing t21 to Timing t31)

Next, at the timing t21, the scanning units 20L and 20R change the voltage of the signal SFDG from the high level to the low level ((D) of FIG. 12A). This causes the transistor FDG to be turned off in the imaging pixel P1A. In addition, in the period from the timing t21 to the timing t22, the comparator 36 performs a zero adjustment that sets the voltage of the capacitors 33 and 34.

Next, at the timing t22, the comparator 36 finishes the zero adjustment. At this timing t22, the reference signal generation unit 32 then changes the voltage of the reference signal REF to the voltage V1 ((H) of FIG. 12A).

This causes the transistor SEL to be turned on in the imaging pixel P1A as illustrated in FIG. 13B, and all the other transistors are turned off. In the imaging pixel PIA, the transistor FDG is off in this way. The conversion capacitor in the imaging pixel PIA therefore has a small capacity value, resulting in high efficiency of converting the electric charge to the voltage. This conversion capacitor retains the electric charge at the time of resetting the floating diffusion FD in the period before the timing t12. The imaging pixel PIA outputs the pixel voltage VP (pixel voltage VP2) corresponding to the voltage of the floating diffusion FD at this time.

Next, in the period (conversion period T2) from the timing t23 to a timing t25, the AD conversion section ADC performs AD conversion on the basis of this pixel voltage VP2. This operation is similar to the operation in the conversion period T1. The AD conversion section ADC performs AD conversion on the basis of the pixel voltage VP2, and the latch 38 of the AD conversion section ADC outputs the count value CNT of the counter 37 as a digital code CODE2 ((J) of FIG. 12A).

(Operation from Timing t31 to Timing t41)

Next, at a timing t31, the scanning units 20L and 20R change the voltage of the signal STGL from the low level to the high level ((E) of FIG. 12A). This causes the transistor TGL to be turned on in the imaging pixel P1A. This causes the electric charge generated in the photodiode PD1 to be transferred to the floating diffusion FD. In addition, at this timing t31, the reference signal generation unit 32 changes the voltage of the reference signal REF to the voltage V1 ((H) of FIG. 12A).

Next, at a timing t32, the scanning units 20L and 20R change the voltage of the signal STGL from the high level to the low level ((E) of FIG. 12A). This causes the transistor TGL to be turned off in the imaging pixel P1A.

This causes the transistor FDG to be turned off in the imaging pixel P1A as illustrated in FIG. 13B. The conversion capacitor in the imaging pixel P1A therefore has a small capacity value, resulting in high efficiency of converting the electric charge to the voltage. This conversion capacitor retains the electric charge transferred from the photodiode PD1 from the timing t31 to the timing t32. The imaging pixel P1A outputs the pixel voltage VP (pixel voltage VP3) corresponding to the voltage of the floating diffusion FD at this time.

Next, in the period (conversion period T3) from the timing t33 to a timing t35, the AD conversion section ADC performs AD conversion on the basis of this pixel voltage VP3. This operation is similar to the operation in the conversion period T1. The AD conversion section ADC performs AD conversion on the basis of the pixel voltage VP3, and the latch 38 of the AD conversion section ADC outputs the count value CNT of the counter 37 as a digital code CODE3 ((J) of FIG. 12A). This digital code CODE3 corresponds to the digital code CODE2 that is also obtained w % ben the conversion efficiency is high (conversion period T2).

(Operation from Timing t41 to Timing t51)

Next, at a timing t41, the scanning units 20L and 20R change the voltage of the signal SFDG from the low level to the high level, and changes the voltage of the signal STGL from the low level to the high level ((D) and (E) of FIG. 12A). This causes the transistors FDG and TGL to be both turned on in the imaging pixel P1A. In addition, at this timing t41, the reference signal generation unit 32 changes the voltage of the reference signal REF to the voltage V1 ((H) of FIG. 12A). Next, at a timing t42, the scanning units 20L and 20R change the voltage of the signal STGL from the high level to the low level ((E) of FIG. 12A). This causes the transistor TGL to be turned off in the imaging pixel P1A.

This causes the transistor FDG to be turned on in the imaging pixel P1A as illustrated in FIG. 13A, and the floating diffusion FD and the transistor FDG are thus included in a combined capacitor (conversion capacitor). The conversion capacitor in the imaging pixel PIA therefore has a large capacity value, resulting in low efficiency of converting the electric charge to the voltage. This conversion capacitor retains the electric charge transferred from the photodiode PD1 from the timing 131 to the timing t32 and from the timing t41 to the timing t42. The imaging pixel P1A outputs the pixel voltage VP (pixel voltage VP4) corresponding to the voltage of the floating diffusion FD at this time.

Next, in the period (conversion period T4) from the timing t43 to a timing t45, the AD conversion section ADC performs AD conversion on the basis of this pixel voltage VP4. This operation is similar to the operation in the conversion period T1. The AD conversion section ADC performs AD conversion on the basis of the pixel voltage VP4, and the latch 38 of the AD conversion section ADC outputs the count value CNT of the counter 37 as a digital code CODE4 ((J) of FIG. 12A). This digital code CODE4 corresponds to the digital code CODE1 that is also obtained when the conversion efficiency is low (conversion period T1).

(Operation from Timing t51 to Timing 161)

Next, at a timing t51, the scanning units 20L and 20R change the voltage of the signal SRST from the low level to the high level ((C) of FIG. 12B). This causes the transistor RST to be turned on in the imaging pixel PIA. The transistor FDG is on. This causes the voltage of the floating diffusion FD to be set to the power supply voltage VDD, and the floating diffusion FD is reset. Next, at a timing t52, the scanning units 20L and 20R change the voltage of the signal SRST from the high level to the low level ((C) of FIG. 12B). This causes the transistor RST to be turned off in the imaging pixel P1A. In addition, at this timing 152, the reference signal generation unit 32 changes the voltage of the reference signal REF to the voltage V1 ((H) of FIG. 12B).

Next, at a timing t53, the scanning units 20L and 20R change the voltage of the signal SFCG from the low level to the high level ((F) of FIG. 12B). This causes the transistor FCG to be turned on in the imaging pixel P1A. In addition, in the period from the timing t53 to a timing t54, the comparator 36 performs a zero adjustment that sets the voltage of the capacitors 33 and 34.

Next, at the timing t54, the comparator 36 finishes the zero adjustment. In addition, at this timing t54, the reference signal generation unit 32 changes the voltage of the reference signal REF to the voltage V1 ((H) of FIG. 12A).

This causes the transistors FDG, FCG, and SEL to be turned on in the imaging pixel P1A as illustrated in FIG. 13C, and all the other transistors are turned off. The transistors FDG and FCG are both on. The floating diffusion FD, the transistors FDG and FCG, and the capacitor FC are thus included in a combined capacitor (conversion capacitor). This conversion capacitor retains the electric charge generated in the photodiode PD2 before the timing t53 and supplied to and accumulated in the capacitor FC via the transistor TGS. The imaging pixel PIA outputs the pixel voltage VP (pixel voltage VP5) corresponding to the voltage of the floating diffusion FD at this time.

Next, in the period (conversion period T5) from a timing t55 to a timing t57, the AD conversion section ADC performs AD conversion on the basis of this pixel voltage VP5. This operation is similar to the operation in the conversion period T1. The AD conversion section ADC performs AD conversion on the basis of the pixel voltage VP5, and the latch 38 of the AD conversion section ADC outputs the count value CNT of the counter 37 as a digital code CODE5 ((J) of FIG. 12B).

(Operation from Timing t61 to Timing t71)

Next, at a timing t61, the scanning units 20L and 20R change the voltage of the signal STGS from the low level to the high level ((G) of FIG. 12B). This causes the transistor TGS to be turned on in the imaging pixel P1A. This causes the electric charge generated in the photodiode PD2 to be transferred to the floating diffusion FD and the capacitor FC. In addition, at this timing t61, the reference signal generation unit 32 changes the voltage of the reference signal REF to the voltage V1 ((H) of FIG. 12B).

Next, at a timing t62, the scanning units 20L and 20R change the voltage of the signal STGS from the high level to the low level ((G) of FIG. 12B). This causes the transistor TGS to be turned off in the imaging pixel P1A.

This causes the transistors FDG and FCG to be both turned on in the imaging pixel P1A as illustrated in FIG. 13C, and the floating diffusion FD, the transistors FDG and FCG, and the capacitor FC are thus included in a combined capacitor (conversion capacitor). This conversion capacitor retains the electric charge transferred from the photodiode PD2 from the timing t61 to the timing t62 in addition to the electric charge generated in the photodiode PD2 before the timing t53 and supplied to and accumulated in the capacitor FC via the transistor TGS. The imaging pixel P1A outputs the pixel voltage VP (pixel voltage VP6) corresponding to the voltage of the floating diffusion FD at this time.

Next, in the period (conversion period T6) from a timing t63 to a timing t65, the AD conversion section ADC performs AD conversion on the basis of this pixel voltage VP6. This operation is similar to the operation in the conversion period T1. The AD conversion section ADC performs AD conversion on the basis of the pixel voltage VP6, and the latch 38 of the AD conversion section ADC outputs the count value CNT of the counter 37 as a digital code CODE6 ((J) of FIG. 12B). This digital code CODE6 corresponds to the digital code CODE5 obtained when the floating diffusion FD, the transistors FDG and FCG, and the capacitor FC are included in a combined capacitor.

(Operation from Timing t71 to Timing t81)

Next, in the period from a timing t7l to a timing t72, the comparator 36 performs a zero adjustment that sets the voltage of the capacitors 33 and 34.

Next, at the timing t72, the comparator 36 finishes the zero adjustment. In addition, at this timing t72, the reference signal generation unit 32 changes the voltage of the reference signal REF to the voltage V1 ((H) of FIG. 12B).

This causes the transistors FDG and FCG to be both turned on in the imaging pixel P1A as illustrated in FIG. 13C, and the floating diffusion FD, the transistors FDG and FCG, and the capacitor FC are thus included in a combined capacitor (conversion capacitor). This conversion capacitor retains the electric charge transferred from the photodiode PD2 from the timing t61 to the timing t62 in addition to the electric charge generated in the photodiode PD2 before the timing t53 and supplied to and accumulated in the capacitor FC via the transistor TGS. The imaging pixel PIA outputs the pixel voltage VP (pixel voltage VP7) corresponding to the voltage of the floating diffusion FD at this time.

Next, in the period (conversion period T7) from a timing t73 to a timing t75, the AD conversion section ADC performs AD conversion on the basis of this pixel voltage VP7. This operation is similar to the operation in the conversion period T1. The AD conversion section ADC performs AD conversion on the basis of the pixel voltage VP7, and the latch 38 of the AD conversion section ADC outputs the count value CNT of the counter 37 as a digital code CODE7 ((J) of FIG. 12B).

(Operation from Timing 181 to Timing t7)

Next, at a timing t81, the scanning units 20L and 20R change the voltage of the signal SRST from the low level to the high level ((C) of FIG. 12B). This causes the transistor RST to be turned on in the imaging pixel P1A. The transistors FDG and FCG are on. The voltage of the floating diffusion FD and the voltage of the capacitor FC are thus set to the power supply voltage VDD, and the floating diffusion FD and the capacitor FC are reset.

Next, at a timing 182, the scanning units 20L and 20R change the voltage of the signal SFCG from the high level to the low level ((F) of FIG. 12B). This causes the transistor FCG to be turned off in the imaging pixel P1A.

Next, at a timing t83, the scanning units 20L and 20R change the voltage of the signal SRST from the high level to the low level ((C) of FIG. 12B). This causes the transistor RST to be turned off in the imaging pixel P1A.

Next, at a timing t84, the scanning units 20L and 20R change the voltage of the signal SFCG from the low level to the high level ((F) of FIG. 12B). This causes the transistor FCG to be turned on in the imaging pixel P1A. In addition, at this timing t84, the reference signal generation unit 32 changes the voltage of the reference signal REF to the voltage V1 ((H) of FIG. 12B).

This causes the transistors FDG and FCG to be both turned on in the imaging pixel P1A as illustrated in FIG. 13C, and the floating diffusion FD, the transistors FDG and FCG, and the capacitor FC are thus included in a combined capacitor (conversion capacitor). This conversion capacitor retains the electric charge at the time of resetting the floating diffusion FD and the capacitor FC from the timing t81 to the timing t82. The imaging pixel P1A outputs the pixel voltage VP (pixel voltage VP8) corresponding to the voltage of the floating diffusion FD at this time.

Next, in the period (conversion period T8) from a timing t85 to a timing t87, the AD conversion section ADC performs AD conversion on the basis of this pixel voltage VP8. This operation is similar to the operation in the conversion period T1. The AD conversion section ADC performs AD conversion on the basis of the pixel voltage VP8, and the latch 38 of the AD conversion section ADC outputs the count value CNT of the counter 37 as the digital code CODE8 ((J) of FIG. 12B). This digital code CODE8 corresponds to the digital code CODE7 obtained when the floating diffusion FD, the transistors FDG and FCG, and the capacitor FC are included in a combined capacitor.

Next, at a timing t7, the scanning units 20L and 20R change the voltage of the signal SFDG from the high level to the low level, and changes the voltage of the signal SFCG from the high level to the low level ((D) and (F) of FIG. 12B). This causes the transistors FDG and FCG to be turned off in the imaging pixel P1A.

At a timing t8, the scanning units 20L and 20R then changes the voltage of the signal SSEL from the high level to the low level ((B) of FIG. 12B). This causes the transistor SEL to be turned off in the imaging pixel P1A, and the imaging pixel P1A is electrically uncoupled from the signal line SGL.

Next, an image composition process by the image processing unit 44 is described. The image processing unit 44 generates, on the basis of the eight digital codes CODE1 to CODE8 for each pixel supplied from the readout unit 30, four pixel values VAL1 to VAL4 for the relevant pixel, and generates the pixel value VAL for the relevant pixel by combining the four pixel values VAL1 to VAL4.

FIG. 14 schematically illustrates the image composition process. The waveforms illustrated in (A) to (G) of FIG. 14 are similar to the waveforms illustrated in (A) to (G) of FIG. 11. As described with reference to FIGS. 11, 12A, and 12B, the readout unit 30 generates the digital code CODE1 on the basis of the operation in the period from the timing t11 to the timing t21, generates the digital code CODE2 on the basis of the operation in the period from the timing t21 to the timing t31, generates the digital code CODE3 on the basis of the operation in the period from the timing t31 to the timing t41, generates the digital code CODE4 on the basis of the operation in the period from the timing t41 to the timing t51, generates the digital code CODE5 on the basis of the operation in the period from the timing t51 to the timing t61, generates the digital code CODE6 on the basis of the operation in the period from the timing t61 to the t71, generates the digital code CODE7 on the basis of the operation in the period from the timing t71 to the timing t81, and generates the digital code CODE8 on the basis of the operation in the period from the timing t81 to the timing t7.

The image processing unit 44 generates a pixel value VAL1 on the basis of the digital code CODE2 and the digital code CODE3. Specifically, the image processing unit 44 subtracts the digital code CODE2 from the digital code CODE3 (CODE3−CODE2) to calculate the pixel value VAL1. That is, the imaging device 1 uses the principle of so-called correlated double sampling (CDS: Correlated double sampling) to calculate the pixel value VAL1 by using the digital code CODE2 corresponding to P-phase (Pre-Charge phase) data and the digital code CODE3 corresponding to D-phase (Data phase) data. In the imaging device 1, such correlated double sampling is performed, and it is thus possible to remove the noise component included in the pixel value VAL1. As a result, it is possible to increase the image quality of a captured image.

Similarly, the image processing unit 44 generates a pixel value VAL2 on the basis of the digital code CODE1 and the digital code CODE4. Specifically, the image processing unit 44 subtracts the digital code CODE1 from the digital code CODE4 (CODE4−CODE1) to calculate the pixel value VAL2. That is, the imaging device 1 uses the principle of correlated double sampling to calculate the pixel value VAL2 by using the digital code CODE1 corresponding to the P-phase data and the digital code CODE4 corresponding to the D-phase data.

Similarly, the image processing unit 44 generates a pixel value VAL3 on the basis of the digital code CODE5 and the digital code CODE6. Specifically, the image processing unit 44 subtracts the digital code CODE5 from the digital code CODE6 (CODE6−CODE5) to calculate the pixel value VAL3. That is, the imaging device 1 uses the principle of correlated double sampling to calculate the pixel value VAL3 by using the digital code CODE5 corresponding to the P-phase data and the digital code CODE6 corresponding to the D-phase data.

The image processing unit 44 then generates a pixel value VAL4 on the basis of the digital code CODE7 and the digital code CODE8. Specifically, the image processing unit 44 subtracts the digital code CODE8 from the digital code CODE7 (CODE7−CODE8) to calculate the pixel value VAL4. That is, the imaging device 1 uses the principle of so-called double data sampling (DDS; Double Data Sampling) to calculate the pixel value VAL4 by using the digital code CODE7 before resetting the floating diffusion FD and the capacitor FC and the digital code CODE8 after resetting the floating diffusion FD and the capacitor FC.

The image processing unit 44 then combines the four pixel values VAL1 to VAL4 to generate the pixel value VAL of the relevant pixel. The image processing unit 44 generates this pixel value VAL for each of all the pixels in the pixel array 10. The image processing unit 44 then outputs the pixel values VAL for the imaging pixels P1 as the image signals DATA.

(Regarding Diagnosis Process)

Next, the diagnosis process in the imaging device 1 is described in detail.

FIG. 15 schematically illustrates an overall operation example the diagnosis process in the imaging device 1. This diagnosis process is performed in parallel with an ordinary imaging operation using the imaging pixels P1 of the imaging pixel region R1. The readout unit 30, the image processing unit 44, and the diagnosis processing unit 45 are included in a diagnosis unit 49.

First, the address generation unit 41 of the control unit 40 determines the pixel line L to be driven in the pixel array 10 and generates the address signal ADR indicating an address corresponding to the pixel line L. The address generation unit 41 then supplies the generated address signal ADR to the scanning units 20L and 20R.

The two scanning units 20L and 20R drive the imaging pixels P1 and the dummy pixels P2 and P3 belonging to the pixel line L corresponding to the address indicated by the address signal ADR on the basis of the instruction from the control unit 40.

The 11 dummy pixels P2 in the dummy pixel region R21, the 11 dummy pixels P2 in the dummy pixel region R22, the two dummy pixels P3 in the dummy pixel region R31, and the two dummy pixels P3 in the dummy pixel region R32, which are included in the pixel array 10, each sequentially output eight pixel voltages VP1 to VP8 in the eight conversion periods T1 to T8 as the signals SIG. The AD conversion sections ADC of the readout unit 30 each perform AD conversion on the basis of these eight pixel voltages VP1 to VP8, and each output the eight digital codes CODE (digital codes CODE1 to CODE8). The image processing unit 44 of the control unit 40 generates four pixel values VAL1 to VAL4 on the basis of the eight digital codes CODE1 to CODE8 of each pixel included in the image signal DATA0. The image processing unit 44 then supplies the pixel values VAL1 to VAL4 for the dummy pixels P2 and P3 to the diagnosis processing unit 45 as the image signal DATA1.

Each of the dummy pixels P2 and P3 is the dummy pixel PA (FIG. 4A) or the dummy pixel PB (FIG. 4B). As illustrated in FIG. 4A, in the dummy pixel PA, the drain and the source of the transistor TGL are coupled to each other, and the drain and the source of the transistor TGS are coupled to each other. Accordingly, in the readout driving D2, for example, the pixel voltage VP2 and the pixel voltage VP3 to be outputted by the dummy pixel PA illustrated in FIG. 12A are almost the same. That is, in the period from the timing t31 to the timing t32, the transistor TGL is turned on, but the dummy pixel PA maintains the pixel voltage VP because the drain and the source of the transistor TGL are coupled to each other. Similarly, the pixel voltage VP1 and the pixel voltage VP4 illustrated in FIG. 12A are almost the same, and the pixel voltages VP5 and VP6 illustrated in FIG. 12B are almost the same. That is, the dummy pixel PA performs an operation similar to the operation as in the imaging pixel P1 where the amount of received light is 0 (zero). The AD conversion sections ADC of the readout unit 30 and the image processing unit 44 therefore generate pixel values VAL1 to VAL4 having smaller values on the basis of the eight pixel voltages VP1 to VP8 supplied from the dummy pixel PA.

Further, as illustrated in FIG. 4B, in the dummy pixel PB, the source of the transistor TGL is coupled to the voltage supply line VL, and the source of the transistor TGS is coupled to the voltage supply line VL. Accordingly, in the readout driving D2, for example, the when the transistor TGL is turned on, the voltage of the floating diffusion FD is set to the voltage VR, and when the transistor TGS is turned on, the voltage of the floating diffusion FD is set to the voltage VR. That is, the dummy pixel PB performs an operation similar to the operation as in the imaging pixel P1 where the amount of received light is large. The AD conversion sections ADC of the readout unit 30 and the image processing unit 44 therefore generate pixel values VAL1 to VAL4 having large values on the basis of the eight pixel voltages VP1 to VP8 supplied from the dummy pixel PA.

The diagnosis processing unit 45 of the control unit 40 determines the left-end identification information INFL and the right-end identification information INFR on the basis of the pixel values VAL1 to VAL4 for the dummy pixels P3 supplied from the image processing unit 44. Further, the diagnosis processing unit 45 determines the line identification information INF on the basis of the pixel values VAL1 to VAL4 for the dummy pixels P2 supplied from the image processing unit 44, and diagnoses whether the imaging device 1 is performing a desired operation by comparing the address indicated by the address signal ADR with the line identification information INF.

Specifically, the diagnosis processing unit 45 performs a binarization process on each of the pixel values VAL1 to VAL4 of the 11 dummy pixels P2 in the dummy pixel region R21 by using a threshold TH. The pixel values VAL1 to VAL4 for the dummy pixel PA are each a small value, so it becomes "0" by this binarization process, while the pixel values VAL1 to VAL4 for the dummy pixel PB are each a large value, so it becomes "1" by this binarization process. This allows the diagnosis processing unit 45 to obtain an 11-bit binary number. This 11-bit binary number is the line identification information INF illustrated in FIG. 5. The diagnosis processing unit 45 then diagnoses whether imaging device 1 is performing the desired operation by comparing the address indicated by the address signal ADR with this line identification information INF. That is, the address indicated by the address signal ADR is, for example, "00000000000" in a case where the address signal ADR indicates the 0th pixel line L[0], "00000000001" in a case where the address signal ADR indicates the first pixel line L[1], and "00000000010" in a case where the address signal ADR indicates the second pixel line L[2]. Thus, the diagnosis processing unit 45 is able to diagnose whether the imaging device 1 is performing the desired operation by comparing the address indicated by the address signal ADR with this line identification information INF.

The same applies to the dummy pixel region R22. That is, the diagnosis processing unit 45 determines the line identification information INF by performing the binarization process on each of the pixel values VAL1 to VAL4 for the 11 dummy pixels P2 in the dummy pixel region R22. The diagnosis processing unit 45 then diagnoses whether imaging device 1 is performing the desired operation by comparing the address indicated by the address signal ADR with this line identification information INF.

For example, the diagnosis processing unit 45 determines that the imaging device 1 is performing the desired operation in a case where the line identification information INF acquired from the pixel values VAL1 to VAL4 for the dummy pixel region R21 and the address indicated by the address signal ADR match with each other and where the line identification information INF acquired from the pixel values VAL1 to VAL4 for the dummy pixel region R22 and the address indicated by the address signal ADR match with each other.

Further, for example, the diagnosis processing unit 45 determines that the imaging device 1 has a problem in a case where the line identification information INF acquired from the pixel values VAL1 to VAL4 for the dummy pixel region R21 and the address indicated by the address signal ADR do not match with each other or a case where the line identification information INF acquired from the pixel values VAL1 to VAL4 for the dummy pixel region R22 and the address indicated by the address signal ADR do not match with each other.

Reasons why the line identification information INF acquired from the pixel values VAL1 to VAL4 for the dummy pixel region R21 and the address indicated by the address signal ADR do not match with each other may be, for example, a problem of the connection between the address generation unit 41 and the scanning unit 20L, a problem of the scanning unit 20L, a problem of the connection between the scanning unit 20L and the dummy pixel P2 in the dummy pixel region R21, a problem of the dummy pixel P2 in the dummy pixel region R21, a problem of the connection between the dummy pixel P2 in the dummy pixel region R21 and the AD conversion section ADC, a problem of the AD conversion section ADC, etc.

Further, reasons why the line identification information INF acquired from the pixel values VAL1 to VAL4 for the dummy pixel region R22 and the address indicated by the address signal ADR do not match with each other may be, for example, a problem of the connection between the address generation unit 41 and the scanning unit 20R, a problem of the scanning unit 20R, a problem of the connection between the scanning unit 20R and the dummy pixel P2 in the dummy pixel region R22, a problem of the dummy pixel P2 in the dummy pixel region R22, a problem of the connection between the dummy pixel P2 in the dummy pixel region R22 and the AD conversion section ADC, a problem of the AD conversion section ADC, etc.

Further, the diagnosis processing unit 45 performs a binarization process on each of the pixel values VAL1 to VAL4 for the two dummy pixels P3 in the dummy pixel region R31, thereby determining the left-end identification information INFL. Similarly, the diagnosis processing unit 45 performs a binarization process on each of the pixel values VAL1 to VAL4 for the two dummy pixels P3 in the dummy pixel region R32, thereby determining the right-end identification information INFR.

The diagnosis processing unit 45 performs the diagnosis process in this manner. The diagnosis processing unit 45 then outputs the result of the diagnosis process as the diagnosis result RES.

As described above, the dummy pixel regions R21, R22, R31, and R32 are provided in the imaging device 1, and the dummy pixel PA (FIG. 4A) or the dummy pixel PB (FIG. 4B) is disposed, as the dummy pixel P2 or P3, in these dummy pixel regions R21, R22, R31, and R32. Thus, for example, in the imaging device 1, it is possible to fix information about each pixel line L as a so-called mask ROM (Read Only Memory) using the arrangement of the dummy pixels P2. In this case, the line identification information INF for identifying the pixel line L is set using the arrangement of the dummy pixels P2, which makes it possible to perform a failure detection of the address control and a failure detection of the pixel control by performing self-diagnosis.

In particular, in the imaging device 1, as illustrated in FIGS. 5 and 6, the arrangement of the 11 dummy pixels P2 corresponds to the arrangement indicating the sequential order of the pixel line L represented by a binary number, which makes it possible to simplify the configuration of the circuit for comparing the line identification information INF with the address indicated by the address signal ADR.

Further, in the imaging device 1, as illustrated in FIG. 4A, in the dummy pixel PA, the drain and the source of the transistor TGL are coupled to each other, and the drain and the source of the transistor TGS are coupled to each other. As a result, it is possible to make the pixel values VAL1 to VAL4 of this dummy pixel PA close to "0" in the imaging device 1, which makes it possible to prevent erroneous diagnosis in a case where, for example, an imaging sensitivity is increased by changing the slope of the ramp waveform in the reference signal REF.

That is, for example, as illustrated in FIG. 16, in the dummy pixel PA, in a case where the source of the transistor TGL is coupled to the power supply line PL and the source of the transistor TGS is coupled to the power supply line PL, and where the imaging sensitivity is increased, a value obtained by performing the binarization process for each of the pixel values VAL1 to VAL4 can become "1". That is, for example, in the readout driving D2, it is desirable that the voltage of the floating diffusion FD set by turning on the transistors RST and FDG and the voltage of the floating diffusion FD set by turning on the transistor TGL be equal to each other. However, these voltages can deviate from each other due to an influence of a parasitic capacitance of the transistor or the like. In particular, if the voltage of the floating diffusion FD set by turning on the transistor TGL is lower than the voltage of the floating diffusion FD set by turning on the transistors RST and FDG, the pixel values VAL1 and VAL2 become greater than "0". In a case where the deviation between these voltages is large, the deviation of the pixel values VAL1 and VAL2 from "0" becomes large. In this case, for example, if the imaging sensitivity of the imaging device is increased, the result of the binarization process can become "1". The same applies to the pixel values VAL3 and VAL4. As a result, for example, the imaging device can erroneously diagnose a failure even though the failure has not occurred.

In contrast, in the imaging device 1, in the dummy pixel PA, the drain and the source of the transistor TGL are coupled to each other, and the drain and the source of the transistor TGS are coupled to each other. Accordingly, in the dummy pixel PA, the voltage of the floating diffusion FD is maintained even if the transistor TGL is turned on during the period from the timing t31 to the timing t32 (FIG. 12A). The same applies to the transistor TGS. Therefore, in the imaging device 1, it is possible to reduce the deviation from "0" of each of the pixel values VAL1 to VAL4, which makes it possible to set the result of the binarization process to "0" more stably, even if the imaging sensitivity of the imaging device 1 is high, for example. Consequently, the imaging device 1 is able to prevent the erroneous diagnosis.

Further, in the imaging device 1, the two dummy pixel regions R21 and R22 are respectively provided on the left and the right of the imaging pixel region R1, and the diagnosis process is performed in parallel with the ordinary imaging operation using the imaging pixels P1 in the imaging pixel region R1, which makes it possible to detect a failure in a timely manner, for example. That is, for example, in a case where the diagnosis process is performed in a blanking period T20, it is difficult to perform the diagnosis process for all the pixel lines L in one blanking period T20, because the blanking period T20 is short. Therefore, in this case, the diagnosis process for all the pixel lines L is performed using a plurality of blanking periods T20, but in such a case, if a failure occurs, the failure may not be detected in a timely manner. In contrast, the imaging device 1 is able to perform the diagnosis process for all the pixel lines L while performing the ordinary imaging operation, and is therefore able to perform the diagnosis process for all the pixel lines L within one frame period. As a result, the imaging device 1 is able to detect a failure in a timely manner.

[Effects]

As described above, in the present embodiment, the dummy pixel regions are provided, and the dummy pixel PA or the dummy pixel PB is disposed in these dummy pixel regions. Accordingly, it is possible to detect a problem of the imaging device by performing self-diagnosis.

In the present embodiment, the drain and the source of the transistor TGL are coupled to each other and the drain and the source of the transistor TGS are coupled to each other in the dummy pixel PA. Accordingly, it is possible to prevent the erroneous diagnosis.

In the present embodiment, the two dummy pixel regions are respectively provided on the left and the right of the normal pixel region, and the diagnosis process is performed in parallel with the ordinary imaging operation using the pixels in the imaging pixel region. Accordingly, it is possible to detect a failure in a timely manner, for example.

Modification Example 1-1

In the above-described embodiment, the two scanning units 20L and 20R are provided, but this is not limitative. Instead of this, for example, one scanning unit may be provided, as in an imaging device 1B illustrated in FIG. 17. The imaging device 1B includes one scanning unit 20L, a pixel array 10B, a readout unit 30B, and a control unit 40B. That is, the imaging device 1B is a device in which, in the imaging device 1 (FIG. 1) according to the above embodiment, the scanning unit 20R is omitted, and the pixel array 10, the readout unit 30, and the control unit 40 are replaced with a pixel array 10B, a readout unit 30B, and a control unit 40B, respectively.

The pixel array 10B is obtained by omitting the dummy pixel region R21 in the pixel array 10 (FIG. 1) according to the above embodiment. The readout unit 30B is configured to perform AD conversion on the basis of the signal SIG supplied from the pixel array 10B via the signal line SGL, thereby generating an image signal DATA0. The control unit 40B is configured to supply control signals to the scanning unit 20L and the readout unit 30B, thereby controlling the operation of the imaging device 1B. The control unit 40B includes a column scanning unit 43B, an image processing unit 44B, and a diagnosis processing unit 45B. The column scanning unit 43B is configured to determine the AD conversion section ADC in the readout unit 30B to be a target of the data transfer operation, and to generate a control signal SSW on the basis of a result of the determination. The image processing unit 44B is configured to perform predetermined image processing including an image composition process on an image indicated by the image signal DATA0. The diagnosis processing unit 45B is configured to determine the line identification information INF by performing the binarization process on each of the pixel values VAL1 to VAL4 of the 11 dummy pixel P2 in the dummy pixel region R22 and to diagnose whether the imaging device 1B is performing the desired operation by comparing the address indicated by the address signal ADR with the line identification information INF.

In the imaging device 1B, the scanning unit 20L drives the imaging pixels P1 and the dummy pixels P2 and P3 belonging to the pixel line L corresponding to the address indicated by the address signal ADR on the basis of the instruction from the control unit 40B. The 11 dummy pixels P2 in the dummy pixel region R22 in the pixel array 10B each generate the signal SIG and each supply the generated signal SIG to the readout unit 30B. The scanning unit 20L is disposed on the left of the pixel array 10B, and the dummy pixel region R22 is disposed near the right end of the pixel array 10B. That is, in the imaging device 1B, the dummy pixel region R22 is provided at a position away from the scanning unit 20L in the pixel array 10B, which makes it possible to diagnose a driving capability of the driver section 23L of the scanning unit 20L by performing the diagnosis process. Further, in the imaging device 1B, such a disposition of the dummy pixel region R22 at the position away from the scanning unit 20L makes it possible to perform diagnosis on disconnections of the control lines TGLL, FDGL, RSTL, FCGL, TGSL, and SELL and the power supply line PL in the dummy pixel region R31, the imaging pixel region R1, and the dummy pixel region R22.

Modification Example 1-2

In the above-described embodiment, seven transistors are included in the pixel circuit CKT, but this is not limitative. For example, the transistor FDG may be omitted, or the transistor FCG may be omitted. The following describes in detail an imaging device 1C according to the present modification example. The imaging device 1C includes a pixel array 10C and scanning units 20LC and 20RC.

The pixel array 10C includes the imaging pixels P1 and the dummy pixels P2 and P3. The imaging pixels P1 are disposed in the imaging pixel region R1, the plurality of dummy pixels P2 are disposed in the dummy pixel regions R21 and R22, and the plurality of dummy pixels P3 are disposed in the dummy pixel regions R31 and R32. In the dummy pixel regions R21 and R22, the dummy pixel PA or the dummy pixel PB is selectively disposed as the dummy pixel P2, and, in the dummy pixel regions R31 and R32, the dummy pixel PA or the dummy pixel PB is selectively disposed as the dummy pixel P3.

FIG. 18 illustrates a configuration example of the imaging pixel P1 according to the present modification example. The imaging pixel P1, the pixel array 10B includes the plurality of control lines TGLL, the plurality of control lines RSTL, the plurality of control lines TGSL, the plurality of control lines SELL, the plurality of power supply lines PL, and the plurality of signal lines SGL. The imaging pixel P1 include the photodiodes PD1 and PD2 and the pixel circuit CKT. The pixel circuit CKT includes the transistor TGL, the transistor TGS, the transistor RST, the floating diffusion FD, and the transistors AMP and SEL. The drain of the transistor TGS is coupled to the floating diffusion FD. The source of the transistor RST is coupled to the floating diffusion FD. The pixel circuit CKT according to the present modification example is the pixel circuit CKT (FIG. 2) according to the above-described embodiment from which the transistors FCG and FDG are removed.

FIG. 19A illustrates a modification example of the dummy pixel PA according to the present configuration example, and FIG. 19B illustrates a configuration example of the dummy pixel PB according to the present modification example. In the pixel circuit CKT of the dummy pixel PA, the drain and the source of the transistor TGL are coupled to each other, and the drain and the source of the transistor TGS are coupled to each other. In the pixel circuit CKT of the dummy pixel PB, the source of the transistor TGL is coupled to the voltage supply line VL and the source of the transistor TGS is coupled to the voltage supply line VL.

The scanning units 20LC and 20RC is configured to sequentially drive the imaging pixels P1 and the dummy pixels P2 and P3 in the pixel array 10B in units of pixel lines L on the basis of the instruction from the control unit 40.

Modification Example 1-3

In the above-described embodiment, in the pixel circuit CKT of the dummy pixel PA, the drain and the source of the transistor TGL are coupled to each other and the drain and the source of the transistor TGS are coupled to each other, but this is not limitative. The following describes the present modification example in detail with reference to some examples.

FIG. 20 illustrates a configuration example of the dummy pixel PA disposed in a pixel array 10D of an imaging device 1D according to the present modification example. In the pixel circuit CKT of this dummy pixel PA, the source of the transistor TGL is coupled to the power supply line PL, the source of the transistor TGS is coupled to the power supply line PL, and the drain of the transistor RST is coupled to the voltage supply line VL. The configuration of FIG. 4B is usable as the dummy pixel PB.

The dummy pixel PA (FIG. 20) and the dummy pixel PB (FIG. 4B) differ from each other in the connection of the sources of the transistors TGL and TGS and the connection of the drain of the transistor RST. That is, the sources of the transistors TGL and TGS are coupled to the power supply line PL in the dummy pixel PA and to the voltage supply line VL in the dummy pixel PB. Further, the drain of the transistor RST is coupled to the voltage supply line VL in the dummy pixel PA and to the power supply line PL in the dummy pixel PB.

Here, the power supply line PL corresponds to a specific example of a "first voltage supply line" in the present disclosure. The voltage supply line VL corresponds to a specific example of a "second voltage supply line" in the present disclosure. The pixel circuit CKT of the imaging pixel P1 corresponds to a specific example of an "imaging pixel circuit" in the present disclosure. The pixel circuit CKT of the dummy pixel PA corresponds to a specific example of a "first dummy pixel circuit" in the present disclosure. The pixel circuit CKT of the dummy pixel PB corresponds to a specific example of a "second dummy pixel circuit" in the present disclosure.

In the ordinary operation in the imaging pixel P1, for example, the voltage of the floating diffusion FD set by turning on the transistor TGL is lower than the voltage of the floating diffusion FD set by turning on the transistors RST and FDG. Accordingly, the pixel values VAL1 to VAL4 become values corresponding to the amount of received light in the imaging pixel P1.

In this dummy pixel PA, on the other hand, in the readout driving D2, the power supply voltage VDD applied to the source of the transistor TGL is higher than the voltage VR applied to the drain of the transistor RST. Accordingly, the voltage of the floating diffusion FD set by turning on the transistor TGL is higher than the voltage of the floating diffusion FD set by turning on the transistor RST. As a result, the pixel values VAL1 and VAL2 are clamped to "0". The same applies to the pixel values VAL3 and VAL4. Accordingly, in the imaging device 1D according to the present modification example, it is possible to set the result of the binarization process of the pixel values VAL1 to VAL4 to "0" more stably, even if the imaging sensitivity of the imaging device 1D is high, for example.

FIG. 21 illustrates a configuration example of the dummy pixel PA disposed in a pixel array 10E of another imaging device 1E according to the present modification example. In the pixel circuit CKT of this dummy pixel PA, the source of the transistor TGL is coupled to the power supply line PL and the drain of the transistor TGL is open. Further, the source of the transistor TGS is coupled to the power supply line PL and the drain of the transistor TGS is open. That is, in the above-described embodiment, the drain of the transistor TGL is coupled to the floating diffusion FD and the drain of the transistor TGS is coupled to the capacitor FC;

however, in the present modification example, the drains of the transistors TGL and TGS are not coupled to other elements. The configuration of FIG. 4B is usable as the dummy pixel PB.

Here, the voltage supply line VL corresponds to a specific example of a "voltage supply line" in the present disclosure. The pixel circuit CKT of the imaging pixel P1 corresponds to a specific example of an "imaging pixel circuit" in the present disclosure. The pixel circuit CKT of the dummy pixel PA corresponds to a specific example of a "first dummy pixel circuit" in the present disclosure. The pixel circuit CKT of the dummy pixel PB corresponds to a specific example of a "second dummy pixel circuit" in the present disclosure.

Even in this case, in the dummy pixel PA, the voltage of the floating diffusion FD is maintained even if the transistor TGL is turned on during the period from the timing t31 to the timing t32 (FIG. 12A). The same applies to the transistor TGS. Therefore, in the imaging device 1E, it is possible to reduce the deviation from "0" of each of the pixel values VAL1 to VAL4, which makes it possible to set the result of the binarization process of the pixel values VAL1 to VAL4 to "0" more stably.

In the example of FIG. 21, the sources of the transistors TGL and TGS are coupled to the power supply line PL, but this is not limitative. For example, the sources of the transistors TGL and TGS may be coupled to the voltage supply line VL.

FIG. 22 illustrates a configuration example of the dummy pixel PA disposed in a pixel array 10F of another imaging device 1F according to the present modification example. In the pixel circuit CKT of this dummy pixel PA, the source of the transistor TGL is open and the drain of the transistor TGL is coupled to the floating diffusion FD. Further, the source of the transistor TGS is open and the drain of the transistor TGS is coupled to the capacitor FC. That is, the sources of the transistors TGL and TGS are not coupled to other elements. The configuration of FIG. 4B is usable as the dummy pixel PB.

Here, the voltage supply line VL corresponds to a specific example of a "voltage supply line" in the present disclosure. The pixel circuit CKT of the imaging pixel P1 corresponds to a specific example of an "imaging pixel circuit" in the present disclosure. The pixel circuit CKT of the dummy pixel PA corresponds to a specific example of a "first dummy pixel circuit" in the present disclosure. The pixel circuit CKT of the dummy pixel PB corresponds to a specific example of a "second dummy pixel circuit" in the present disclosure.

Even in this case, in the dummy pixel PA, the voltage of the floating diffusion FD is maintained even if the transistor TGL is turned on during the period from the timing t31 to the timing t32 (FIG. 12A). The same applies to the transistor TGS. Therefore, in the imaging device 1F, it is possible to reduce the deviation from "0" of each of the pixel values VAL1 to VAL4, which makes it possible to set the result of the binarization process of the pixel values VAL1 to VAL4 to "0" more stably.

Other Modification Examples

In addition, two or more of these modification examples may be combined.

2. Second Embodiment

Next, an imaging device 2 according to a second embodiment is described. In the present embodiment, one photo-diode PD is used to configure an imaging pixel. It is to be noted that components substantially the same as those of the imaging device 1 according to the first embodiment are denoted by the same reference numerals, and descriptions thereof are omitted as appropriate.

FIG. 23 illustrates a configuration example of the imaging device 2. The imaging device 2 includes a pixel array 50, two scanning units 60L and 60R, the readout unit 30, and a control unit 70.

The pixel array 50 includes the plurality of imaging pixels P1 and the plurality of dummy pixels P2 and P3. The plurality of imaging pixels P1 is disposed in the imaging pixel region R1, the plurality of dummy pixels P2 is disposed in the dummy pixel regions R21 and R22, and the plurality of dummy pixels P3 is disposed in the dummy pixel regions R31 and R32.

FIG. 24 illustrates a configuration example of the imaging pixel P1. The pixel array 50 includes the plurality of control lines TGLL, the plurality of control lines RSTL, the plurality of control lines SELL, the plurality of power supply lines PL, and the plurality of signal lines SGL.

The control line TGLL extends in the horizontal direction (lateral direction in FIG. 23). The control line TGLL has one end coupled to the scanning unit 60L and the other end coupled to the scanning unit 60R. A signal STG is applied to the control line TGLL by the scanning units 60L and 60R. The control line RSTL extends in the horizontal direction. The control line RSTL has one end coupled to the scanning unit 60L and the other end coupled to the scanning unit 60R. The signal SRST is applied to the control line RSTL by the scanning units 60L and 60R. The control line SELL extends in the horizontal direction. The control line SELL has one end coupled to the scanning unit 60L and the other end coupled to the scanning unit 60R. the signal SSEL is applied to the control line SELL by the scanning units 60L and 60R. The power supply line PL is coupled to the voltage generation unit 42 of the control unit 70. The power supply voltage VDD is applied to the power supply line PL by the voltage generation unit 42. The signal line SGL extends in the vertical direction (longitudinal direction in FIG. 23), and has one end coupled to the readout unit 30.

The imaging pixel P1 includes a photodiode PD and the pixel circuit CKT. The pixel circuit CKT includes transistors TG and RST, the floating diffusion FD, and the transistors AMP and SEL. The photodiode PD has the anode grounded, and the cathode coupled to the source of the transistor TG. The transistor TG has the gate coupled to the control line TGLL, the source coupled to the cathode of the photodiode PD, and the drain coupled to the floating diffusion FD. The transistor RST has the gate coupled to the control line RSTL, the drain coupled to the power supply line PL, and the source coupled to the floating diffusion FD. The transistor AMP has the gate coupled to the floating diffusion FD, the drain coupled to the power supply line PL, and the source coupled to the drain of the transistor SEL. The transistor SEL has the gate coupled to the control line SELL, the drain coupled to the source of the transistor AMP, and the source coupled to the signal line SGL.

This configuration electrically couples the imaging pixel P1 to the signal line SGL by turning on the transistor SEL on the basis of the signal SSEL applied to the control line SELL in the imaging pixel P1. The imaging pixel P1 then outputs, as the signal SIG, the pixel voltage VP corresponding to the voltage of the floating diffusion FD to the signal line SGL. Specifically, the imaging pixel P1 sequentially outputs two pixel voltages VP (VP11 and VP12) in two conversion periods (P-phase period TP and D-phase period TD) within the so-called horizontal period H as described below.

FIG. 25 illustrates an example of the arrangement of the photodiodes PD. In FIG. 25, "R" represents a red color filter, "G" represents a green color filter, and "B" represents a blue color filter. The photodiodes PD are arranged in a matrix.

FIGS. 26A and 26B illustrate a configuration example of the dummy pixel P2 in the dummy pixel regions R21 and R22 and a configuration example of the dummy pixel P3 in the dummy pixel regions R31 and R32. In the dummy pixel regions R21 and R22, the dummy pixel PA or the dummy pixel PB is selectively disposed as the dummy pixel P2, and, in the dummy pixel regions R31 and R32, the dummy pixel PA or the dummy pixel PB is selectively disposed as the dummy pixel P3. FIG. 26A illustrates an example of the dummy pixel PA, and FIG. 26B illustrates an example of the dummy pixel PB. The pixel array 50 includes, in the dummy pixel regions R21, R22, R31, and R32, the plurality of control lines TGLL と, plurality of control lines RSTL, the plurality of control lines SELL, the plurality of power supply lines PL, the plurality of voltage supply lines VL, and the plurality of signal lines SGL. The voltage supply line VL is coupled to the voltage generation unit 42 of the control unit 70. A single voltage signal SVR is applied to the plurality of voltage supply lines VL by the voltage generation unit 42. The voltage signal SVR is set to the voltage VR, for example, in a period in which the transistor TG in the readout driving D2 is turned on, and is set to the power supply voltage VDD, for example, in a period in which the transistor TG in the accumulation start driving D1 is turned on.

In the pixel circuit CKT of the dummy pixel PA, the drain and the source of the transistor TGL are coupled to each other. In other words, in the dummy pixel PA, the drain and the source of the transistor TGL are coupled to each other without involving the transistor TGL. With such a configuration, in the dummy pixel PA, the voltage of the floating diffusion FD is set to the power supply voltage VDD in the readout driving D2. The dummy pixel PA then outputs, as the signal SIG, the pixel voltage VP corresponding to the voltage of the floating diffusion FD to the signal line SGL.

Further, in the pixel circuit CKT of the dummy pixel PB, the source of the transistor TGL is coupled to the voltage supply line VL and the source of the transistor TGS is coupled to the voltage supply line VL. With such a configuration, in the dummy pixel PB, the voltage of the floating diffusion FD is set to the voltage VR by turning on the transistor TG in the readout driving D2, as will be described later. The dummy pixel PB then outputs, as the signal SIG, the pixel voltage VP corresponding to the voltage of the floating diffusion FD to the signal line SGL.

The arrangement of the dummy pixels P3 and P2 in the dummy pixel regions R31 and R21 is similar to that in the case of the first embodiment (FIG. 5), and the arrangement of the dummy pixels P2 and P3 in the dummy pixel regions R22 and R32 is similar to that in the case of the first embodiment (FIG. 6).

The two scanning units 60L and 60R (FIG. 23) are configured to sequentially drive the imaging pixels P1 and the dummy pixels P2 and P3 in the pixel array 50 in units of pixel lines L on the basis of an instruction from the control unit 70. The scanning unit 60L includes the address decoder 21L, a logic section 62L, and a driver section 63L. Similarly, the scanning unit 60R includes the address decoder 21R, a logic section 62R, and a driver section 63R.

The address decoder 21L is configured to select the pixel line L corresponding to the address indicated by the address signal ADR in the pixel array 50 on the basis of the address signal ADR supplied from the control unit 70. The logic section 62L is configured to generate signals STG1, SRST1, and SSEL1 corresponding to the respective pixel lines L on the basis of the instruction from the address decoder 21L. The driver section 63L is configured to generate the signals STG, SRST, and SSEL corresponding to the respective pixel lines L on the basis of the signal STG1, SRST1, and SSEL1 corresponding to the respective pixel lines L. The same applies to the address decoder 21R, the logic section 62R, and the driver section 63R.

The control unit 70 (FIG. 1) is configured to supply control signals to the scanning units 60L and 60R and the readout unit 30, thereby controlling the operation of the imaging device 2. The control unit 70 includes an image processing unit 74 and a diagnosis processing unit 75.

The image processing unit 74 is configured to perform predetermined image processing on an image indicated by the image signal DATA0.

The diagnosis processing unit 75 is configured to perform a diagnosis process on the basis of the address signal ADR and the image signal DATA0. Specifically, the diagnosis processing unit 75 determines the left-end identification information INFL and the right-end identification information INFR on the basis of the pixel values VAL for the dummy pixels P3 included in the image signal DATA0, and determines the line identification information INF on the basis of the pixel values VAL for the dummy pixels P2 included in the image signal DATA0. The diagnosis processing unit 75 then diagnoses whether the imaging device 2 is performing a desired operation by comparing the address indicated by the address signal ADR with the line identification information INF. Thereafter, the diagnosis processing unit 75 outputs a result of the diagnosis process (diagnosis result RES).

Here, the photodiode PD corresponds to a specific example of a "first light receiving element" in the present disclosure. The pixel circuit CKT of the imaging pixel P1 corresponds to a specific example of an "imaging pixel circuit" in the present disclosure. The pixel circuit CKT of the dummy pixel PA corresponds to a specific example of a "first dummy pixel circuit" in the present disclosure. The pixel circuit CKT of the dummy pixel PB corresponds to a specific example of a "second dummy pixel circuit" in the present disclosure. The transistor TG corresponds to a specific example of a "first transistor" in the present disclosure. The transistor RST corresponds to a specific example of a "second transistor" in the present disclosure. The address generation unit 41 corresponds to a specific example of an "address generation unit" in the present disclosure. The scanning units 60L and 60R correspond to a specific example of a "drive controller" in the present disclosure. The readout unit 30 and the diagnosis processing unit 75 correspond to a specific example of a "diagnosis unit" in the present disclosure.

Similarly to the case of the first embodiment (FIG. 10), the imaging device 2 performs the accumulation start driving D1 on the plurality of imaging pixels P1 and the plurality of dummy pixels P2 and P3 in the pixel array 50 in order from top in the vertical direction in the period from a timing t0 to a timing t1. Specifically, the scanning units 60L and 60R set on the transistors TG and RST, for example, in order from top in the vertical direction in units of the pixel lines L in a predetermined period in the horizontal period H, and then turn off these transistors. This causes each of the plurality of imaging pixels P1 to start accumulating electric charge after the voltages in the floating diffusion FD and the photodiode PD are each set to the power supply voltage VDD, and the electric charge is accumulated during the accumulation period T10 before the readout driving D2 is performed. Further, in each of the plurality of dummy pixels P2 and P3, the voltage in the floating diffusion FD is set to the power supply voltage VDD. That is, the voltage VR of the voltage signal SVR to be applied to the voltage supply line VL is set to the power supply voltage VDD during the period in which the transistor TG in the accumulation start driving D1 is turned on; therefore, the voltage in the floating diffusion FD is set to the power supply voltage VDD.

The imaging device 2 then performs the readout driving D2 on the plurality of imaging pixels P1 and the plurality of dummy pixels P2 and P3 in order from top in the vertical direction in the period from a timing t10 to a timing t11. This causes each of the plurality of imaging pixels P1 and the plurality of dummy pixels P2 and P3 to sequentially output the two pixel voltages VP (VP11 and VP12). The readout unit 30 performs AD conversion on the basis of each of these two pixel voltages VP11 and VP12, and outputs the digital code CODE (pixel value VAL).

FIG. 27 illustrates an operation example of the readout driving D2 in an imaging pixel PIA of interest. (A) indicates the waveform of the horizontal synchronization signal XHS, (B) indicates the waveform of the signal SRST, (C) indicates the waveform of the signal STG, (D) indicates the waveform of the signal SSEL, (E) indicates the waveform of the reference signal REF, (F) indicates the waveform of the signal SIG, (G) indicates the waveform of the signal CMP outputted from the comparator 36 of the AD conversion section ADC, (H) indicates the waveform of the clock signal CLK, and (I) indicates the count value CNT in the counter 37 of the AD conversion section ADC. Here, the reference signal REF in (E) of FIG. 27 indicates the waveform at the positive input terminal of the comparator 36, and the signal SIG in (F) of FIG. 27 indicates the waveform at the negative input terminal of the comparator 36.

In the imaging device 2, in a certain horizontal period (H), first, the scanning units 60L and 60R perform a reset operation on the imaging pixel PIA, and the AD conversion section ADC performs AD conversion on the basis of the pixel voltage VP11 outputted from the imaging pixel PIA in the following P-phase period TP. The scanning units 60L and 60R then perform an electric charge transfer operation on the imaging pixel P1A, and the AD conversion section ADC performs AD conversion on the basis of the pixel voltage VP12 outputted from the imaging pixel P1A in the D-phase period TD. The following describes this operation in detail.

First, when the horizontal period H starts at a timing t91, the scanning units 60L and 60R change the voltage of the signal SSEL from the low level to the high level at a timing t92 ((D) of FIG. 27). This causes the transistor SEL to be turned on in the imaging pixel P1A, and the imaging pixel PIA is electrically coupled to the signal line SGL.

Next, at a timing t93, the scanning units 60L and 60R change the voltage of the signal SRST from the low level to the high level ((B) of FIG. 27). This causes the transistor RST to be turned on in the imaging pixel P1A, and the voltage of the floating diffusion FD is set at the power supply voltage VDD (reset operation).

Next, at a timing t94, the scanning units 60L and 60R change the voltage of the signal SRST from the high level to the low level ((B) of FIG. 27). This causes the transistor RST to be turned off in the imaging pixel P1A. In the period from the timing t94 to a timing t95, the comparator 36 then performs a zero adjustment that sets the voltage of the capacitors 33 and 34.

Next, at the timing t95, the comparator 36 finishes the zero adjustment. At this timing t95, the reference signal generation unit 32 then changes the voltage of the reference signal REF to the voltage V1 ((E) of FIG. 27).

This causes the transistor SEL to be turned on, and causes the transistors TG and RST to be each turned off in the imaging pixel PIA. The floating diffusion FD retains the electric charge at the time of resetting the floating diffusion FD in the period from the timing t93 to the timing t94. The imaging pixel PIA outputs the pixel voltage VP (pixel voltage VP11) corresponding to the voltage of the floating diffusion FD at this time.

Next, in the period (P-phase period TP) from a timing t96 to a timing t98, the readout unit 30 performs AD conversion on the basis of this pixel voltage VP1*l*. Specifically, at the timing t96, the readout controller 31 first starts to generate the clock signal CLK ((H) of FIG. 27). Concurrently with this, the reference signal generation unit 32 starts to decrease the voltage of the reference signal REF from the voltage V1 by a predetermined degree of change ((E) of FIG. 27). Accordingly, the counter 37 of the AD conversion section ADC starts a counting operation to sequentially change the count value CNT ((I) of FIG. 27).

Then, at a timing t97, the voltage of the reference signal REF falls below the pixel voltage VP11 ((E) and (F) of FIG. 27). Accordingly, the comparator 36 of the AD conversion section ADC changes the voltage of the signal CMP from the high level to the low level ((G) of FIG. 27). As a result, the counter 37 stops the counting operation ((I) of FIG. 27).

Next, at the timing t98, the readout controller 31 stops generating the clock signal CLK at the end of the P-phase period TP ((H) of FIG. 27). Concurrently with this, the reference signal generation unit 32 stops changing the voltage of the reference signal REF, and changes the voltage of the reference signal REF to the voltage V1 at the following timing t99 ((E) of FIG. 27). Accordingly, the voltage of the reference signal REF exceeds the pixel voltage VP11 ((E) and (F) of FIG. 27), and the comparator 36 of the AD conversion section ADC thus changes the voltage of the signal CMP from the low level to the high level ((G) of FIG. 27).

Next, at a timing t100, the counter 37 of the AD conversion section ADC inverses the polarity of the count value CNT on the basis of the control signal CC ((I) of FIG. 27).

Next, at a timing t101, the scanning units 60L and 60R change the voltage of the signal STG from the low level to the high level ((C) of FIG. 27). This causes the transistor TG to be turned on in the imaging pixel PIA. As a result, the electric charge generated in the photodiode PD are transferred to the floating diffusion FD (electric charge transfer operation). Accordingly, the voltage of the signal SIG is decreased ((F) of FIG. 27).

At a timing t102, the scanning units 60L and 60R then change the voltage of the signal STG from the high level to the low level ((C) of FIG. 27). This causes the transistor TG to be turned off in the imaging pixel P1A.

This causes the transistor SEL to be turned on, and causes the transistors TG and RST to be each turned off in the imaging pixel PIA. The floating diffusion FD retains the electric charge transferred from the photodiode PD in the period from the timing t01 to the timing t102. The imaging pixel P1A outputs the pixel voltage VP (pixel voltage VP12) corresponding to the voltage of the floating diffusion FD at this time.

Next, in the period (D-phase period TD) from a timing t103 to a timing t105, the readout unit 30 performs AD conversion on the basis of the pixel voltage VP12. Specifically, at the timing t103, the readout controller 31 first starts to generate the clock signal CLK ((H) of FIG. 27). Concurrently with this, the reference signal generation unit 32 starts to decrease the voltage of the reference signal REF from the voltage V1 by a predetermined degree of change ((E) of FIG. 27). Accordingly, the counter 37 of the AD conversion section ADC starts a counting operation to sequentially change the count value CNT ((I) of FIG. 27).

Then, at a timing 104, the voltage of the reference signal REF falls below the pixel voltage VP12 ((E) and (F) of FIG. 27). Accordingly, the comparator 36 of the AD conversion section ADC changes the voltage of the signal CMP from the high level to the low level ((G) of FIG. 27). As a result, the counter 37 stops the counting operation ((I) of FIG. 27). In this way, the AD conversion section ADC obtains the count value CNT corresponding to the difference between the pixel voltages VP11 and VP12. The latch 38 of the AD conversion section ADC then outputs this count value CNT as the digital code CODE.

Next, at the timing t105, the readout controller 31 stops generating the clock signal CLK at the end of the D-phase period TD ((H) of FIG. 27). Concurrently with this, the reference signal generation unit 32 stops changing the voltage of the reference signal REF, and changes the voltage of the reference signal REF to the voltage V2 at the following timing t106 ((E) of FIG. 27). Accordingly, the voltage of the reference signal REF exceeds the pixel voltage VP12 ((E) and (F) of FIG. 27), and the comparator 36 of the AD conversion section ADC thus changes the voltage of the signal CMP from the low level to the high level ((G) of FIG. 27).

Next, at a timing t107, the scanning units 60L and 60R change the voltage of the signal SSEL from the high level to the low level ((D) of FIG. 27). This causes the transistor SEL to be turned off in the imaging pixel PIA, and the imaging pixel P1A is electrically uncoupled from the signal line SGL.

Then, at a timing t108, the counter 37 of the AD conversion section ADC sets the count value CNT at "0" on the basis of the control signal CC ((I) of FIG. 27).

In this way, the imaging device 2 performs a counting operation on the basis of the pixel voltage VP11 in the P-phase period TP, inverses the polarity of the count value CNT, and then performs a counting operation on the basis of the pixel voltage VP12 in the D-phase period TD. This allows the imaging device 2 to acquire the digital code CODE corresponding to the voltage difference between the pixel voltages VP11 and VP12. In the imaging device 2, such correlated double sampling is performed, and it is thus possible to remove the noise component included in the pixel voltage VP12. As a result, it is possible to increase the image quality of a captured image.

A diagnosis process in the imaging device 2 is similar to that in the case of the first embodiment (FIG. 15).

That is, the address generation unit 41 of the control unit 70 determines the pixel line L to be driven in the pixel array 50, and generates the address signal ADR indicating an address corresponding to the pixel line L. The address generation unit 41 then supplies the generated address signal ADR to the scanning units 60L and 60R.

The two scanning units 60L and 60R drive the imaging pixels P1 and the dummy pixels P2 and P3 belonging to the pixel line L corresponding to the address indicated by the address signal ADR on the basis of the instruction from the control unit 70.

The 11 dummy pixels P2 in the dummy pixel region R21, the 11 dummy pixels P2 in the dummy pixel region R22, the two dummy pixels P3 in the dummy pixel region R31, and the two dummy pixels P3 in the dummy pixel region R32, which are included in the pixel array 50, each sequentially output the two pixel voltages VP (VP11 and VP12) in the two conversion periods (P-phase period TP and D-phase period TD) as the signals SIG. The AD conversion sections ADC of the readout unit 30 each perform AD conversion on the basis of these two pixel voltages VP11 and VP12, and each output the digital code CODE (pixel value VAL).

Thereafter, the diagnosis processing unit 75 of the control unit 70 determines the left-end identification information INFL and the right-end identification information INFR on the basis of the pixel values VAL for the dummy pixels P3 included in the image signal DATA0, and determines the line identification information INF on the basis of the pixel values VAL for the dummy pixels P2 included in the image signal DATA0. The diagnosis processing unit 75 then diagnoses whether the imaging device 2 is performing a desired operation by comparing the address indicated by the address signal ADR with the line identification information INF. Thereafter, the diagnosis processing unit 75 outputs a result of the diagnosis process (diagnosis result RES).

In the imaging device 2, as illustrated in FIG. 26A, in the dummy pixel PA, the drain and the source of the transistor TG are coupled to each other. As a result, it is possible to make the pixel value VAL of this dummy pixel PA close to "0" in the imaging device 2, similarly to the imaging device 1 according to the first embodiment. It is thus possible to prevent erroneous diagnosis in a case where, for example, an imaging sensitivity is increased by changing the slope of the ramp waveform in the reference signal REF.

In the present embodiment, the drain and the source of the transistor TGL are coupled to each other in the dummy pixel PA, which makes it possible to prevent erroneous diagnosis. Other effects are similar to those in the case of the first embodiment.

Modification Example 2

Any of the modification examples of the first embodiment may be applied to the imaging device 2 according to the present embodiment. The following describes an example in which the modification example 1-3 of the first embodiment is applied to the imaging device 2, for example.

FIG. 28 illustrates a configuration example of the dummy pixel PA disposed in a pixel array 50B of an imaging device 2B according to the present modification example. In the pixel circuit CKT of this dummy pixel PA, the source of the transistor TG is coupled to the power supply line PL, and the drain of the transistor RST is coupled to the voltage supply line VL. The configuration of FIG. 26B is usable as the dummy pixel PB.

In this dummy pixel PA, in the readout driving D2, the power supply voltage VDD applied to the source of the transistor TG is higher than the voltage VR applied to the drain of the transistor RST. Accordingly, the voltage of the floating diffusion FD set by turning on the transistor TG is higher than the voltage of the floating diffusion FD set by turning on the transistor RST. As a result, the pixel value VAL is clamped to "0". Accordingly, in the imaging device 2B according to the present modification example, it is possible to set the result of the binarization process of the pixel value VAL to "0" more stably, even if the imaging sensitivity of the imaging device 2B is high, for example.

FIG. 29 illustrates a configuration example of the dummy pixel PA disposed in a pixel array 50C of another imaging device 2C according to the present modification example. In the pixel circuit CKT of this dummy pixel PA, the source of the transistor TG is coupled to the power supply line PL and the drain of the transistor TG is open. That is, the drain of the transistor TG is not coupled to another element. Even in this case, in the dummy pixel PA, the voltage of the floating diffusion FD is maintained even if the transistor TG is turned on during the period from the timing t101 to the timing t102 (FIG. 27). Therefore, in the imaging device 2C, it is possible to reduce the deviation from "0" of the pixel value VAL, which makes it possible to set the result of the binarization process of the pixel value VAL to "0" more stably.

In the example of FIG. 29, the source of the transistor TG is coupled to the power supply line PL, but this is not limitative. For example, the source of the transistor TG may be coupled to the voltage supply line VL.

FIG. 30 illustrates a configuration example of the dummy pixel PA disposed in a pixel array 50D of another imaging device 2D according to the present modification example. In the pixel circuit CKT of this dummy pixel PA, the source of the transistor TG is open, and the drain of the transistor TG is coupled to the floating diffusion FD. That is, the source of the transistor TG is not coupled to another element. Even in this case, in the dummy pixel PA, the voltage of the floating diffusion FD is maintained even if the transistor TG is turned on during the period from the timing t101 to the timing t102 (FIG. 27). Therefore, in the imaging device 2D, it is possible to reduce the deviation from "0" of the pixel value VAL, which makes it possible to set the result of the binarization process of the pixel value VAL to "0" more stably.

3. Usage Example of Imaging Device

FIG. 31 illustrates a usage example of the imaging devices 1 and 2 according to the above-described embodiments. For example, the above-described imaging devices 1 and 2 are usable in a variety of cases of sensing light such as visible light, infrared light, ultraviolet light, and X-ray as follows.

- Devices that shoot images used for viewing such as digital cameras and portable appliances each having a camera function
- Devices for traffic use such as onboard sensors that shoot images of the front, back, surroundings, inside, and so on of an automobile for safe driving such as automatic stop and for recognition of a driver's state, monitoring cameras that monitor traveling vehicles and roads, and distance measuring sensors that measure vehicle-to-vehicle distance
- Devices for use in home electrical appliances such as televisions, refrigerators, and air-conditioners to shoot images of a user's gesture and bring the appliances into operation in accordance with the gesture
- Devices for medical care and health care use such as endoscopes and devices that shoot images of blood vessels by receiving infrared light
- Devices for security use such as monitoring cameras for crime prevention and cameras for individual authentication
- Devices for beauty use such as skin measuring devices that shoot images of skin and microscopes that shoot images of scalp
- Devices for sports use such as action cameras and wearable cameras for sports applications, etc.
- Devices for agricultural use such as cameras for monitoring fields and crops 4. Example of Application to Mobile Body The technology (the present technology) according to the present disclosure is applicable to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

FIG. 32 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 32, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 32, an audio speaker 12061, a display section 12062, and an instrument panel 12063 are illustrated as the output device. The display section 12062 may, for example, include at least one of an on-board display and a head-up display.

FIG. 33 is a diagram depicting an example of the installation position of the imaging section 12031.

In FIG. 33, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 33 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The above has described the example of the vehicle control system to which the technology according to the present disclosure may be applied. The technology according to the present disclosure may be applied to the imaging section 12031 among the components described above. This allows the vehicle control system 12000 to diagnose whether or not the imaging section 12031 is operating normally by performing the diagnosis process. Then, in a case where the imaging section 12031 has a problem, for example, the microcomputer 12051 is notified of a diagnosis result thereof, thereby allowing the vehicle control system 12000 to grasp that the imaging section 12031 has a problem. For example, this allows the vehicle control system 12000 to perform an appropriate process such as calling a driver's attention, making it possible to increase reliability. In addition, in the vehicle control system 12000, it is possible to restrict a function of controlling a vehicle on the basis of a result of the diagnosis process. Specific examples of the function of controlling a vehicle include a function of collision avoidance or shock mitigation for the vehicle, a function of following driving based on vehicle-to-vehicle distance, a function of vehicle speed maintaining driving, a function of a warning of collision of the vehicle, a function of a warning of deviation of the vehicle from a lane, and the like. In a case where it is determined that the imaging section 12031 has a problem as the result of the diagnosis process, it is possible to restrict or forbid the function of controlling the vehicle. This allows the vehicle control system 12000 to prevent an accident resulting from erroneous detection based on the problem of the imaging section 12031.

Although the disclosure is described hereinabove with reference to the example embodiments, modification examples, and specific application examples thereof, these embodiments and modification examples are not to be construed as limiting the scope of the disclosure and may be modified in a wide variety of ways.

For example, the readout unit 30 outputs the digital codes CODE2 and CODE3, and the image processing unit 44 subtracts the digital code CODE2 from the digital code CODE3 (CODE3−CODE2) in the imaging device 1 as illustrated in FIG. 14, thereby calculating the pixel value VALL. This is not, however, limitative. Instead of this, the readout unit 30 may output the digital code CODE corresponding to the difference between the digital codes CODE2 and CODE3 by inverting the polarity of the count value CNT after the conversion period T2 as in the case (FIG. 27) of the imaging device 2. The same applies to the digital codes CODE5 and CODE6. The same applies to the digital codes CODE7 and CODE8.

In addition, for example, the readout unit 30 outputs the digital codes CODE1 and CODE4, and the image processing unit 44 subtracts the digital code CODE1 from the digital code CODE4 (CODE4−CODE1) in the imaging device 1 as illustrated in FIG. 14, thereby calculating the pixel value VAL2. This is not, however, limitative. Instead of this, after the conversion period T1, the AD conversion section ADC of the readout unit 30 may temporarily store the count value CNT at that time therein. Before the conversion period T4, the AD conversion section ADC of the readout unit 30 may set the count value CNT in the counter 37 and invert the polarity of the count value CNT. Even in this case, the image processing unit 44 is able to obtain the digital code CODE corresponding to the difference between the digital codes CODE1 and CODE4 as in the case (FIG. 27) of the imaging device 2.

For example, the imaging pixel P1 according to the above embodiments is not limited to the configuration illustrated in FIGS. 2 and 24.

It is to be noted that the effects described in the present specification are merely illustrative, but not limited. In addition, other effects may be included.

It is to be noted that the present technology may be configured as below. According to the present technology having the following configurations, it is possible to perform self-diagnosis and diagnose presence or absence of a problem.

(1)

An imaging device including:

a first light receiving element; and a plurality of pixel circuits that includes an imaging pixel circuit and a first dummy pixel circuit, each of the plurality of pixel circuits including an accumulation section, a first transistor, and an output section, the accumulation section being configured to accumulate electric charge, the first transistor including a first terminal and a second terminal and being configured to couple, by being turned on, the first terminal and the second terminal to each other, the second terminal being coupled to the accumulation section, the output section being configured to output a voltage corresponding to electric charge accumulated in the accumulation section, in which the first terminal of the first transistor in the imaging pixel circuit is coupled to the first light receiving element, and the first terminal of the first transistor in the first dummy pixel circuit is coupled to the second terminal of the first transistor in the first dummy pixel circuit without involving the first transistor of the first dummy pixel circuit.

(2)

The imaging device according to (1), further including a voltage supply line, in which the plurality of pixel circuits includes a second dummy pixel circuit, and the first terminal of the first transistor in the second dummy pixel circuit is coupled to the voltage supply line.

(3)

The imaging device according to (1) or (2), in which each of the plurality of pixel circuits further includes a second transistor, the second transistor being configured to apply, by being turned on, a predetermined voltage to the accumulation section.

(4)

The imaging device according to (1) or (2), further including a second light receiving element, in which each of the plurality of pixel circuits further includes a third transistor, the third transistor including a first terminal and a second terminal and being configured to couple, by being turned on, the first terminal and the second terminal to each other, the second terminal being configured to be coupled to the accumulation section, the first terminal of the third transistor in the imaging pixel circuit is coupled to the second light receiving element, and the first terminal of the third transistor in the first dummy pixel circuit is coupled to the second terminal of the third transistor in the first dummy pixel circuit without involving the third transistor of the first dummy pixel circuit.

(5)

The imaging device according to (4), in which each of the plurality of pixel circuits further includes a second transistor, a capacitor, a fourth transistor, and a fifth transistor, the second transistor being configured to apply, by being turned on, a predetermined voltage to a connection node, the capacitor being coupled to the second terminal of the third transistor, the fourth transistor being configured to couple, by being turned on, the capacitor and the connection node to each other, the fifth transistor being configured to couple, by being turned on, the connection node and the accumulation section to each other.

(6)

The imaging device according to any one of (1) to (5), in which the imaging pixel circuit is disposed in an effective pixel region of the imaging device, and the first dummy pixel circuit is disposed outside the effective pixel region.

(7)

The imaging device according to any one of (1) to (6), further including:

an address generation unit configured to generate an address signal;

a drive controller configured to control an operation of the first transistor on a basis of the address signal; and a diagnosis unit configured to perform a diagnosis process on a basis of the address signal and a first signal, the first signal being outputted from the output section of the first dummy pixel circuit.

(8)

An imaging device including:

a first voltage supply line;

a second voltage supply line;

a first light receiving element; and a plurality of pixel circuits that includes an imaging pixel circuit, a first dummy pixel circuit, and a second dummy pixel circuit, each of the plurality of pixel circuits including an accumulation section, a first transistor, a second transistor, and an output section, the accumulation section being configured to accumulate electric charge, the first transistor including a first terminal and a second terminal and being configured to couple, by being turned on, the first terminal and the second terminal to each other, the second terminal being coupled to the accumulation section, the second transistor including a first terminal and a second terminal and being configured to couple, by being turned on, the first terminal and the second terminal to each other, the second terminal being configured to be coupled to the accumulation section, the output section being configured to output a voltage corresponding to electric charge accumulated in the accumulation section, in which, in the imaging pixel circuit, the first terminal of the first transistor is coupled to the first light receiving element, and the first terminal of the second transistor is coupled to the first voltage supply line, in the first dummy pixel circuit, the first terminal of the first transistor is coupled to the first voltage supply line, and the first terminal of the second transistor is coupled to the second voltage supply line, and, in the second dummy pixel circuit, the first terminal of the first transistor is coupled to the second voltage supply line, and the first terminal of the second transistor is coupled to the first voltage supply line.

(9)

The imaging device according to (8), in which the second terminal of the second transistor in each of the plurality of pixel circuits is coupled to the accumulation section.

(10)

The imaging device according to (8), further including a second light receiving element, in which each of the plurality of pixel circuits further includes a third transistor, the third transistor including a first terminal and a second terminal and being configured to couple, by being turned on, the first terminal and the second terminal to each other, the second terminal being configured to be coupled to the accumulation section, the first terminal of the third transistor in the imaging pixel circuit is coupled to the second light receiving element, the first terminal of the third transistor in the first dummy pixel circuit is coupled to the first voltage supply line, and the first terminal of the third transistor in the second dummy pixel circuit is coupled to the second voltage supply line.

(11)

The imaging device according to (10), in which each of the plurality of pixel circuits further includes a capacitor, a fourth transistor, and a fifth transistor, the capacitor being coupled to the second terminal of the third transistor, the fourth transistor being configured to couple, by being turned on, the capacitor and a connection node to each other, the fifth transistor being configured to couple, by being turned on, the connection node and the accumulation section to each other, and the second terminal of the second transistor in each of the plurality of pixel circuits is coupled to the connection node of the each of the plurality of pixel circuits.

(12)

The imaging device according to any one of (8) to (11), in which the imaging pixel circuit is disposed in an effective pixel region of the imaging device, and the first dummy pixel circuit and the second dummy pixel circuit are disposed outside the effective pixel region.

(13)

The imaging device according to any one of (8) to (12), further including:

an address generation unit configured to generate an address signal;

a drive controller configured to control an operation of the first transistor on a basis of the address signal; and a diagnosis unit configured to perform a diagnosis process on a basis of the address signal, a first signal, and a second signal, the first signal being outputted from the output section of the first dummy pixel circuit, the second signal being outputted from the output section of the second dummy pixel circuit.

(14)

An imaging device including:

a first light receiving element; and a plurality of pixel circuits that includes an imaging pixel circuit and a first dummy pixel circuit, each of the plurality of pixel circuits including an accumulation section, a first transistor, and an output section, the accumulation section being configured to accumulate electric charge, the first transistor including a first terminal and a second terminal and being configured to couple, by being turned on, the first terminal and the second terminal to each other, the output section being configured to output a voltage corresponding to electric charge accumulated in the accumulation section, in which, in the imaging pixel circuit, the first terminal of the first transistor is coupled to the first light receiving element, and the second terminal of the first transistor is coupled to the accumulation section, and, in the first dummy pixel circuit, at least one of the first terminal or the second terminal of the first transistor is uncoupled to an element other than the first transistor.

(15)

The imaging device according to (14), further including a voltage supply line, in which the plurality of pixel circuits includes a second dummy pixel circuit, and, in the second dummy pixel circuit, the first terminal of the first transistor is coupled to the voltage supply line, and the second terminal of the first transistor is coupled to the accumulation section.

(16)

The imaging device according to (14) or (15), in which each of the plurality of pixel circuits further includes a second transistor, the second transistor being configured to apply, by being turned on, a predetermined voltage to the accumulation section.

(17)

The imaging device according to (14) or (15), further including a second light receiving element, in which each of the plurality of pixel circuits further includes a third transistor, the third transistor including a first terminal and a second terminal and being configured to couple, by being turned on, the first terminal and the second terminal to each other, in the imaging pixel circuit, the first terminal of the third transistor is coupled to the second light receiving element, and the second terminal of the third transistor is configured to be coupled to the accumulation section, and, in the first dummy pixel circuit, at least one of the first terminal or the second terminal of the third transistor is uncoupled to an element other than the third transistor.

(18)

The imaging device according to (17), in which each of the plurality of pixel circuits further includes a second transistor, a capacitor, a fourth transistor, and a fifth transistor, the second transistor being configured to apply, by being turned on, a predetermined voltage to a connection node, the fourth transistor being configured to couple, by being turned on, the capacitor and the connection node to each other, the fifth transistor being configured to couple, by being turned on, the connection node and the accumulation section to each other, and, in the imaging pixel circuit, the capacitor is coupled to the second terminal of the third transistor.

(19)

The imaging device according to any one of (14) to (18), in which the imaging pixel circuit is disposed in an effective pixel region of the imaging device, and the first dummy pixel circuit is disposed outside the effective pixel region.

(20)

The imaging device according to any one of (14) to (19), further including:

an address generation unit configured to generate an address signal;

a drive controller configured to control an operation of the first transistor on a basis of the address signal; and a diagnosis unit configured to perform a diagnosis process on a basis of the address signal and a first signal, the first signal being outputted from the output section of the first dummy pixel circuit.

This application claims the benefit of Japanese Priority Patent Application JP2018-231796 filed with the Japan Patent Office on Dec. 11, 2018, the entire contents of which are incorporated herein by reference.

It should be appreciated that the effects described herein are mere examples. Effects of an example embodiment and modification examples of the disclosure are not limited to those described herein. The disclosure may further include any effects other than those described herein.

The invention claimed is:

1. An imaging device comprising:

a plurality of pixels including an imaging pixel and a first dummy pixel;

the imaging pixel including a first light receiving element, a second light receiving element, an accumulation section, a first transistor, a second transistor and an output section, the accumulation section of the imaging pixel being configured to accumulate electric charge, the first transistor of the imaging pixel including a first terminal and a second terminal, the first terminal being coupled to the first light receiving element, the second terminal being coupled to the accumulation section, the first and second terminals configured to be electrically coupled to each other when the first transistor is in an ON state, the second transistor of the imaging pixel including a first terminal and a second terminal, the first terminal being coupled to the second light receiving element, and second terminal being coupled to the accumulation section, the first and second terminals configured to be electrically coupled to each other when the second transistor is in an ON state, and the output section of the imaging pixel being configured to output a voltage corresponding to electric charge accumulated in the accumulation section of the imaging pixel; and the dummy pixel including an accumulation section, a first transistor, a second transistor and an output section, the accumulation section of the dummy pixel being configured to accumulate electric charge, the first transistor of the dummy pixel including a first terminal and a second terminal, the second terminal being coupled to the accumulation section, the first and second terminals being electrically connected to each other regardless of whether the first transistor is in an ON state or an OFF state, the second transistor of the dummy pixel including a first terminal and a second terminal, the second terminal being coupled to the accumulation section, the first and second terminals being electrically connected to each other regardless of whether the second transistor is in an ON state or an OFF state, and the output section of the dummy pixel being configured to output a voltage corresponding to electric charge accumulated in the accumulation section of the dummy pixel.

2. The imaging device according to claim 1, further comprising:
a voltage supply line; and
a second dummy pixel, wherein a first terminal of a first transistor in the second dummy pixel is coupled to the voltage supply line.

3. The imaging device according to claim 1, wherein the imaging pixel and the first dummy pixel each includes a third transistor, the third transistor being configured to apply, by being turned on, a predetermined voltage to the corresponding accumulation section.

4. The imaging device according to claim 1, wherein each of the imaging pixel and the first dummy pixel further includes a third transistor, a capacitor, a fourth transistor, and a fifth transistor, the third transistor being configured to apply, by being turned on, a predetermined voltage to a connection node, the capacitor being coupled to the second terminal of the second transistor, the fourth transistor being configured to couple, by being turned on, the capacitor and the connection node to each other, the fifth transistor being configured to couple, by being turned on, the connection node and the accumulation section to each other.

5. The imaging device according to claim 1, wherein the imaging pixel is disposed in an effective pixel region of the imaging device, and the first dummy pixel is disposed outside the effective pixel region.

6. The imaging device according to claim 1, further comprising:
address generation unit circuitry configured to generate an address signal;
a drive controller configured to control an operation of the first transistors on a basis of the address signal; and
diagnosis circuitry configured to perform a diagnosis process on a basis of the address signal and a first signal, the first signal being outputted from the output section of the first dummy pixel.

7. An imaging device comprising:
a first voltage supply line;
a second voltage supply line;
a first light receiving element; and
a plurality of pixel circuits that includes an imaging pixel circuit, a first dummy pixel circuit, and a second dummy pixel circuit, each of the plurality of pixel circuits including an accumulation section, a first transistor, a second transistor, and an output section, the accumulation section being configured to accumulate electric charge, the first transistor including a first terminal and a second terminal and being configured to couple, by being turned on, the first terminal and the second terminal to each other, the second terminal being coupled to the accumulation section, the second transistor including a first terminal and a second terminal and being configured to couple, by being turned on, the first terminal and the second terminal to each other, the second terminal being configured to be coupled to the accumulation section, the output section being configured to output a voltage corresponding to electric charge accumulated in the accumulation section, wherein, in the imaging pixel circuit, the first terminal of the first transistor is coupled to the first light receiving element, and the first terminal of the second transistor is coupled to the first voltage supply line, in the first dummy pixel circuit, the first terminal of the first transistor is coupled to the first voltage supply line, and the first terminal of the second transistor is coupled to the second voltage supply line, and, in the second dummy pixel circuit, the first terminal of the first transistor is coupled to the second voltage supply line, and the first terminal of the second transistor is coupled to the first voltage supply line.

8. The imaging device according to claim 7, wherein the second terminal of the second transistor in each of the plurality of pixel circuits is coupled to the accumulation section.

9. The imaging device according to claim 7, further comprising
a second light receiving element, wherein
each of the plurality of pixel circuits further includes a third transistor, the third transistor including a first terminal and a second terminal and being configured to couple, by being turned on, the first terminal and the second terminal to each other, the second terminal being configured to be coupled to the accumulation section,
the first terminal of the third transistor in the imaging pixel circuit is coupled to the second light receiving element,
the first terminal of the third transistor in the first dummy pixel circuit is coupled to the first voltage supply line, and
the first terminal of the third transistor in the second dummy pixel circuit is coupled to the second voltage supply line.

10. The imaging device according to claim 9, wherein
each of the plurality of pixel circuits further includes a capacitor, a fourth transistor, and a fifth transistor, the capacitor being coupled to the second terminal of the third transistor, the fourth transistor being configured to couple, by being turned on, the capacitor and a connection node to each other, the fifth transistor being configured to couple, by being turned on, the connection node and the accumulation section to each other, and
the second terminal of the second transistor in each of the plurality of pixel circuits is coupled to the connection node of the each of the plurality of pixel circuits.

11. The imaging device according to claim 7, wherein
the imaging pixel circuit is disposed in an effective pixel region of the imaging device, and
the first dummy pixel circuit and the second dummy pixel circuit are disposed outside the effective pixel region.

12. The imaging device according to claim 7, further comprising:
address generation circuitry configured to generate an address signal;
a drive controller configured to control an operation of the first transistor on a basis of the address signal; and
diagnosis circuitry configured to perform a diagnosis process on a basis of the address signal, a first signal, and a second signal, the first signal being outputted from the output section of the first dummy pixel circuit, the second signal being outputted from the output section of the second dummy pixel circuit.

13. An imaging device comprising:

a first light receiving element and a second light receiving element; and a plurality of pixel circuits that includes an imaging pixel circuit and a first dummy pixel circuit, each of the plurality of pixel circuits including an accumulation section, a first transistor, and an output section, the accumulation section being configured to accumulate electric charge, the first transistor including a first terminal and a second terminal and being configured to couple, by being turned on, the first terminal and the second terminal to each other, the output section being configured to output a voltage corresponding to electric charge accumulated in the accumulation section, wherein, in the imaging pixel circuit, the first terminal of the first transistor is coupled to the first light receiving element, and the second terminal of the first transistor is coupled to the accumulation section, in the first dummy pixel circuit, at least one of the first terminal or the second terminal of the first transistor is uncoupled to an element other than the first transistor, each of the plurality of pixel circuits further includes a third transistor, the third transistor including a first terminal and a second terminal and being configured to couple, by being turned on, the first terminal and the second terminal to each other, in the imaging pixel circuit, the first terminal of the third transistor is coupled to the second light receiving element, and the second terminal of the third transistor is configured to be coupled to the accumulation section, and in the first dummy pixel circuit, at least one of the first terminal or the second terminal of the third transistor is uncoupled to an element other than the third transistor.

14. The imaging device according to claim 13, further comprising a voltage supply line, wherein the plurality of pixel circuits includes a second dummy pixel circuit, and, in the second dummy pixel circuit, the first terminal of the first transistor is coupled to the voltage supply line, and the second terminal of the first transistor is coupled to the accumulation section.

15. The imaging device according to claim 13, wherein each of the plurality of pixel circuits further includes a second transistor, the second transistor being configured to apply, by being turned on, a predetermined voltage to the accumulation section.

16. The imaging device according to claim 13, wherein each of the plurality of pixel circuits further includes a second transistor, a capacitor, a fourth transistor, and a fifth transistor, the second transistor being configured to apply, by being turned on, a predetermined voltage to a connection node, the fourth transistor being configured to couple, by being turned on, the capacitor and the connection node to each other, the fifth transistor being configured to couple, by being turned on, the connection node and the accumulation section to each other, and, in the imaging pixel circuit, the capacitor is coupled to the second terminal of the third transistor.

17. The imaging device according to claim 13, wherein the imaging pixel circuit is disposed in an effective pixel region of the imaging device, and the first dummy pixel circuit is disposed outside the effective pixel region.

18. The imaging device according to claim 13, further comprising:

address generation circuitry configured to generate an address signal;

a drive controller configured to control an operation of the first transistor on a basis of the address signal; and diagnosis circuitry configured to perform a diagnosis process on a basis of the address signal and a first signal, the first signal being outputted from the output section of the first dummy pixel circuit.

* * * * *